United States Patent
Kim et al.

(10) Patent No.: US 12,389,400 B2
(45) Date of Patent: Aug. 12, 2025

(54) METHOD AND DEVICE FOR BY-LINK ACTIVATION AND DEACTIVATION FOR REDUCING POWER CONSUMPTION IN NEXT GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 425 days.

(21) Appl. No.: 17/425,841

(22) PCT Filed: Jan. 29, 2020

(86) PCT No.: PCT/KR2020/001345
§ 371 (c)(1),
(2) Date: Jul. 26, 2021

(87) PCT Pub. No.: WO2020/159222
PCT Pub. Date: Aug. 6, 2020

(65) Prior Publication Data
US 2022/0116923 A1     Apr. 14, 2022

(30) Foreign Application Priority Data

Jan. 29, 2019 (KR) .......................... 10-2019-0011489
Jul. 1, 2019 (KR) .......................... 10-2019-0078924

(51) Int. Cl.
*H04W 72/20* (2023.01)

(52) U.S. Cl.
CPC .................................. *H04W 72/20* (2023.01)

(58) Field of Classification Search
None
See application file for complete search history.

(56) References Cited

U.S. PATENT DOCUMENTS

| 2012/0294213 A1 | 11/2012 | Chen et al. |
| 2018/0139778 A1 | 5/2018 | Chou et al. |
| (Continued) | | |

FOREIGN PATENT DOCUMENTS

| CN | 109076553 A | 12/2018 |
| CN | 109151903 A | 1/2019 |
| (Continued) | | |

OTHER PUBLICATIONS

Indian Office Action dated Mar. 13, 2023, issued in Indian Patent Application No. 202137033830.
(Continued)

*Primary Examiner* — German Viana Di Prisco
(74) *Attorney, Agent, or Firm* — Jefferson IP Law, LLP

(57) ABSTRACT

The present disclosure relates to a communication technique converging IoT technology with a 5G communication system for supporting higher data transfer rates than 4G systems and a system for same. The present disclosure may be applied to intelligent services (for example, smart homes, smart buildings, smart cities, smart cars or connected cars, healthcare, digital education, retail businesses, security and safety-related services, or the like) on the basis of 5G communication technology and IoT-related technology. The present invention relates to a wireless communication system, and more specifically, the present invention relates to a method and device for providing a terminal mobility event reporting service in a cellular wireless communication system (5G system).

16 Claims, 26 Drawing Sheets

(56) References Cited

U.S. PATENT DOCUMENTS

| | | | |
|---|---|---|---|
| 2018/0183551 A1 | 6/2018 | Chou et al. | |
| 2018/0368112 A1 | 12/2018 | Sebeni et al. | |
| 2018/0368200 A1 | 12/2018 | Jin et al. | |
| 2019/0103954 A1* | 4/2019 | Lee | H04L 5/0098 |
| 2020/0029316 A1* | 1/2020 | Zhou | H04W 74/0833 |
| 2020/0037248 A1* | 1/2020 | Zhou | H04W 52/0216 |
| 2020/0229081 A1* | 7/2020 | Ang | H04W 16/08 |
| 2020/0313832 A1 | 10/2020 | Kim et al. | |
| 2021/0099274 A1 | 4/2021 | Jiang | |
| 2021/0392651 A1* | 12/2021 | Futaki | H04W 72/23 |
| 2022/0109547 A1* | 4/2022 | Svedman | H04B 7/0626 |

FOREIGN PATENT DOCUMENTS

| | | |
|---|---|---|
| KR | 10-2020-0094059 A | 8/2020 |
| RU | 2 515 553 C2 | 5/2014 |
| WO | 2019/066438 A1 | 4/2019 |

OTHER PUBLICATIONS

Qualcomm, Dormant BWP for fast SCell activation, R2-1803564, Resubmission of R2-1801432, 3GPP TSG-RAN WG2 Meeting #101, Athens, Greece, Feb. 16, 2018.

3GPP TS 38.321 V15.4.0, 3rd Generation Partnership Project, Technical Specification Group Radio Access Network, NR, Medium Access Control (MAC) protocol specification, (Release 15), Jan. 11, 2019.

LG Electronics Inc., Clearing remaining issues on BWP, R2-1808511, 3GPP TSG-RAN WG2 Meeting #101 bis, Busan, Korea, May 20, 2018.

Extended European Search Report dated Jan. 25, 2022, issued in European Patent Application No. 20749601.9.

Russian Office Action dated Feb. 4, 2022, issued in Russian Patent Application No. 2021122354/07.

Qualcomm Incorporated, UE Adaptation to the Traffic and UE Power Consumption Characteristics, R1-1900911, 3GPP TSG-RAN WG1 Ad-Hoc Meeting 1901, Jan. 12, 2019, Taipei, Taiwan.

Interdigital Inc., Coreset Monitoring Under Dynamic Change of BWP, R1-1710872, 3GPP TSG RAN WG1 NR Ad-Hoc #2, Jun. 16, 2017, Qingdao, China.

OPPO, Discussion on BWP Switching during SI Update, R2-1807243, 3GPP TSG-RAN2 Meeting #102, May 10, 2018, Busan, Korea.

Chinese Office Action dated Nov. 23, 2023, issued in Chinese Patent Application No. 202080011640.6.

European Office Action dated Jan. 5, 2024, issued in European Patent Application No. 20749601.9.

European Summons to attend Oral Proceedings dated Jul. 10, 2024, issued in European Patent Application No. 20749601.9.

Chinese Notice if Allowance dated Jul. 16, 2024, issued in Chinese Patent Application No. 202080011640.6.

Indian Hearing Notice dated Feb. 18, 2025, issued in Indian Patent Application No. 202137033830.

Huawei et al., Configured grant Type1 operation with BWP switch, R2-1801039, 3GPP TSG-RAN WG2 Meeting AH 1801, Jan. 12, 2018.

Korean Office Action dated Jun. 9, 2025, issued in Korean Patent Application No. 10-2019-0078924.

\* cited by examiner

FIG. 1I

| 1i-05 | $C_7$ | $C_6$ | $C_5$ | $C_4$ | $C_3$ | $C_2$ | $C_1$ | R | OCt 1 |

| 1i-10 | $C_7$ | $C_6$ | $C_5$ | $C_4$ | $C_3$ | $C_2$ | $C_1$ | R | OCt 1 |
|---|---|---|---|---|---|---|---|---|---|
| | $C_{15}$ | $C_{14}$ | $C_{13}$ | $C_{12}$ | $C_{11}$ | $C_{10}$ | $C_9$ | $C_8$ | OCt 2 |
| | $C_{23}$ | $C_{22}$ | $C_{21}$ | $C_{20}$ | $C_{19}$ | $C_{18}$ | $C_{17}$ | $C_{16}$ | OCt 3 |
| | $C_{31}$ | $C_{30}$ | $C_{29}$ | $C_{28}$ | $C_{27}$ | $C_{26}$ | $C_{25}$ | $C_{24}$ | OCt 4 |

FIG. 2I

| $C_7$ | $C_6$ | $C_5$ | $C_4$ | $C_3$ | $C_2$ | $C_1$ | R | OCt 1 |

2i-05

| $C_7$ | $C_6$ | $C_5$ | $C_4$ | $C_3$ | $C_2$ | $C_1$ | R | OCt 1 |
| $C_{15}$ | $C_{14}$ | $C_{13}$ | $C_{12}$ | $C_{11}$ | $C_{10}$ | $C_9$ | $C_8$ | OCt 2 |
| $C_{23}$ | $C_{22}$ | $C_{21}$ | $C_{20}$ | $C_{19}$ | $C_{18}$ | $C_{17}$ | $C_{16}$ | OCt 3 |
| $C_{31}$ | $C_{30}$ | $C_{29}$ | $C_{28}$ | $C_{27}$ | $C_{26}$ | $C_{25}$ | $C_{24}$ | OCt 4 |

2i-10

| Cell ID | DL/UL | BWP ID | State |

2i-15

METHOD AND DEVICE FOR BY-LINK ACTIVATION AND DEACTIVATION FOR REDUCING POWER CONSUMPTION IN NEXT GENERATION MOBILE COMMUNICATION SYSTEM

TECHNICAL FIELD

The disclosure relates to a method and an apparatus for activating and deactivating each link in a next-generation mobile communication system to reduce power consumption.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The need of a method of preventing processing latency that may be generated due to deactivation of carrier aggregation has risen.

DETAILED DESCRIPTION OF INVENTION

Technical Problem

According to an embodiment, carrier aggregation may be used to provide a service having a high data transmission rate and low transmission latency to a terminal in a next-generation mobile communication system. However, a method of preventing processing latency that may be generated when carrier aggregation is configured in a terminal having a connection with a network and is activated or when carrier aggregation is deactivated after being used is needed.

When a base station operates a plurality of cells for the terminal in units of cells in a next-generation mobile communication system, battery consumption may occur due to inefficient terminal operation since a downlink is activated even though only an uplink is to be used and an uplink is activated even though only a downlink is to be used.

Solution to Problem

In accordance with an aspect of the disclosure, a method includes receiving a first message for configuring a plurality of BandWidth Parts (BWPs) for a predetermined cell, configuring the plurality of BWPs, based on the first message and activating a first BWP among the plurality of BWPs, receiving a second message including first indication message indicating switching of a BWP to a dormant BWP among the plurality of BWPs, and switching the BWP to the dormant BWP, based on the second message.

In accordance with another aspect of the disclosure, a terminal in a wireless communication system includes a transceiver, and a controller configured to control the transceiver to receive a first message for configuring a plurality of BandWidth Parts (BWPs) for a predetermined cell, configure the plurality of BWPs, based on the first message, activate a first BWP among the plurality of BWPs, control the transceiver to receive a second message including first indication information indicating switching a BWP to a preset dormant BWP among the plurality of BWPs, and perform control to switch the BWP to the dormant BWP, based on the second message.

In accordance with another aspect of the disclosure, a method by a base station in a wireless communication system includes transmitting a first message for configuring a plurality of BandWidth Parts (BWPs) for a predetermined cell, and transmitting a second message including first indication information indicating switching of a BWP to a preset dormant BWP among the plurality of BWPs, wherein the plurality of BWPs are configured based on the first message, a first BWP is activated among the plurality of BWPs, and when the second message is received, the first BWP is switched to the dormant BWP, based on the second message.

In accordance with another aspect of the disclosure, a base station in a wireless communication system includes a transceiver, and a controller configured to control the transceiver to transmit a first message for configuring a plurality of BandWidth Parts (BWPs) for a predetermined cell and transmit a second message including first indication information indicating switching of a BWP to a preset dormant BWP among the plurality of BWPs, wherein the plurality of BWPs are configured based on the first message, a first BWP is activated by a terminal among the plurality of BWPs, and when the second message is received, the first BWP is switched to the dormant BWP, based on the second message.

Advantageous Effects of Invention

The disclosure proposes a new dormant mode for allowing an RRC connected-mode terminal having a connection with a network to rapidly activate and deactivate carrier aggregation in a next-generation mobile communication system. The disclosure proposes a method of operating the new dormant mode in units of cells (cell-level). Accordingly, it is possible to rapidly activate carrier aggregation and save a terminal battery by proposing an efficient BWP operation according to each state transition when each cell is managed in an activated state, a deactivated state, or a dormant state in units of cells.

The disclosure proposes a method of operating a new dormant mode in units of cells (cell-level) and a method of operating a dormant (or hibernation) mode in units of bandwidth parts (bandwidth part-level), thereby rapidly activating carrier aggregation and saving a terminal battery. The disclosure proposes a method of performing state transition in units of links such as the downlink or the uplink of one cell and enables configuration of a cell using only the uplink, a cell using only the downlink, and a cell using both the downlink and the uplink among a plurality of cells, so as to increase implementation freedom of the base station and save the terminal battery.

BRIEF DESCRIPTION OF DRAWINGS

FIG. 1EB illustrates a procedure of serving a terminal through the efficient use of a very wide frequency bandwidth in a next-generation mobile communication system of the disclosure;

FIG. 1I illustrates MAC control information indicating state transition to an activated state, a dormant state, or a deactivated state proposed in the disclosure;

FIG. 2EB illustrates a procedure of serving the terminal through the efficient use of a very wide frequency bandwidth in a next-generation mobile communication system of the disclosure;

FIG. 2I illustrates MAC control information indicating state transition to an activated state, a dormant state, or a deactivated state proposed in the disclosure;

MODE FOR THE INVENTION

Hereinafter, the operation principle of the disclosure will be described in detail in conjunction with the accompanying drawings. In the following description of the disclosure, a detailed description of relevant known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of relevant known functions or configurations incorporated herein will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". For example, a base station described as "eNB" may indicate "gNB".

Embodiment 1

Figure 1A:
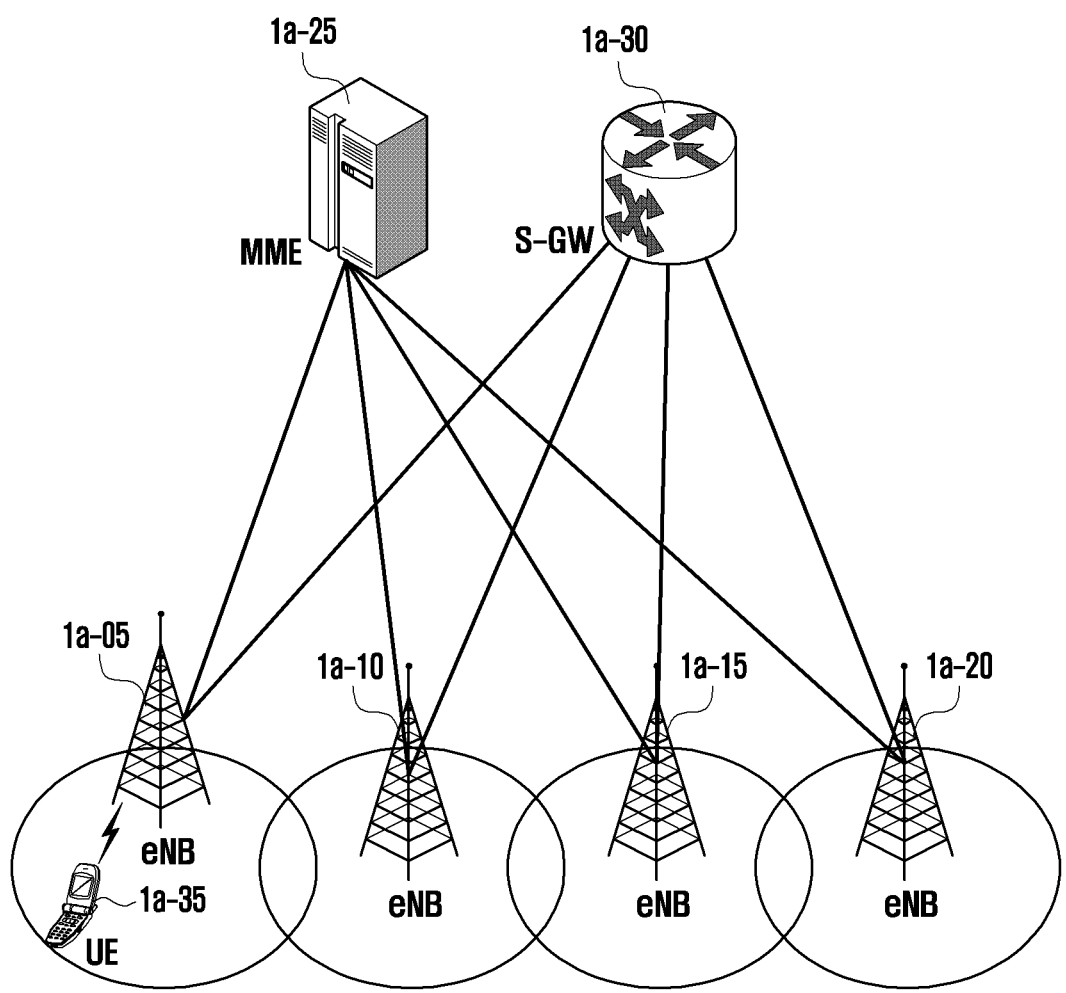
FIG. 1A illustrates the structure of an LTE system to which the disclosure can be applied.

FIG. 1A illustrates the structure of an LTE system to which the disclosure can be applied.

Referring to FIG. 1A, a radio access network of the LTE system includes next-generation base stations (hereinafter, referred to as Evolved Node Bs (ENBs), Node Bs, or base stations) 1a-05, 1a-10, 1a-15, and 1a-20, a Mobility Management Entity (MME) 1a-25, and a Serving GateWay (S-GW) 1a-30. A user terminal (hereinafter, referred to as a User Equipment (UE) or a terminal) 1a-35 accesses an external network through the ENBs 1a-05 to 1a-20 and the S-GW 1a-30.

In FIG. 1A, the ENBs 1a-05 to 1a-20 correspond to the conventional node Bs of the UMTS system. The ENB is connected to the UE 1a-35 through a radio channel, and performs a more complicated role than that of the conventional node B. In the LTE system, since all user traffic including a real-time service such as Voice over IP (VoIP) via an Internet protocol are served through a shared channel, an apparatus for collecting and scheduling status information on buffer statuses of UEs, available transmission power status, and channel statuses is required, and the ENBs 1a-05 to 1a-20 may serve as this apparatus. One ENB generally controls a plurality of cells. For, example, in order to implement a transmission rate of 100 Mbps, the LTE system uses an Orthogonal Frequency Division Multiplexing (OFDM) scheme as a radio access technology in a bandwidth of 20 MHz. Further, an Adaptive Modulation and Coding (AMC) scheme of determining a modulation scheme and a channel coding rate is applied depending on the channel status of the terminal. The S-GW 1a-30 is a device for providing a data bearer, and generates or removes the data bearer under a control of the MME 1a-25. The MME is a device for performing not only a function of managing mobility of the terminal but also various control functions and is connected to a plurality of eNBs.

Figure 1B:
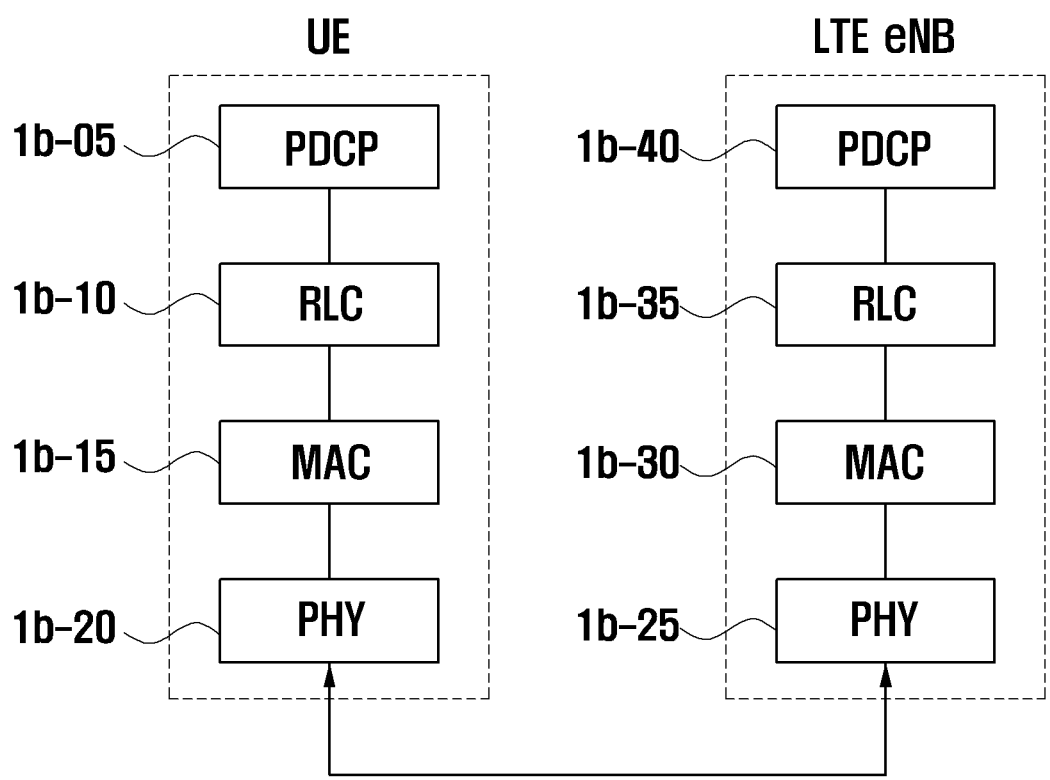
FIG. 1B illustrates the structure of a wireless protocol in the LTE system to which the disclosure can be applied.

FIG. 1B illustrates the structure of a wireless protocol in the LTE system to which the disclosure can be applied.

Referring to FIG. 1B, the terminal and the ENB include Packet Data Convergence Protocols (PDCPs) 1b-05 and 1b-40, Radio Link Controls (RLCs) 1b-10 and 1b-35, and Medium Access Controls (MACs) 1b-15 and 1b-30 in the wireless protocol of the LTE system. The Packet Data Convergence Protocols (PDCPs) 1b-05 and 1b-40 perform an operation of compressing/reconstructing an IP header. Main functions of the PDCP are described below.

- Header compression and decompression function ((Header compression and decompression: ROHC only)
- User data transmission function (Transfer of user data)
- Sequential delivery function (In-sequence delivery of upper layer PDUs at PDCP re-establishment procedure for RLC AM)
- Reordering function (For split bearers in DC (only support for RLC AM): PDCP PDU routing for transmission and PDCP PDU reordering for reception)
- Duplicate detection function (Duplicate detection of lower layer SDUs at PDCP re-establishment procedure for RLC AM)
- Retransmission function (Retransmission of PDCP SDUs at handover and, for split bearers in DC, of PDCP PDUs at PDCP data-recovery procedure, for RLC AM)
- Ciphering and deciphering function (Ciphering and deciphering)
- Timer-based SDU removal function (Timer-based SDU discard in uplink)

Radio Link Controls (RLCs) 1b-10 and 1b-35 reconfigure a PDCP Packet Data Unit (PDU) to be the appropriate size and perform an ARQ operation. Main functions of the RLC are described below.

- Data transmission function (Transfer of upper layer PDUs)
- ARQ function (Error Correction through ARQ (only for AM data transfer))
- Concatenation, segmentation, and reassembly function (Concatenation, segmentation, and reassembly of RLC SDUs (only for UM and AM data transfer))
- Re-segmentation function (Re-segmentation of RLC data PDUs (only for AM data transfer))
- Reordering function (Reordering of RLC data PDUs (only for UM and AM data transfer)
- Duplication detection function (only for UM and AM data transfer))
- Error detection function (Protocol error detection (only for AM data transfer))
- RLC SDU deletion function (RLC SDU discard (only for UM and AM data transfer))
- RLC re-establishment function (RLC re-establishment)

The MACs 1b-15 and 1b-30 are connected with various RLC layer devices included in one terminal, and perform an operation for multiplexing RLC PDUs to the MAC PDU and demultiplexing the RLC PDUs from the MAC PDU. Main functions of the MAC are described below.

- Mapping function (Mapping between logical channels and transport channels)
  - Multiplexing and demultiplexing function (Multiplexing/demultiplexing of MAC SDUs belonging to one or different logical channels into/from Transport Blocks (TB) delivered to/from the physical layer on transport channels)
- Scheduling information report function (Scheduling information reporting)
- HARQ function (Error correction through HARQ)
- Logical channel priority control function (Priority handling between logical channels of one UE)
- Terminal priority control function (Priority handling between UEs by means of dynamic scheduling)
- MBMS service identification function (MBMS service identification)

Transport format selection function (Transport format selection)

Padding function (Padding)

The PHY layers 1b-20 and 1b-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 1C:
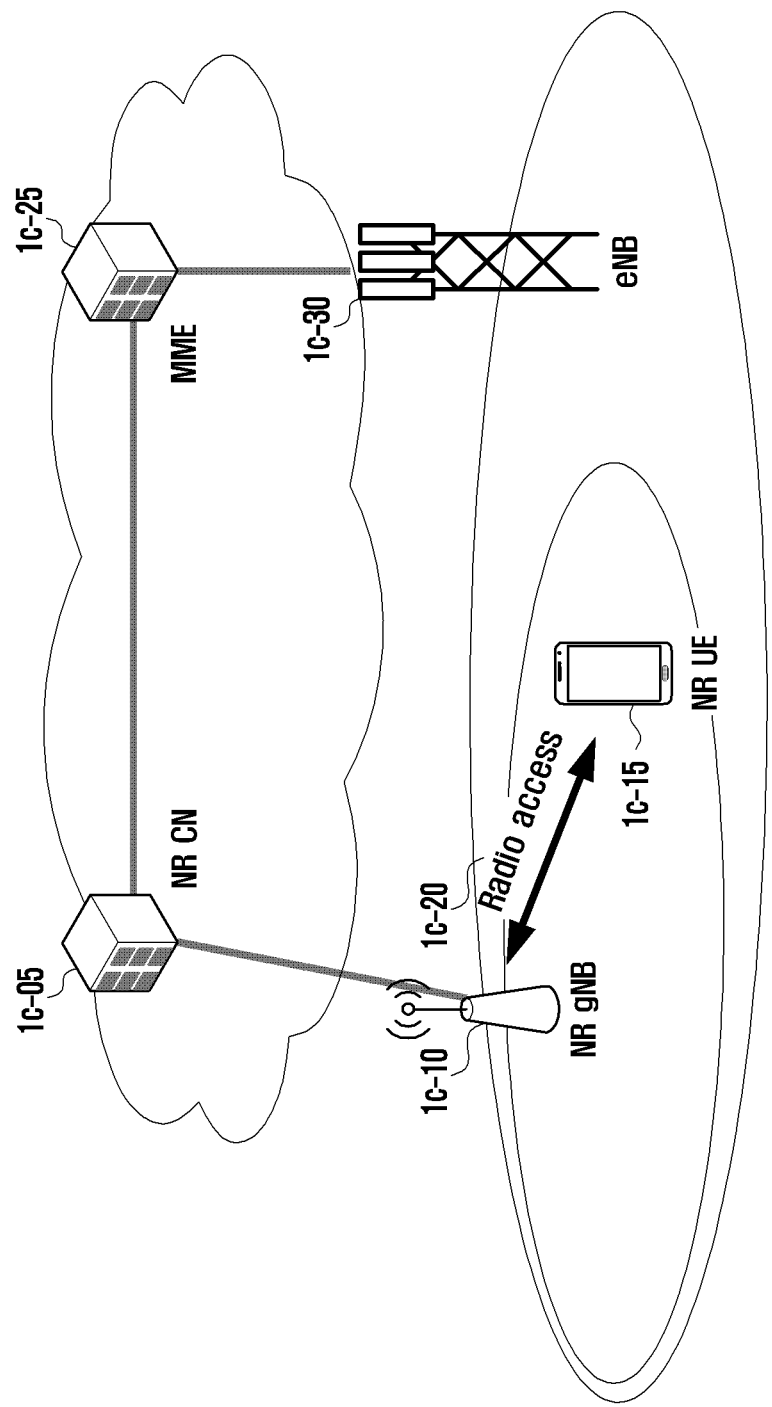
FIG. 1C illustrates the structure of a next-generation mobile communication system to which the disclosure can be applied.

FIG. 1C illustrates the structure of a next-generation mobile communication system to which the disclosure can be applied.

Referring to FIG. 1C, a radio access network of a next-generation mobile communication system (hereinafter, NR or 5G) includes a next-generation base station 1c-10 (hereinafter, referred to as a new radio node B, an NR gNB, or an NR base station) and a New Radio Core Network (NR CN) 1c-05. A user terminal 1c-15 (hereinafter, referred to as a New Radio User Equipment (NR UE) or a terminal) accesses an external network through the NR gNB 1c-10 and the NR CN 1c-05.

In FIG. 1C, the NR gNB 1c-10 corresponds to an evolved Node B (eNB) of the conventional LTE system. The NR gNB may be connected to an NR UE 1c-15 through a radio channel and may provide better service than the conventional node B. Since all user traffic is served through a shared channel in the next-generation mobile communication system, a device for collecting and scheduling status information such as channel statuses of UEs, available transmission power statuses, and channel statuses is required, and the NR NB 1c-10 serves as the device. One NR gNB generally controls a plurality of cells. The NR gNB may have a bandwidth wider than the conventional maximum bandwidth in order to implement super-high-speed data transmission compared to conventional LTE and may apply Orthogonal Frequency Division Multiplexing (OFDM) through radio access technology and further apply beam-forming technology. Further, an Adaptive Modulation and Coding (AMC) scheme of determining a modulation scheme and a channel coding rate is applied depending on the channel status of the terminal. The NR CN 1c-05 performs a function of supporting mobility, configuring a bearer, and configuring a QoS. The NR CN is a device for performing a function of managing the mobility of the terminal and various control functions, and is connected to a plurality of base stations. Further, the next-generation mobile communication system may interwork with the conventional LTE system, and the NR CN is connected to an MME 1c-25 through a network interface. The MME is connected to an eNB 1c-30, which is a conventional base station.

Figure 1D:
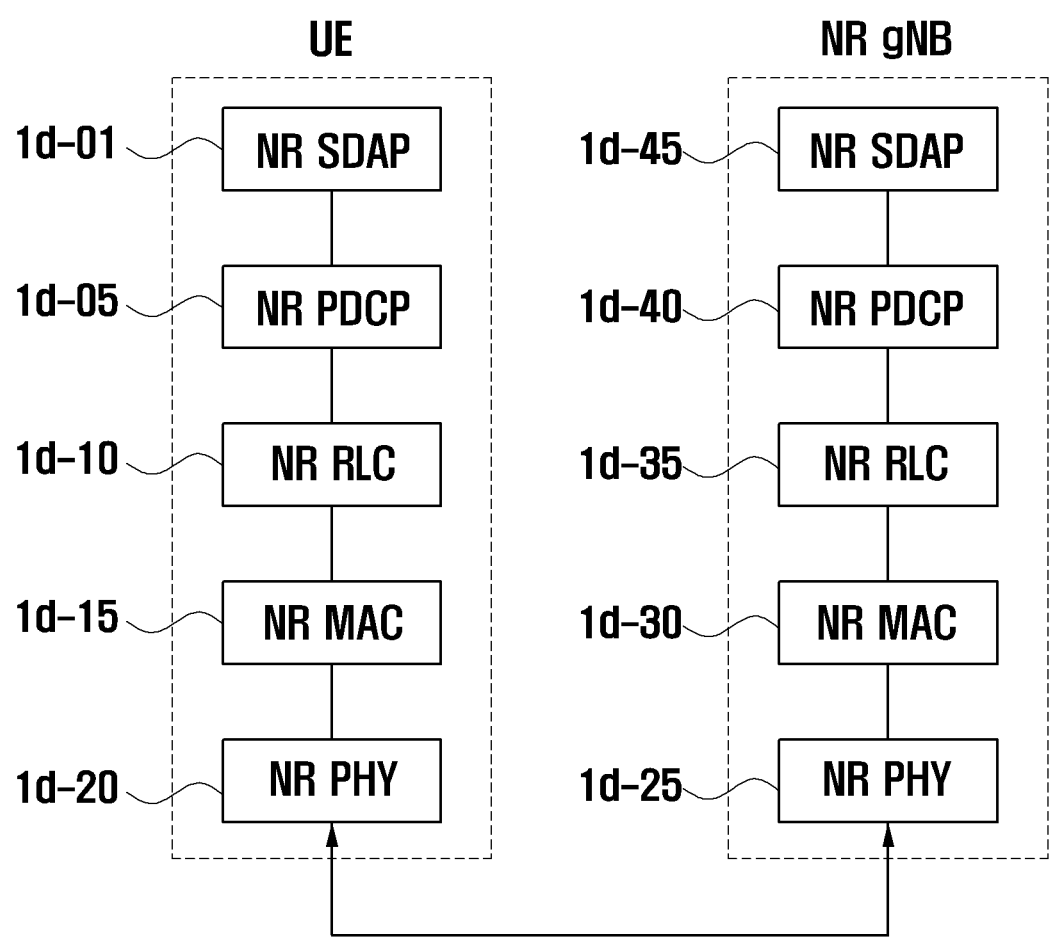
FIG. 1D illustrates the structure of a wireless protocol of the next-generation mobile communication system to which the disclosure can be applied.

FIG. 1D illustrates the structure of a wireless protocol of the next-generation mobile communication system to which the disclosure can be applied.

Referring to FIG. 1D, the wireless protocol of the next-generation mobile communication system includes NR SDAPs 1d-01 and 1d-45, NR PDCPs 1d-05 and 1d-40, NR RLCs 1d-10 and 1d-35, and NR MACs 1d-15 and 1d-30 in the terminal and the NR gNB.

The main functions of the NR SDAPs 1d-01 and 1d-45 may include some of the following functions.

User data transmission function (transfer of user-plane data)

Function of mapping QoS flow and a data bearer for uplink and downlink (mapping between a QoS flow and a DRB for both DL and UL)

Function of marking a QoS flow ID for uplink and downlink (marking QoS flow ID in both DL and UL packets)

Function of mapping reflective QoS flow to a data bearer for uplink SDAP PDUs (reflective QoS flow to DRB mapping for the UL SDAP PDUs)

With respect to the SDAP layer device, the terminal may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the terminal updates or reconfigures information on mapping of QoS flow and a data bearer in uplink and downlink. The SDAP header may include QoS flow ID information indicating the QoS. The QoS information may be used as data-processing-priority or scheduling information to support a seamless service.

The main functions of the NR PDCPs 1d-05 and 1d-40 may include some of the following functions.

Header compression and decompression function (Header compression and decompression: ROHC only)

User data transmission function (Transfer of user data)

Sequential delivery function (In-sequence delivery of upper layer PDUs)

Non-sequential delivery function (Out-of-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU removal function (Timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the recorded data, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 1d-10 or 1d-35 may include some of the following functions.

Data transmission function (Transfer of upper layer PDUs)

Sequential delivery function (In-sequence delivery of upper layer PDUs)

Non-sequential delivery function (Out-of-sequence delivery of upper layer PDUs)

ARQ function (Error correction through ARQ)

Concatenation, segmentation, and reassembly function (Concatenation, segmentation, and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU deletion function (RLC SDU discard)

RLC re-establishment function (RLC re-establishment)

The sequential delivery function (In-sequence delivery) of the NR RLC device is a function of sequentially transferring RLC SDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, a function of, if there is a lost RLC SDU, sequentially transferring only RLC SDUs preceding the lost RLC SDU to the higher layer, a function of, if a predetermined timer expires even though there is a lost RLC SDU, sequentially transferring all RLC SDUs received before the timer starts to the higher layer, or a function of, if a predetermined timer expires even though there is a lost RLC SDU, sequentially transferring all RLC SDUs received up to that point in time to the higher layer. Further, the NR RLC device may process the RLC PDUs sequentially in a reception order thereof (according to an arrival order regardless of a serial number or a sequence number) and may transfer the RLC PDUs to the PDCP device regardless of the sequence thereof (out-of-sequence delivery). In the case of segments, the NR RLC device may receive segments which are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 1d-15 and 1d-30 may be connected to a plurality of NR RLC layer devices configured in one terminal, and the main functions of the NR MACs may include some of the following functions.

Mapping function (Mapping between logical channels and transport channels)
        Multiplexing and demultiplexing function (Multiplexing/demultiplexing of MAC SDUs)
    Scheduling information report function (Scheduling information reporting)
    HARQ function (Error correction through HARQ)
    Logical channel priority control function (Priority handling between logical channels of one UE)
    Terminal priority control function (Priority handling between UEs by means of dynamic scheduling)
    MBMS service identification function (MBMS service identification)
    Transport format selection function (Transport format selection)
    Padding function (Padding)

The NR PHY layers 1d-20 and 1d-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

The disclosure proposes a method of rapidly activating carrier aggregation and saving a terminal battery in the next-generation mobile communication system.

The network or the base station may configure a Special cell (Spcell) (Pcell and PScell) and a plurality of Scells in the terminal. The Spcell refers to a Primary cell (Pcell) when the terminal communicates with one base station, and may indicate a Pcell of a master base station or a Primary Secondary cell (PScell) of a secondary base station when the terminal communicates with two base stations (the master base station and the secondary base station). The Pcell or the PScell may be a main cell used when the base station communicates with the terminal in each MAC layer device. For example, the Pcell or the PScell may be a cell which gets the timing right for synchronization, performs random access, transmits an HARQ ACK/NACK feedback through PUCCH transmission resources, and exchanges most control signals. A technology in which the NR gNB operates a plurality of Scells as well as the Spcell to increase uplink or downlink transmission resources is referred to as carrier aggregation.

Upon receiving the configuration of the Spcell and the plurality of Scells, the terminal may receive a configuration of a mode for each Scell. The mode of the Scell may include an active mode and a deactivated mode. In the active mode, the terminal may exchange uplink or downlink data with the NR gNB in the active mode Scell (or an activated BWP of the Scell), monitor a Physical Downlink Control Channel (PDCCH) to identify an indication of the NR gNB, measure a channel for the downlink of the active mode Scell (or the activated BWP of the Scell), periodically report measurement information to the NR gNB, and periodically transmit a pilot signal (Sounding Reference Signal: SRS) to the NR gNB to allow the NR gNB to measure an uplink channel However, in the deactivated mode, the terminal may not transmit or receive data to or from the NR gNB in the Scell, may not monitor a PDCCH to identify an indication of the NR gNB, may not measure a channel, may not report measurement, and may not transmit a pilot signal.

Accordingly, the NR gNB may first configure frequency measurement configuration information in the terminal in order to activate all Scells in the deactivated mode. The terminal may perform cell or frequency measurement on the basis of the frequency measurement configuration information. After receiving the cell or frequency measurement report of the terminal, the NR gNB may activate the deactivated Scells on the basis of the frequency/channel measurement information. Accordingly, much latency is generated when the NR gNB activates carrier aggregation for the terminal.

The disclosure proposes a dormant mode for the Scell (or BWP) to reduce latency and save a terminal battery.

In the dormant mode, the terminal may not transmit or receive data to or from the NR gNB in the dormant Scell or the dormant BandWidth Part (BWP), may not monitor a PDCCH to identify an indication of the NR gNB, and may not transmit a pilot signal. However, the terminal may measure a channel and report a measurement result for the measured frequency/cell/channel periodically or when an event is generated according to the configuration of the NR gNB. Accordingly, the terminal neither monitors the PDCCH nor transmits the pilot signal in the dormant Scell or the dormant BWP, thereby saving the battery compared to the active mode. Unlike in the deactivated mode, the terminal transmits a channel measurement report, and thus the NR gNB may use carrier aggregation by rapidly activating the dormant Scell or the dormant BWP on the basis of the measurement report.

Since a frequency of a notably high band can be used in the next-generation mobile communication system, a frequency bandwidth may also be very wide. However, in terminal implementation, completely supporting the very wide bandwidth requires high implementation complexity, which incurs high costs. Accordingly, the next-generation mobile communication system may introduce the concept of a BandWidth Part (BWP), and thus a plurality of BWPs may be configured in one cell (Spcell or Scell) and the terminal may transmit and receive data in one or a plurality of BWPs according to an indication of the NR gNB.

The disclosure proposes a status transition method and a detailed operation thereof in consideration of an Scell and a plurality of BWPs configured in the Scell when a dormant mode is introduced. Further, the disclosure proposes a method of managing the dormant mode in units of Scells (Scell-level) and transitioning a status and a detailed operation of the BWP according to each mode (active mode, deactivated mode, or dormant mode).

In the disclosure, the BWP may be used without distinction between the uplink and the downlink, and the meaning thereof may be each of an uplink BWP and a downlink BWP according to the context.

Figure 1E:
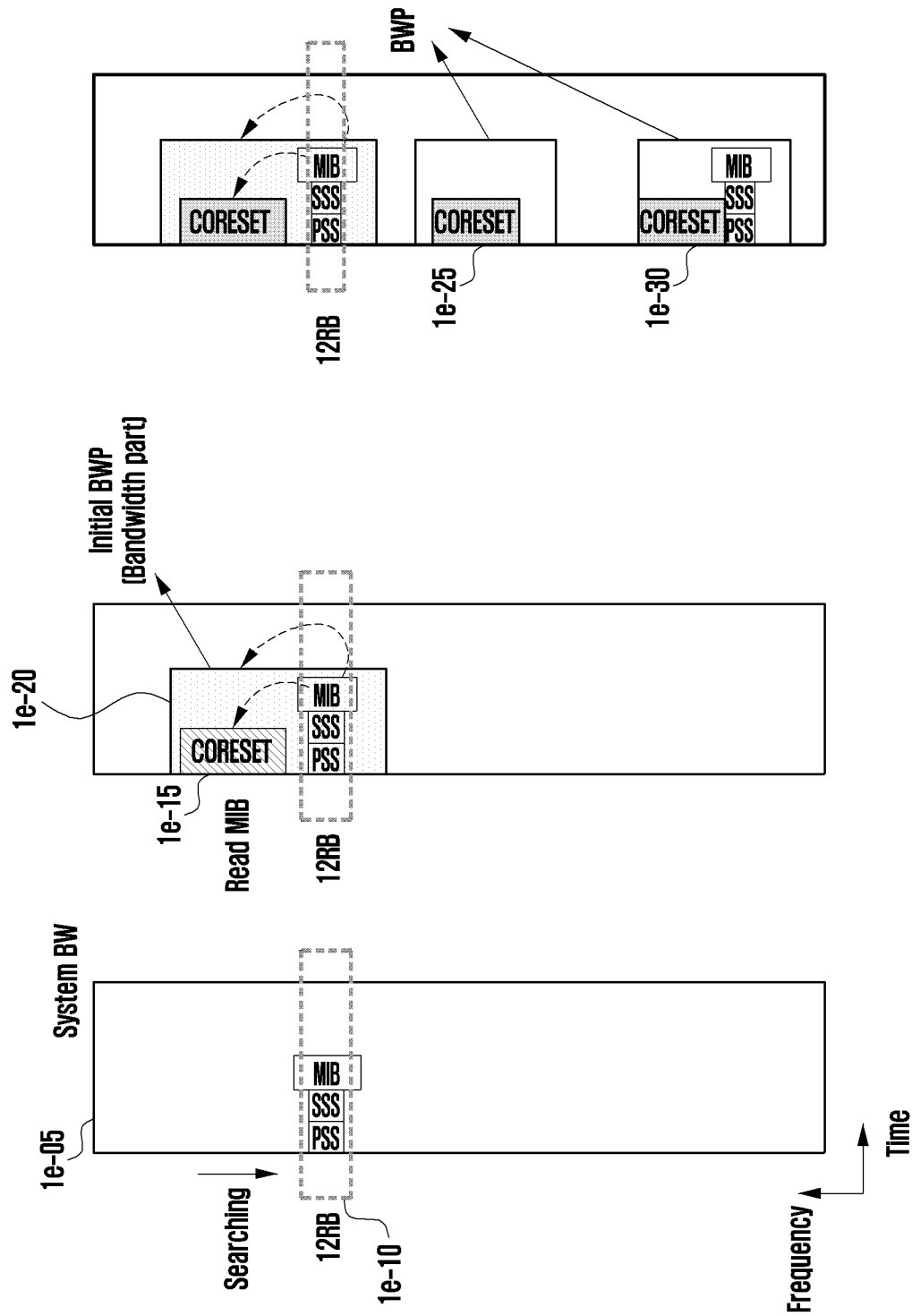
FIG. 1EA illustrates a procedure of serving a terminal through the efficient use of a very wide frequency bandwidth in a next-generation mobile communication system of the disclosure.
Figure 1E:
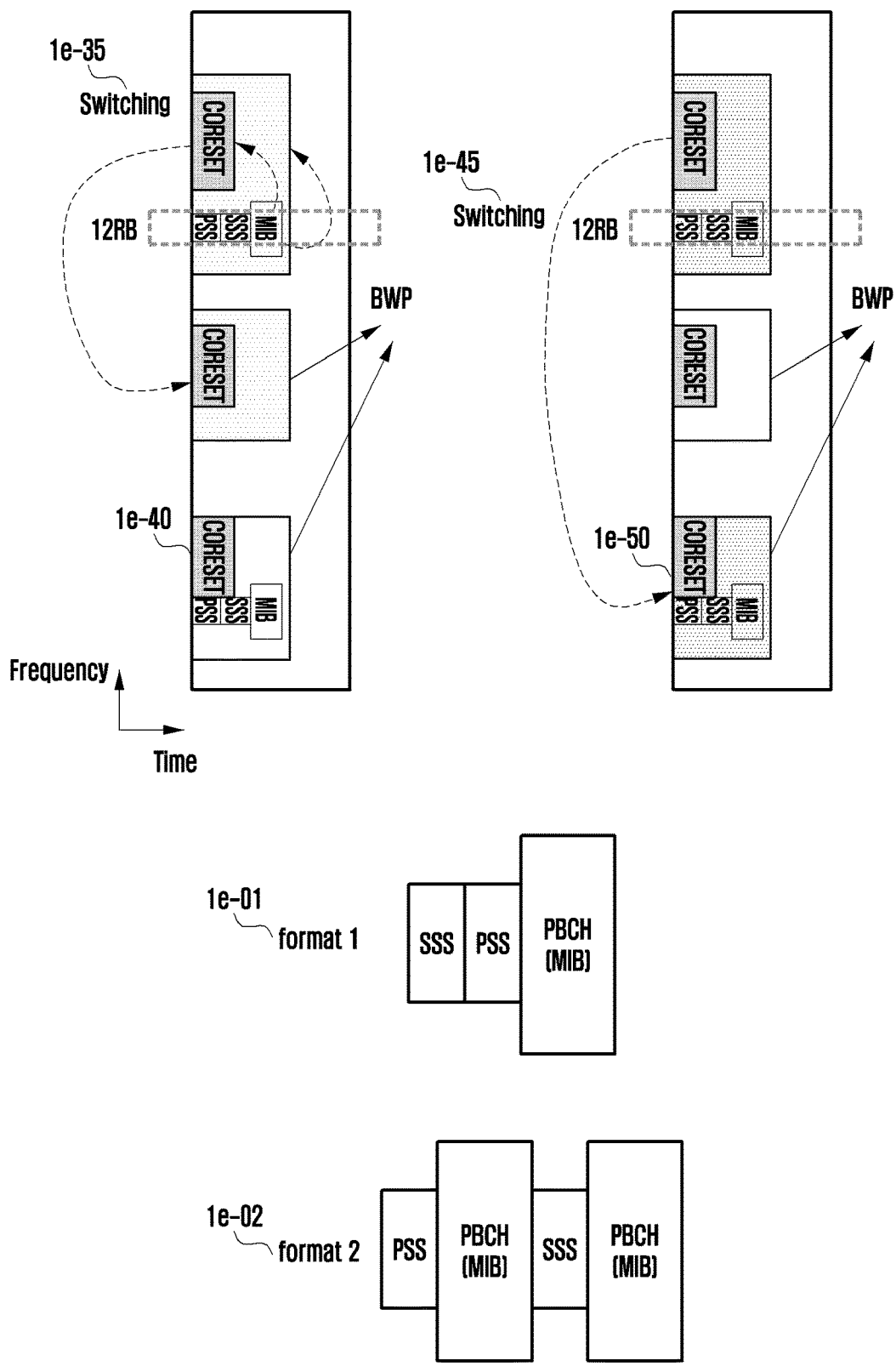

FIG. 1EA and FIG. 1EB illustrate a procedure of serving the terminal through the efficient use of a very wide frequency BWP in the next-generation mobile communication system of the disclosure.

In FIG. 1EA and FIG. 1EB, a method of providing service to UEs having different capabilities or categories by efficiently using a very wide frequency BWP and saving a battery in the next-generation mobile communication system is described.

One cell in which the NR gNB provides service may serve a very wide frequency BWP as indicated by reference numeral 1e-05. However, in order to provide service to UEs having different capabilities, the wide frequency BWP may be divided into a plurality of BWPs to manage one cell.

First, the terminal of which power is initially turned on may search the entire frequency band provided by a service provider (PLMN) in units of predetermined resource blocks (for example, in units of 12. Resource Blocks (RBs)). For example, the terminal may start discovering a Primary Synchronization Sequence (PSS)/Secondary Synchronization Sequence (SSS) in the entire system BWP in units of resource blocks, as indicated by reference numeral 1e-10. If the terminal searches for the PSS/SSS 1e-01 or 1e-02 in units of resource blocks and then detects the signals, the terminal may read the signals, analyze (decode) the signals, and identify a boundary between a subframe and a radio transmission resource frame (radio frame). Accordingly, the terminal may divide subframes in units of 1 ms and synchronize a downlink signal with the NR gNB. The Resource Block (RB) is the size of a predetermined frequency resource and a predetermined time resource, and may be defined as a two-dimensional unit. For example, time resources may be defined in units of 1 ms, and frequency resources may be defined as 12 subcarriers (1 carrier×15 kHz=180 kHz). If the terminal completes synchronization, the terminal may identify information on a control resource set (CORESET) by checking a Master system Information Block (MIB) or Minimum System Information (MSI) and identify initial access BandWidth Part (BWP) information, as indicated by reference numerals 1e-15 and 1e-20. CORE-SET information refers to the location of time/frequency transmission resources through which a control signal is transmitted from the NR gNB, and may be, for example, the location of resources through which a PDCCH channel is transmitted. The CORESET information is information indicating resources through which first system information (System Information Block 1: SIB 1) is transmitted and indicates frequency/time resources through which a PDCCH is transmitted. The terminal may identify information on an initial BWP by reading the first system information. As described above, if the terminal completes synchronization of the downlink signal with the NR gNB and is able to receive a control signal, the terminal may perform a random-access procedure in an initial BWP of a cell on which the terminal camps, make a request for configuring an RRC connection, receive an RRC message, and make an RRC connection configuration.

In the RRC connection configuration, a plurality of BWPs may be configured per cell (Pcell, Pscell, Spcell, or Scell). A plurality of BWPs may be configured for the downlink within one cell, and separately, a plurality of BWPs may be configured for the uplink.

The plurality of BWPs may be indicated and configured by BWP identifiers to be used as initial BWPs, default BWPs, or first active BWPs.

The initial BWP may be used as a cell-specific BWP, one of which exists per cell, and may be used as a BWP in which the terminal initially accessing the cell may configure the connection in the cell through a random-access procedure or in which the terminal configuring the connection may perform synchronization. The NR gNB may configure an initial downlink BWP to be used in downlink and an initial uplink BWP to be used in uplink for each cell. Configuration information of the initial BWP may be broadcasted through first system information (system information 1: SIB 1) indicated by the CORESET, and may be configured again in the terminal which accesses the NR gNB through an RRC message. The initial BWP may be used while being designated with BWP identifier number 0 in each of the uplink and the downlink. For example, all UEs accessing the same cell may equally designate the same initial BWP by the BWP identifier number 0 and use the same. This confers an advantage of easily performing a contention-based random-access procedure because the NR gNB can transmit a random-access response (RAR) message in the initial BWP, which all UEs can read, during the random-access procedure.

The first active BWP may be UE-specifically configured. The NR gNB may indicate the first active BWP by designating the same by the BWP identifier among a plurality of BWPs. The first active BWP may be configured for each of the downlink and the uplink, and include a first active downlink BWP and a first active uplink BWP configured by respective BWP identifiers. When a plurality of BWPs is configured in one cell, the first active BWP may be used to indicate which BWP is to be activated and used first. For example, when a Pcell or Pscell and a plurality of Scells are configured in the terminal and a plurality of BWPs is configured in each Pcell or Pscell or each Scell, if the Pcell, the Pscell, or the Scell is activated, the terminal may activate and use a first active BWP among the plurality of BWPs configured in the Pcell, Pscell, or Scell. For example, the first active downlink BWP may be activated and used for the downlink, and the first active uplink BWP may be activated and used for the uplink.

The operation in which the terminal switches the downlink BWP of the Scell to activate the first active downlink BWP and switches the uplink BWP to activate the first active uplink BWP may be performed when an indication of activation of the Scell or the BWP in the deactivated state is received through an RRC message, MAC control information, or DCI. Further, the operation may be performed when an indication indicating transition of the Scell or the BWP to the dormant state is received through an RRC message, MAC control information, or DCI. This is because the NR gNB can effectively use carrier aggregation by measuring and reporting a frequency/channel for the first active downlink/uplink BWP when a channel measurement report is transmitted in the dormant state since the terminal switches the downlink BWP to the first active downlink BWP to the activate the downlink BWP and switches the uplink BWP to the first active uplink BWP to activate the uplink BWP when the Scell or the BWP is activated.

The default BWP may be UE-specifically configured. The default BWP may be designated to and indicated by an identifier among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message. The timer may start or restart when data transmission/reception is performed in an activated BWP rather than a default BWP or start or restart when the activated BWP is switched to another BWP. If the timer expires, the terminal may fall back or switch the downlink BWP activated in the cell to the default BWP. The switching may mean deactivation of the currently activated BWP and activation of the BWP indicated to be switched. The switching may be triggered by an RRC message, MAC control information (MAC control element), or L1 signaling (Downlink Control Information (DCI) of a PDCCH). The switching may be triggered through an indication of the BWP to be activated or switched to, and the BWP may be indicated by a BWP identifier (for example, 0, 1, 2, 3, or 4).

The reason why the default BWP is used only for the downlink is to make it easy to perform NR gNB scheduling because the NR gNB allows the terminal to receive an indication of the NR gNB (for example, DCI of a PDCCH) by falling back to the default BWP for each cell after a predetermined time. For example, if the NR gNB configures the default BWP of the UEs accessing one cell as the initial BWP, the NR gNB may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the NR gNB, the default BWP may be defined and configured for the uplink and thus used like the default BWP of the downlink.<

Figure 1F:
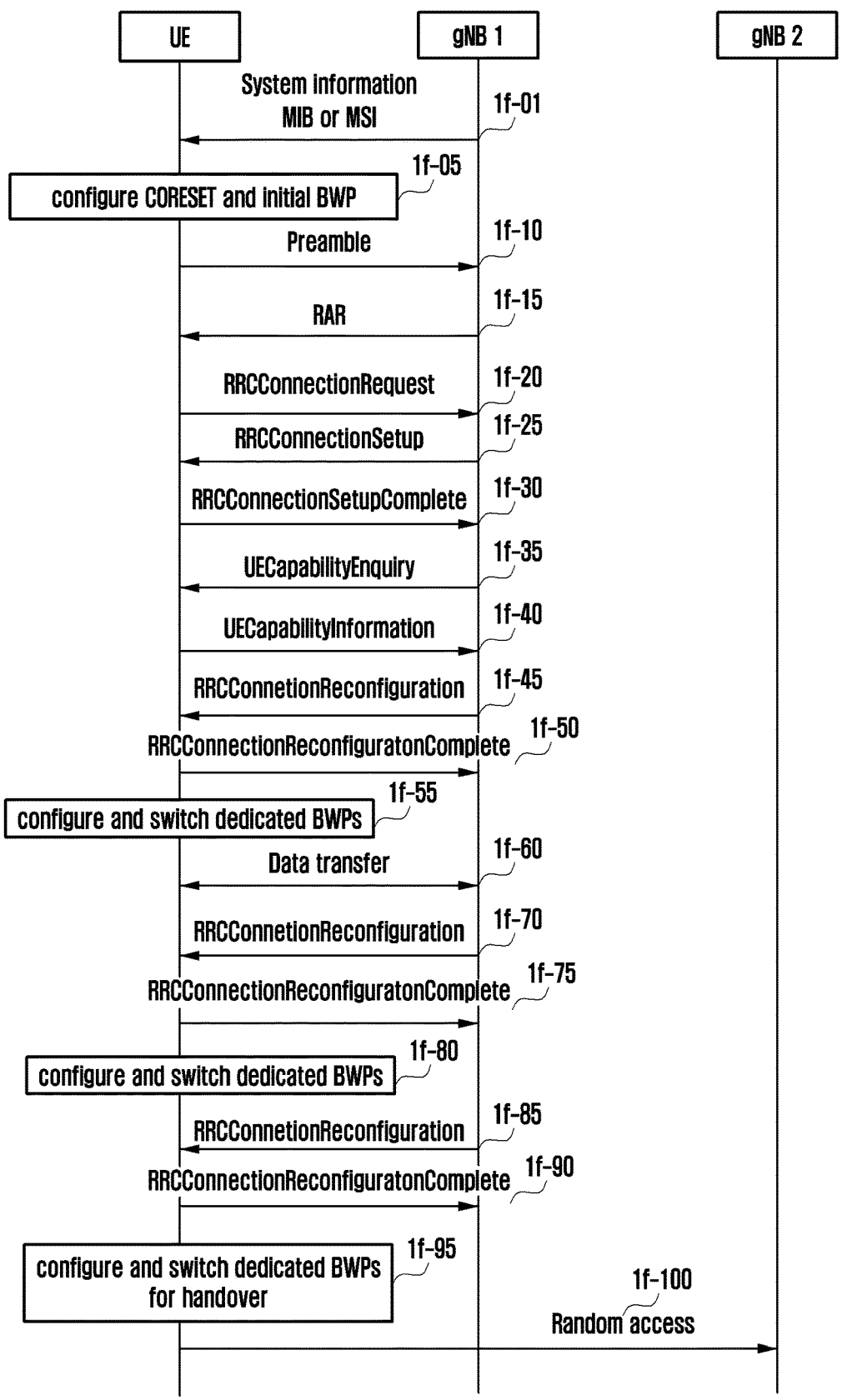
FIG. 1F illustrates a procedure in which the terminal switches from an RRC-idle mode to an RRC-connected mode in the next-generation mobile communication system, which is a method of configuring a plurality of BWPs and configuring a default BWP or a first active BWP.

FIG. 1F illustrates a procedure in which the terminal switches from an RRC-idle mode to an RRC-connected mode in the next-generation mobile communication system, which is a method of configuring a plurality of BWPs and configuring a default BWP or a first active BWP.

One cell in which the gNB provides service may serve a very wide frequency band. First, the terminal may search the entire frequency band provided by a service provider (PLMN) in units of predetermined resource blocks (for example, in units of 12 Resource Blocks (RBs)). For example, the terminal may start discovering a Primary Synchronization Sequence (PSS)/Secondary Synchronization Sequence (SSS) in the entire system bandwidth in units of resource blocks. If the terminal searches for the PSS/SSS in units of resource blocks and then detects the signals, the terminal may read the signals, analyze (decode) the signals, and identify a boundary between a subframe and a radio transmission resource frame (radio frame). If the terminal completes synchronization, the terminal may read system information of a cell on which the terminal currently camps. For example, the terminal may identify information on a control resource set (CORESET) by checking a Master system Information Block (MIB) or Minimum System Information (MSI) and identify initial BandWidth Part (BWP) information by reading system information in steps 1*f*-01 and 1*f*-05. CORESET information refers to the location of time/frequency transmission resources through which a control signal is transmitted from the gNB, and may be, for example, the location of resources through which a PDCCH channel is transmitted.

As described above, if the terminal completes synchronization of the downlink signal with the gNB and is able to receive a control signal, the terminal may perform a random-access procedure in the initial BWP, receive a random-access response, make a request for configuring an RRC connection, receive an RRC message, and configure the RRC connection in steps 1*f*-10, 1*f*-15, 1*f*-20, 1*f*-25, and 1*f*-30.

If the basic RRC connection is completely configured, the gNB may transmit an RRC message which asks about a UE capability to the terminal (UECapabilityEnquiry) in order to identify the UE capability in 1*f*-35. In another method, the gNB may ask the MME or the AMF about the UE capability in order to identify the UE capability. This is because the MME or the AMF may have UE capability information if the terminal previously accessed the terminal. If there is no UE capability information required by the gNB, the gNB may make a request for UE capability to the terminal.

The reason why the gNB transmits the RRC message to the terminal to identify the UE capability is to identify the UE capability, for example, information indicating a frequency band that the terminal can read or on an area of the frequency band that the terminal can read. After identifying the UE capability, the gNB may configure an appropriate BWP in the terminal. If the terminal receives the RRC message which enquires about the UE capability, the terminal may transmit information containing information indicating the range of bandwidth that the terminal supports, indicate an offset from a reference center frequency to indicate a range of bandwidth supported in the current system bandwidth, information directly indicating a start point and an end point of the supported frequency bandwidth, or information indicating a center frequency and a bandwidth in step 1*f*-40.

The BWP may be configured through an RRCSetup message of the RRC connection configuration, an RRCResume message in step 1*f*-25, or an RRCReconfiguration message in step 1*f*-45. The RRC message may include configuration information for the PCell, the Pscell, or a plurality of Scells. The gNB may configure a plurality of BWPs for each cell (PCell, Pscell, or Scell). When a plurality of BWPs are configured for each cell, the gNB may configure a plurality of BWPs to be used for the downlink of each cell. In the case of an FDD system, the gNB may configure a plurality of BWPs to be used for the uplink of each cell to be distinguished from downlink BWPs. In the case of a TDD system, the gNB may configure a plurality of BWPs to be used in common for the downlink and the uplink of each cell.

Information for configuring BWPs of each cell (PCell, Pscell, or Scell) may include at least one piece of the following information.

Downlink BWP configuration information of the cell
Initial downlink BWP configuration information
A plurality of pieces of BWP configuration information and BWP identifiers (IDs) corresponding to the respective BWPs
A BWP identifier indicating a first active downlink BWP
A BWP identifier indicating a default BWP
BWP deactivation timer configuration and a timer value
Uplink BWP configuration information of the cell
Initial uplink BWP configuration information
A plurality of pieces of BWP configuration information and BWP identifiers (IDs) corresponding to the respective BWPs
A BWP ID indicating a first active uplink BWP The configured initial BWP, default BWP, or first active BWP may be used for the following purpose, and may be operated so as to suit the purpose.

The initial BWP may be used as a cell-specific BWP, one of which exists per cell, and may be used as a BWP in which the terminal initially accessing the cell may configure the connection in the cell through a random-access procedure or in which the terminal configuring the connection may perform synchronization. The gNB may configure an initial downlink BWP to be used in downlink and an initial uplink BWP to be used in uplink for each cell. Configuration information of the initial BWP may be broadcasted through first system information (system information 1: SIB 1) indicated by the CORESET, and may be configured again in the terminal which accesses the gNB through an RRC message. The initial BWP may be used while being designated with BWP identifier number 0 in each of the uplink and the downlink. For example, all UEs accessing the same cell may equally designate the same initial BWP by the BWP identifier number 0 and use the same. This confers an advantage of easily performing a contention-based random-access procedure because the gNB can transmit a Random-Access Response (RAR) message in the initial BWP, which all UEs can read, during the random-access procedure.

The first active BWP may be UE-specifically configured. The gNB may indicate the first active BWP by designating a BWP identifier among a plurality of BWPs. The first active BWP may be configured for each of the downlink and the uplink, and a first active downlink BWP and a first active uplink BWP may be configured by respective BWP identifiers. When a plurality of BWPs is configured in one cell, the first active BWP may be used to indicate which BWP is to be activated and used first. For example, when a Pcell or Pscell and a plurality of Scells are configured in the terminal and a plurality of BWPs is configured in each Pcell or Pscell or each Scell, if the Pcell, the Pscell, or the Scell is activated, the terminal may activate and use a first active BWP among the plurality of BWPs configured in the Pcell, Pscell, or Scell. For example, the first active downlink BWP may be activated and used for the downlink, and the first active uplink BWP may be activated and used for the uplink.

The operation in which the terminal switches the downlink BWP of the Scell to activate the first active downlink BWP and switches the uplink BWP to activate the first active uplink BWP may be performed when an indication of activation of the Scell or the BWP in the deactivated state is received through an RRC message, MAC control information, or DCI. Further, the operation may be performed when an indication indicating transition of the Scell or the BWP to the dormant state is received through an RRC message, MAC control information, or DCI. This is because the gNB can effectively use carrier aggregation by measuring and reporting a frequency/channel for the first active downlink/uplink BWP when a channel measurement report is transmitted in the dormant state since the terminal switches the downlink BWP to the first active downlink BWP to activate the downlink BWP and switches the uplink BWP to the first active uplink BWP to activate the uplink BWP when the Scell or the BWP is activated.

The default BWP may be UE-specifically configured. The gNB may indicate the default BWP by designating default BWP by a BWP identifier among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP. If the timer expires, the terminal may fall back or switch the downlink BWP activated in the cell to the default BWP. The switching may be a procedure of deactivating the currently activated BWP and activating the BWP to be switched to, and may be triggered through an RRC message, MAC control information (MAC control element), or L1 signaling (downlink control information (DCI) of a PDCCH). The switching may be triggered through an indication of the BWP to be activated or switched to, and the BWP may be indicated by a BWP identifier (for example, 0, 1, 2, 3, or 4).

The reason why the default BWP is used only for the downlink is to make it easy to perform gNB scheduling because the gNB allows the terminal to receive an indication of the gNB (for example, DCI of a PDCCH) by falling back to the default BWP for each cell after a predetermined time. For example, if the gNB configures the default BWP of the UEs accessing one cell as the initial BWP, the gNB may continuously transmit a scheduling indication only in the initial BWP after a predetermined time. If the default BWP is not configured through the RRC message, the default BWP may be fall back to the initial BWP by considering the initial BWP as the default BWP when the BWP inactivity timer expires.

In another method, in order to increase implementation freedom of the NR gNB, the default BWP may be defined and configured for the uplink and thus used like the default BWP of the downlink.

In an RRCSetup message of the RRC connection configuration, an RRCResume message of step 1*f*-25, or an RRCReconfiguration message of step 1*f*-45, a state transition timer may be configured to allow the terminal to transition the state by itself even though the terminal does not receive an indication through an RRC message, MAC control information, or DCI of a PDCCH. For example, if a cell deactivation timer (ScellDeactivationTimer) is configured for each Scell and the cell deactivation timer expires, the Scell may transition to the deactivated state. If a cell hibernation timer (ScellHibernationTimer) is configured for each Scell and the cell hibernation timer expires, the Scell may be transitioned to the dormant state. When the cell hibernation timer expires, only the Scell in the activated state transitions to the dormant state, but the Scell in the deactivated state or the dormant state is not transitioned to the dormant state. A dormant cell deactivation timer (dormantScellDeactivationTimer) may be configured for each Scell, and the Scell in the dormant state may be transitioned to the deactivated state. When the dormant cell deactivation timer expires, only the Scell in the dormant state transitions to the deactivated state, but the Scell in the activated state or the deactivated state is not transitioned to the deactivated state. If the cell deactivation timer (ScellDeactivationTimer) and the cell hibernation timer (ScellHibernationTimer) are configured together, the cell hibernation timer (ScellHibernationTimer) is prioritized. For example, if the cell hibernation timer (ScellHibernationTimer) is configured, the corresponding Scell may not be deactivated even if the cell deactivation timer (ScellDeactivationTimer) expires. In other words, if the cell hibernation timer is configured, the Scell first transitions from the activated state to the dormant state due to expiration of the cell hibernation timer, and the cell having transitioned to the dormant state transitions to the deactivated state due to expiration of the dormant cell deactivation timer. Accordingly, if the cell hibernation timer is configured, the cell deactivation timer does not influence the Scell state transition, and if the cell hibernation timer is configured even though the cell deactivation timer expires, the Scell may not be transitioned to the deactivated state.

If the cell deactivation timer is not configured in the RRC message, the terminal may consider the cell deactivation timer to be set to an infinite value.

Further, the gNB may configure frequency measurement configuration information and frequency measurement gap information through an RRC setup message of the RRC connection configuration, the RRCResume message of step 1f-25, or the RRCReconfiguration message of step 1f-45, and the message may include measurement object information. The frequency measurement report object may include information on a BWP in which a Reference Signal (RS)/Synchronization Signal (SS) for measurement is configured, and may also include a center frequency, a bandwidth corresponding to a BWP, and a time pattern that should be applied during measurement. The measurement report gap information may include a measurement gap length corresponding to a time during which measurement is performed, a measurement gap period, and measurement gap start time information. The RS is a signal of the gNB transmitted according to a partial time/frequency pattern in transmission resources of a subframe in which a control signal or a data signal is transmitted, and may be used to determine the strength of a signal of the corresponding BWP or the corresponding cell. The SS is a periodically transmitted synchronization signal such as a PSS or an SSS, and may be used to determine the strength of a signal of the corresponding BWP or the corresponding cell.

As described above, when the RRC connection configuration is completed, the terminal may configure a plurality of BWPs according to the indication configured through the RRC message. In order to save a battery, the terminal may activate one or a fewer bandwidths among the plurality of configured BWPs. For example, the gNB may indicate one BWP to be activated. The gNB may indicate activation of a BWP through an RRC message, MAC control information (MAC CE), or L1 signaling (PHY layer control signal such as a PDCCH) (for example, may indicate whether to perform activation or deactivation through bitmap information) to indicate switching from the initial access BWP to a new BWP. Since there are many new accessing users in the initial access BWP, it may be more advantageous for scheduling to allocate a new BWP and separately manage the connected users. This is because the initial access BWP may be shared and used by all UEs in common rather than being configured in a UE-specific manner. Further, the default BWP may be dynamically indicated through the MAC control information, L1 signaling, or system information (in order to reduce signaling overhead).

Hereinafter, the disclosure newly proposes a dormant state in the next-generation mobile communication system and proposes a method of supporting transition between three states in units of cells.

Figure 1G:
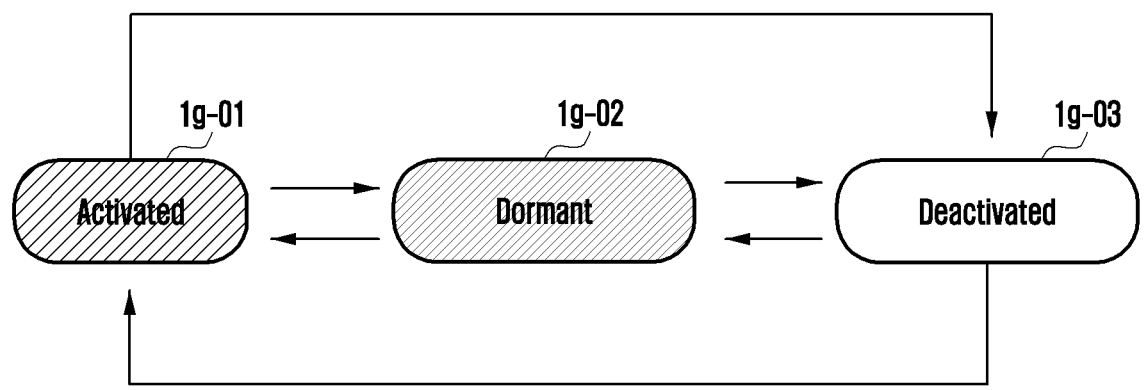
FIG. 1G illustrates a state transition procedure of a cell or BWP proposed in the disclosure.

FIG. 1G illustrates a state transition procedure of a cell or a BWP proposed in the disclosure.

In FIG. 1G, each cell or BWP of the terminal may have an activated state 1g-01, a deactivated state 1g-03, or a dormant state 1g-02, and may perform state transition due to an indication by configuration information of an RRC message, MAC control information, or DCI of a PDCCH.

A state transition operation (active, inactive, or dormant state) of the Scell proposed in the disclosure may be performed as follows.

The case in which an Scell state is configured through an RRC message,

The case in which Scell activation and deactivation MAC CEs are received,

The case in which an Scell hibernation MAC CE is received,

The case in which a cell hibernation timer is not configured in an active-state Scell and a configured cell deactivation timer expires, The case in which a cell hibernation timer configured in an active Scell expires, The case in which a dormant Scell deactivation timer configured in a dormant Scell expires, Further, the state transition operation proposed in the disclosure may have the following characteristics.

An Spcell (Pcell or Pscell) cannot be transitioned to a dormant state, and is always in an activated state. The Spcell performs synchronization with the terminal, is used to transmit and receive a primary control signal, and the connection with the gNB is released if the Spcell is dormant or inactive, so the Spcell should always remain in the activated state.

If a PUCCH is configured, even an Scell cannot be transitioned to the dormant state. The Scell should be in the activated state since there may be another cell that should transmit feedback of HARQ ACK/NACK through the PUCCH.

Due to such a feature, if a cell deactivation timer (ScellDeactivationTimer) is also not applied to the Spcell and the Scell in which the PUCCH is configured, the cell deactivation timer may operate only for other Scells.

A cell hibernation timer (ScellHibernationTimer) may be prioritized over the cell deactivation timer (ScellDeactivationTimer). If one value is set as a timer value through the RRC message, the same value may be applied to all cells. In another method, the gNB may configure different timer values for Scells or BWPs in consideration of the characteristics of each Scell or BWP.

If the Scell is not indicated as being active or dormant through the RRC message, the Scell may basically operate in the deactivated state initially.

Embodiment 1 of the disclosure proposes an operation of each cell (Scell) and a BWP according to each state when an activated state, a deactivated state, or a dormant state proposed in the disclosure is applied in the next-generation mobile communication system using a BWP.

In embodiment 1 of the disclosure, the activated state, the deactivated state, or the dormant state are operated and the state transition is performed in units of Scells. When the state transition is performed in units of Scells, one of a plurality of BWPs belonging to the Scell (a predetermined BWP (for example, a first active BWP), a BWP that has been activated, or the most recently used BWP) performs the state transition according to the state transition of the Scell. For example, if the Scell is transitioned from the activated state to the dormant state, a first active uplink/downlink BWP among a plurality of BWPs belonging to the Scell may be transitioned to the dormant state. This is because the first active uplink/downlink BWP configured through the RRC message is activated when an inactive-state or dormant BWP transitions to the activated state, and thus it is efficient to transmit a channel measurement report of the dormant state in the first active uplink/downlink BWP.

Figure 1H:
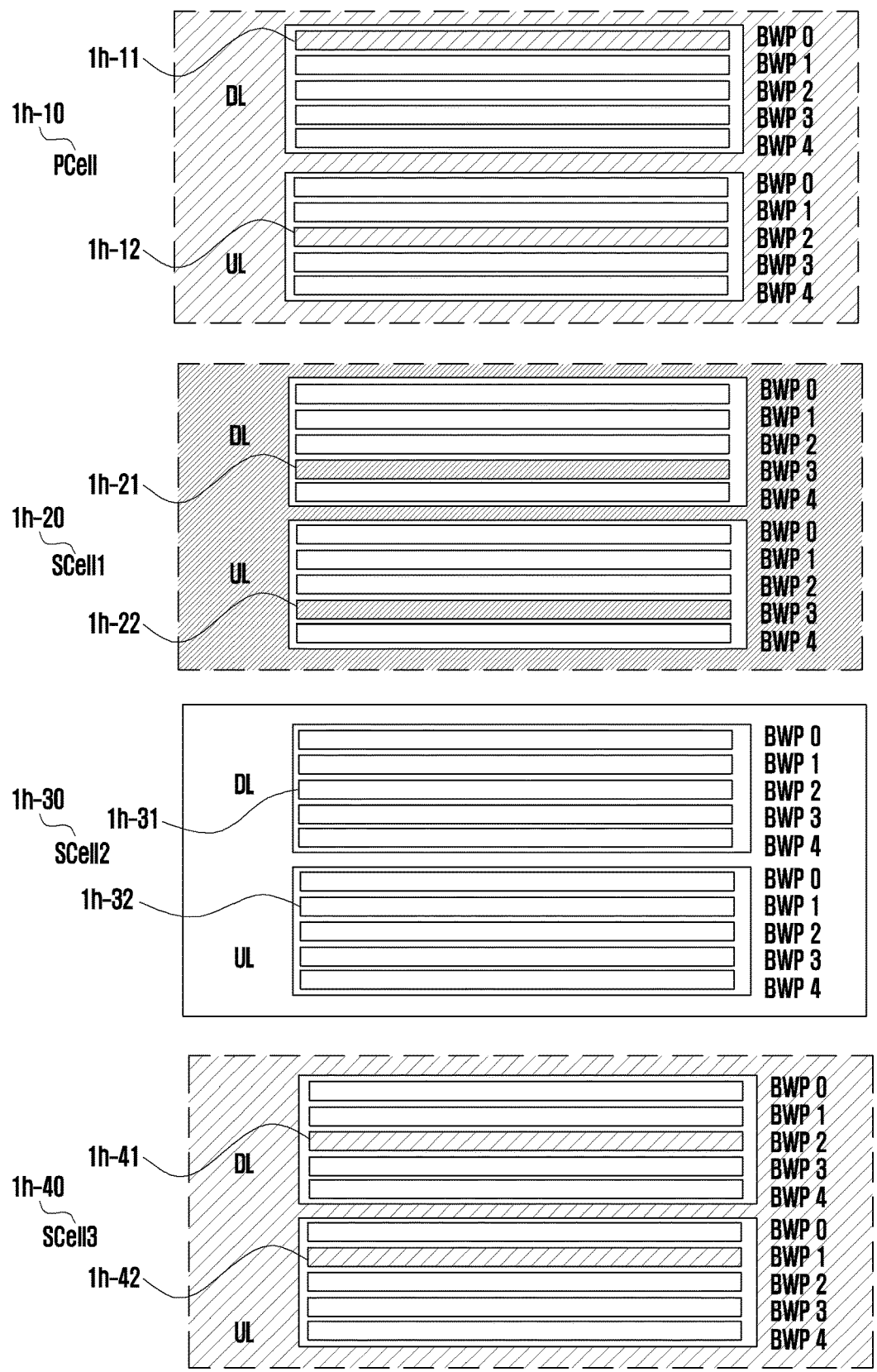
FIG. 1H illustrates a method of transitioning the state of a BWP through state transition in units of Scells proposed in the disclosure.

FIG. 1H illustrates a method of transitioning the state of a BWP through state transition in units of Scells proposed in the disclosure.

In embodiment 1 of the disclosure, the activated state, the deactivated state, or the dormant state are operated, and the state transition is performed in units of Scells as illustrated in FIG. 1H. When the state transition is performed in units of Scells, one of a plurality of BWPs belonging to the Scell (a predetermined BWP (for example, a first active BWP), a BWP which has been activated, or a most recently used BWP) performs the state transition according to the state transition of the Scell.

As illustrated in FIG. 1H, a Pcell 1h-10 may always maintain an activated state to prevent the release of a wireless connection between the gNB and the terminal. In the case of an FDD system, each cell (Pcell or each of Scells) may distinguish frequencies for the downlink and the uplink, and a plurality of BWPs may be configured for each of the downlink and the uplink.

In the disclosure, only one BWP may have an activated state or a dormant state for each of the downlink and the uplink in each Scell, and the remaining BWPs may be in a deactivated state. For example, even though the state transition is performed in units of Scells, only one BWP may perform the state transition according to the state transition of the Scell for each of the uplink and the downlink and perform a BWP operation corresponding thereto.

For example, as illustrated in FIG. 1H, the gNB may configure a first Scell 1h-20, a second Scell 1h-30, and a third Scell 1h-40 in the terminal If the NB transitions the first Scell 1h-20 to the dormant state through an RRC message or a MAC CE, the terminal may transition one BWP 1h-21 among a plurality of BWPs configured for the downlink in the first Scell (for example, a first active downlink BWP) to the dormant state, and may operate the remaining downlink BWPs in the deactivated state. The terminal may transition one BWP 1h-22 among a plurality of BWPs configured for the uplink in the first Scell (for example, a first active uplink BWP) to the dormant state, and may operate the other uplink BWPs in the deactivated state.

If the gNB transitions the second Scell 1h-30 to the deactivated state through an RRC message or a MAC CE, the terminal may transition one BWP 1h-31 among a plurality of BWPs configured for the downlink in the second Scell (for example, a BWP which was previously in the activated state or the dormant state) to the deactivated state, and may operate the other downlink BWPs in the deactivated state. The terminal may transition one BWP 1h-32 among a plurality of BWPs configured for the uplink in the second Scell (for example, a BWP which was previously in the activated state or the dormant state) to the deactivated state, and may operate the other uplink BWPs in the deactivated state.

If the gNB transitions the third Scell 1h-40 to the activated state through an RRC message or a MAC CE, the terminal may transition one BWP 1h-41 among a plurality of BWPs configured for the downlink in the first Scell (for example, a first active downlink BWP) to the activated state, and may operate the remaining downlink BWPs in the deactivated state. The terminal may transition one BWP 1h-42 among a plurality of BWPs configured for the uplink in the first Scell (for example, a first active uplink BWP) to the activated state, and may operate the other uplink BWPs in the deactivated state.

Hereinafter, the disclosure proposes a state transition operation of the Scell and an operation for transitioning a downlink or uplink BWP belonging to the Scell when the gNB indicates the state transition in units of Scells to the terminal.

If a (Scell activation/BWP activation) MAC layer device receives a MAC CE or an RRC message indicating activation of any Scell, some or all of a plurality of the following operations may be performed.

The Scell is activated, and the downlink BWP and the uplink BWP among the plurality of BWPs of the Scell are activated.

A Sounding Reference Signal (SRS) is transmitted to allow the gNB to measure a channel for the uplink in the Scell (or activated BWP). For example, the SRS may be periodically transmitted.

The terminal may report a channel measurement result (CSI, CQI, PMI, RI, PTI, or CRI) for the downlink in the Scell (or activated BWP) according to a configuration of the gNB.

A PDCCH is monitored to read an indication of the gNB in the Scell (or activated BWP).

A PDCCH is monitored to read cross scheduling for the Scell (or activated BWP).

If a PUCCH is configured in the Scell (or activated BWP), the PUCCH is transmitted.

If the Scell is deactivated before an indication indicating activation of the Scell (or if the Scell is in the dormant state before an indication indicating activation of the Scell), A downlink (DL) BWP and an uplink (UL) BWP of the Scell are activated to a first active downlink BWP (indicated by a firstActiveDownlinkBWP-Id) and a first active uplink BWP (indicated by a firstActiveUplinkBWP-id) indicated through an RRC message.

A cell deactivation timer (sCellDeactivationTimer) starts or restarts for the Scell. In another method, the cell deactivation timer may start or restart only when a cell hibernation timer is not configured.

If there are suspended type 1 configuration transmission resources, the type 1 configuration transmission resources may be initialized according to stored type 1 transmission resource configuration or may be initialized again and used. The type 1 configuration transmission resources are periodic (uplink or downlink) transmission resources pre-allocated through an RRC message, which can be used after being activated through the RRC message.

If the cell hibernation timer (sCellHibernationTimer) is configured in the cell,
The cell hibernation timer (sCellHibernationTimer) starts or restarts for the Scell.

A PHR is triggered for the Scell.

If a (Scell deactivation or BWP deactivation) MAC layer device receives a MAC CE or an RRC message indicating deactivation of any Scell, Alternatively, if a cell deactivation timer for the Scell expires and a cell hibernation timer is not configured (if the cell hibernation timer is configured, the cell hibernation timer should be prioritized, and thus expiration of the cell deactivation timer may be ignored. That is, if the cell hibernation timer is configured, the cell state should first transition from the activated state to the dormant state and then from the dormant state to the deactivated state), The terminal may perform some or all of a plurality of the following operations.

The Scell (or a BWP of the Scell) is deactivated.

The cell deactivation timer configured in the Scell is stopped.

A BWP deactivation timer configured for the Scell is stopped.

If there is a BWP configured and activated in the Scell, the BWP is deactivated.

If there is a BWP configured and hibernating in the Scell, the BWP is deactivated.

Periodic downlink transmission resources (DL SPS or configured downlink assignment) or periodic uplink transmission resources (UL SPS or configured uplink grant Type 2) configured in the Scell (or a BWP) may be released (cleared). The term "release (clear)" means that configuration information such as periodicity information configured through the RRC message is stored in the terminal but information on periodic transmission resources activated or indicated through L1 signaling (for example, DCI) is removed (cleared or released) and is not used anymore. The periodic transmission resources may be called type 2 configuration transmission resources.

The periodic transmission resources are released (cleared) if there are PUSCH transmission resources configured for periodic channel measurement information (semi-persistent CSI reporting) for the Scell (or BWP).

The periodic uplink transmission resources (configured uplink grant Type 1 configured through RRC) configured in the BWP of the Scell may be suspended. The term "suspend" means that transmission resource configuration information configured through the RRC message is stored in the terminal but is not used anymore. The periodic transmission resources may be called type 1 configuration transmission resources.

All HARQ buffers configured for the Scell are emptied.

If a PDCCH indicates that there is downlink data (downlink assignment) in any activated Scell or allocates uplink transmission resources (uplink grant), Alternatively, if a PDCCH indicates that there is downlink data (downlink assignment) for the activated Scell in a serving cell for scheduling the activated Scell or allocates uplink transmission resources (uplink grant), Alternatively, for the activated configured Scell, if any MAC PDU is transmitted through pre-configured downlink transmission resources (configured downlink assignment) or pre-configured uplink transmission resources (configured uplink grant), The terminal restarts a cell deactivation timer which is being driven for the Scell. In another method, the cell deactivation timer may restart only when cell hibernation is not configured.

If the cell hibernation timer is configured for the Scell, the cell hibernation timer restarts.

If any Scell or a BWP of the Scell is deactivated or is in a deactivated state,

The terminal does not transmit an SRS for the Scell (or the BWP of the Scell).

The terminal neither performs (CSI, CQI, PMI, RI, PTI, or CRI) nor reports channel measurement for the downlink in the Scell (or the BWP of the Scell).

Uplink data is not transmitted through UL-SCH in the Scell (or the BWP of the Scell).

A random access procedure is not performed for the Scell (or the BWP of the Scell).

The terminal does not monitor a PDCCH in the Scell (or the BWP of the Scell).

The terminal does not monitor a PDCCH for the Scell (or the BWP of the Scell). For example, in the case of cross scheduling, a PDCCH for the Scell is not monitored in a scheduled cell.

A PUCCH or an SPUCCH is not transmitted in the Scell.

If there is a random-access procedure being performed in the Scell during deactivation of the Scell, the random-access procedure may be canceled.

The dormant state is not applied to an Spcell or an Scell in which a PUCCH is configured.

The MAC layer device may operate two timers to efficiently manage the dormant state of the Scell.

Cell hibernation timer (sCellHibernationTimer): operates in an Scell configured in the terminal but does not operate in an Scell in which a PUCCH is configured. If the cell hibernation timer expires, the MAC layer device transitions the Scell in an activated state to a dormant state. For example, the cell hibernation timer may be applied only to the Scell in the activated state. One value configured through RRC is equally applied to the cell hibernation timer of each Scell. The cell hibernation timer is prioritized over the cell deactivation timer. For example, the cell hibernation timer is configured, and if the cell hibernation timer is being driven, the cell deactivation timer is driven or is not transitioned to the deactivated state even though the cell deactivation timer expires, and the cell deactivation timer does not influence the Scell.

Dormant state BWP deactivation timer (dormantBWPDeactivationTimer): operates in an Scell configured in the terminal but does not operate in an Scell in which a PUCCH is configured. If the dormant cell deactivation timer expires, the MAC layer device transitions the Scell in a dormant state to a deactivated state. One value configured through RRC may be equally applied to the dormant cell deactivation timer of each Scell. For example, the dormant cell deactivation timer is applied only to the Scell in the dormant state.

If there is an indication of the dormant state through an RRC message when the Scell is configured, the terminal may transition the Scell to the dormant state. If the dormant state is indicated even in the Scell state configuration of the RRC message for handover or SCG change, the terminal may transition the Scell to the dormant state.

If the MAC layer device receives an indication of the dormant state of the Scell when the Scell is configured through an RRC message, or receives a MAC CE indicating state transition of the Scell to the dormant state, The terminal may perform some or all of a plurality of the following operations.

The Scell (or a BWP of the Scell) is transitioned to the dormant state.

The cell deactivation timer configured or operated in the Scell (or a BWP of the Scell) is stopped.

If a cell hibernation timer is configured in the Scell (or a BWP of the Scell), the cell hibernation timer is stopped.

If a dormant cell deactivation timer starts or restarts in the Scell (or a BWP of the Scell).

A BWP deactivation timer configured for the Scell (or a BWP of the Scell) is stopped. This is to prevent an unnecessary BWP-switching procedure in the Scell.

A downlink BWP of the Scell may be made to hibernate and a channel measurement result may be reported. Further, an uplink BWP of the Scell may be deactivated and not used. This is because the channel is measured only for the downlink BWP in the dormant Scell and the measurement result is reported to the uplink BWP of the Spcell (Pcell or Pscell) or the Scell in which there is a PUCCH.

A downlink (DL) BWP and an uplink (UL) BWP of the Scell are made to hibernate to a first active downlink BWP (indicated by a firstActiveDownlinkBWP-Id) and a first active uplink BWP (indicated by a firstActiveUplinkBWP-id) indicated through an RRC message because the transition of the Scell (or the BWP of the Scell) to the dormant state is indicated. This is because the first active uplink/downlink BWP configured through the RRC message is activated when an inactive-state or dormant BWP transitions to the activated state, and thus it is efficient to transmit a channel measurement report of the dormant state in the first active uplink/downlink BWP. In another method, during the transition to the dormant state, only the downlink BWP may be switched and made to hibernate to the first active downlink BWP. This is because the uplink BWP is also switched and activated to the first active uplink BWP when the Scell is activated. If the active-state BWP is originally the first active downlink or uplink BWP in the Scell before the indication of the dormant state, the BWP may be made to hibernate without the switching operation.

Periodic Downlink transmission resources (DL SPS or configured downlink assignment) or periodic uplink transmission resources (UL SPS or configured uplink grant Type 2) configured in the Scell (or the BWP of the Scell) may be released (cleared). The term "release (clear)" means that configuration information such as periodicity information configured through the RRC message is stored in the terminal but information on periodic transmission resources activated or indicated through L1 signaling (for example, DCI) is removed (cleared or released) and is not used anymore. The proposed method, for example, the operation of releasing (clearing) the configured periodic downlink transmission resources (DL SPS or configured downlink assignment) or the configured periodic uplink transmission resources (UL SPS or configured uplink grant), may be performed only when the Scell transitions from the activated state to the dormant state. This is because there is no information on periodic transmission resources activated or indicated through L1 signaling when the Scell transitions from the deactivated state to the dormant state.

The periodic uplink transmission resources (configured uplink grant Type 1 configured through RRC) configured in the Scell (or BWP of the Scell) may be suspended. The term "suspend" means that transmission resource configuration information configured through the RRC message is stored in the terminal but is not used anymore. The proposed method, for example, the operation of suspending the periodic uplink transmission resources (configured uplink grant type 1) may be performed only when the Scell transitions from the activated state to the dormant state. This is because the periodic transmission resources are not used when the Scell transitions from the deactivated state to the dormant state.

All HARQ buffers configured in the Scell are emptied.

If a cell hibernation timer expires in the activated Scell (or a BWP of the Scell), the terminal transitions the Scell (or a BWP of the Scell) to the dormant state.

The terminal stops a cell deactivation timer configured or operated in the Scell (or a BWP of the Scell).

The terminal stops a cell hibernation timer configured or operated in the Scell (or a BWP of the Scell).

The terminal starts or restarts a dormant cell deactivation timer in the Scell (or a BWP of the Scell).

If a dormant cell deactivation timer configured in a dormant Scell expires,

The Scell (or the BWP of the Scell) transitions to the deactivated state.

The dormant state cell deactivation timer of the Scell (or a BWP of the Scell) is stopped.

If the Scell (or the BWP of the Scell) is in the dormant state,

The terminal does not transmit an SRS for the Scell (or the BWP of the Scell).

The terminal measures (CSI, CQI, PMI, RI, PTI, or CRI) a channel for the downlink according to a configuration of the NR gNB in the Scell (or the BWP of the Scell) and reports the measurement. For example, the terminal may periodically report the channel or frequency measurement.

Uplink data is not transmitted through UL-SCH in the Scell (or the BWP of the Scell).

A random access procedure is not performed for the Scell (or the BWP of the Scell).

The terminal does not monitor a PDCCH in the Scell (or the BWP of the Scell).

The terminal does not monitor a PDCCH for the Scell (or the BWP of the Scell). For example, in the case of cross scheduling, a PDCCH for the Scell is not monitored in a cell in which the scheduling is performed.

A PUCCH or an SPUCCH is not transmitted in the Scell (or the BWP of the Scell).

A downlink BWP of the Scell may be made to hibernate and a channel measurement result may be reported. Further, an uplink BWP of the Scell may be deactivated and not used. This is because the channel is measured only for the downlink BWP in the dormant Scell and the measurement result is reported to the uplink BWP of the Spcell (Pcell or Pscell) or the Scell in which there is a PUCCH.

A downlink (DL) BWP and an uplink (UL) BWP of the Scell are made to hibernate to a first active downlink BWP (indicated by a firstActiveDownlinkBWP-Id) and a first active uplink BWP (indicated by a firstActiveUplinkBWP-id) indicated through an RRC message because the transition of the Scell (or the BWP of the Scell) to the dormant state is indicated. This is because the first active uplink/downlink BWP configured through the RRC message is activated when an inactive-state or dormant BWP transitions to the activated state, and thus it is efficient to transmit a channel measurement report of the dormant state in the first active uplink/downlink BWP. In another method, during the transition to the dormant state, only the downlink BWP may be switched and made to hibernate to the first active downlink BWP. This is because the uplink BWP is also switched and activated to the first active uplink BWP when the Scell is activated. If the active-state BWP is originally the first active downlink or uplink BWP in the Scell before the indication of the dormant state, the BWP may be made to hibernate without the switching operation.

Periodic Downlink transmission resources (DL SPS or configured downlink assignment) or periodic uplink transmission resources (UL SPS or configured uplink grant Type 2) configured in the Scell (or the BWP of the Scell) may be released (cleared). The term "release (clear)" means that configuration information such as periodicity information configured through the RRC message is stored in the terminal but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the Scell transitions from the activated state to the dormant state. This is because there is no information on periodic transmission resources activated or indicated through L1 signaling when the Scell transitions from the deactivated state to the dormant state.

The periodic uplink transmission resources (configured uplink grant Type 1 configured through RRC) configured in the Scell may be suspended. The term "suspend" means that transmission resource configuration information configured through the RRC message is stored in the terminal but is not used anymore. The proposed method, that is, the operation of suspending the periodic uplink transmission resources (configured uplink grant type 1), may be performed only when the Scell transitions from the activated state to the dormant state. This is because the periodic transmission resources are not used when the Scell transitions from the deactivated state to the dormant state.

If there is a random-access procedure being performed during transition of the Scell to the dormant state, the random-access procedure is canceled.

Hereinafter, the disclosure proposes detailed operations of the BWP according to the proposed state transition.

In the disclosure, BWP switching in a specific cell (Spcell, Pcell, Pscell, or Scell) may refer to a procedure of activating a deactivated BWP and deactivating an activated BWP at the same time, a procedure of hibernating a deactivated BWP and deactivating an activated BWP at the same time, or a procedure of hibernating an activated BWP or hibernating a deactivated BWP.

The BWP switching is performed or controlled by L1 signaling (for example, a PDCCH) indicating downlink data or uplink data, an RRC message, or a MAC CE indicating BWP switching, or start of a BWP deactivation timer or a random access.

An embodiment of the efficient BWP operation according to transition of the activated state, deactivated state, or the dormant state of the Scell proposed in the disclosure is described below.

As illustrated in FIG. 1F, for each cell, the gNB may configure a first active downlink BWP (firstActiveDownlinkBWP-ID) for the downlink and a first active uplink BWP (firstActiveUplinkBWP-ID) for the uplink in the terminal through the RRC message.

If the first active downlink/uplink BWP is configured for the Spcell (Pcell or PScell),
  When the RRC message is received and the first active downlink/uplink BWP is configured, an indication of performing switching to a BWP indicated by the first active downlink BWP for the downlink and activating the BWP is made for the downlink. Further, an indication of performing switching to a BWP indicated by the first active uplink BWP for the uplink and activating the BWP is made for the uplink.
  If the RRC message is received and the dormant state is indicated through the RRC message, when the first active downlink/uplink BWP is configured, an indication of performing switching to a BWP indicated by the first active downlink BWP for the downlink and hibernating the BWP is made for the downlink. Further, an indication of performing switching to a BWP indicated by the first active uplink BWP for the uplink and hibernating the BWP is made for the uplink.

If the first active downlink/uplink BWP is configured for the Scell,
  When the Scell is activated (by the MAC CE or the RRC message), an indication of performing switching to a BWP indicated by the first active downlink BWP for the downlink and activating the BWP is made for the downlink according to the first active downlink/uplink BWP configured through the RRC message. Further, an indication of performing switching to a BWP indicated by the first active uplink BWP for the uplink and activating the BWP is made for the uplink.
  When the Scell is hibernated (by the MAC CE or the RRC message), an indication of performing switching to a BWP indicated by the first active downlink BWP for the downlink and hibernating the BWP is made for the downlink according to the first active downlink/uplink BWP configured through the RRC message. Further, an indication of performing switching to a BWP indicated by the first active uplink BWP for the uplink and hibernating the BWP is made for the uplink.
  When the Scell is deactivated (by the MAC CE or the RRC message), the BWP in the activated state or the dormant state, which is currently used for the uplink and downlink, is deactivated.

A detailed embodiment of the efficient BWP operation according to state transition of the activated state, the deactivated state, or the dormant state of the Scell proposed in the disclosure is described below.

In the disclosure, detailed embodiment 1 when the Scell in which the BWP is configured is activated is described below.

When the Scell in which the BWP is configured is activated, the MAC layer device of the terminal may perform some or all of a plurality of procedures below for the BWP configured in the Scell.
  If the Scell receives an indication of transition to the activated state,
    If the Scell was in the deactivated state before receiving an indication indicating activation of the Scell (or if the Scell was in the dormant state before receiving an indication indicating activation of the Scell), A downlink (DL) BWP and an uplink (UL) BWP of the Scell are activated to a first active downlink BWP (indicated by a firstActiveDownlinkBWP-Id) and a first active uplink BWP (indicated by a firstActiveUplinkBWP-id) indicated through an RRC message.

A cell deactivation timer (sCellDeactivationTimer) starts or restarts for the Scell. In another method, the cell deactivation timer may start or restart only when a cell hibernation timer is not configured.

If the cell hibernation timer (sCellHibernationTimer) is configured in the cell, A cell hibernation timer (sCellDeactivationTimer) starts or restarts for the Scell.

In the disclosure, detailed embodiment 2-1 when the Scell in which the BWP is configured is hibernated is described below.

If the Scell receives an indication indicating transition to the dormant state (if the BWP is hibernated), If the Scell was in the deactivated state before receiving an indication indicating hibernation of the Scell (or if the Scell was in the activated state before receiving an indication indicating hibernation of the Scell), A downlink (DL) BWP and an uplink (UL) BWP of the Scell are hibernated to a first active downlink BWP (indicated by a firstActiveDownlinkBWP-Id) and a first active uplink BWP (indicated by a firstActiveUplinkBWP-id) indicated through an RRC message.

The cell deactivation timer (ScellDeactivationTimer) is stopped.

The cell hibernation timer (ScellHibernationTimer) is stopped if the cell hibernation timer was configured.

The dormant cell deactivation timer (dormantScellDeactivationTimer) starts or restarts.

The BWP timer (bwp-InactivityTimer) is stopped. When the BWP timer expires, the downlink (DL) BWP is switched to the default BWP (if the default BWP is configured) or switched to the initial BWP (initial downlink BWP) (if the default BWP is not configured), and thus the BWP in which a channel measurement report is transmitted in the dormant state may be changed. Accordingly, the BWP timer should be stopped.

All HARQ buffers corresponding to the Scell are emptied.

If the cell hibernation timer expires in the Scell,

The Scell (or BWP) is hibernated.

The cell deactivation timer (ScellDeactivationTimer) is stopped.

The cell hibernation timer is stopped.

The dormant cell deactivation timer starts or restarts. The timer starts or restarts so that the state is automatically transitioned to the deactivated state even in the dormant state.

All HARQ buffers corresponding to the Scell are emptied.

If the dormant cell hibernation timer expires in the Scell,

The Scell (or BWP) is deactivated.

The dormant cell deactivation timer is stopped.

In the disclosure, detailed embodiment 2-2 when the Scell in which the BWP is configured is hibernated is described below.

If the Scell receives an indication indicating transition to the dormant state (if the BWP is hibernated), If the Scell was in the deactivated state before receiving an indication indicating hibernation of the Scell (or if the Scell was in the activated state before receiving an indication indicating hibernation of the Scell), The downlink (DL) BWP of the Scell is hibernated to the first active downlink BWP (indicated by firstActiveDownlinkBWP-Id) indicated through an RRC message.

The uplink (UL) BWP of the Scell is switched and hibernated to the first active uplink BWP (indicated by firstActiveUplinkBWP-Id) indicated through an RRC message.

The cell deactivation timer (ScellDeactivationTimer) is stopped.

The cell hibernation timer (ScellHibernationTimer) is stopped if the cell hibernation timer was configured.

The dormant cell deactivation timer (dormantScellDeactivationTimer) starts or restarts.

The BWP timer (bwp-InactivityTimer) is stopped. When the BWP timer expires, the downlink (DL) BWP is switched to the default BWP (if the default BWP is configured) or switched to the initial BWP (initial downlink BWP) (if the default BWP is not configured), and thus the BWP in which a channel measurement report is transmitted in the dormant state may be changed. Accordingly, the BWP timer should be stopped.

All HARQ buffers corresponding to the Scell are emptied.

If the cell hibernation timer expires in the Scell,

The Scell (or BWP) is hibernated.

The cell deactivation timer (ScellDeactivationTimer) is stopped.

The cell hibernation timer is stopped.

The dormant cell deactivation timer starts or restarts. The timer starts or restarts so that the state is automatically transitioned to the deactivated state even in the dormant state.

All HARQ buffers corresponding to the Scell are emptied.

If the dormant cell hibernation timer expires in the Scell,

The Scell (or BWP) is deactivated.

The dormant cell deactivation timer is stopped.

In the disclosure, detailed embodiment 2-3 when the Scell in which the BWP is configured is hibernated is described below.

If the Scell receives an indication indicating transition to the dormant state (if the BWP is hibernated), If the Scell was in the deactivated state before receiving an indication indicating hibernation of the Scell (or if the Scell was in the activated state before receiving an indication indicating hibernation of the Scell), The downlink (DL) BWP of the Scell is hibernated to the first active downlink BWP (indicated by firstActiveDownlinkBWP-Id) indicated through an RRC message.

The uplink (UL) BWP of the Scell is deactivated (when the Scell is activated in the future, advance switching is not needed since switching and activation to the first active downlink BWP is performed, and the uplink BWP may be deactivated since the uplink BWP is not used in the dormant state.

The cell deactivation timer (ScellDeactivationTimer) is stopped.

The cell hibernation timer (ScellHibernationTimer) is stopped if the cell hibernation timer was configured.

The dormant cell deactivation timer (dormantScellDeactivationTimer) starts or restarts.

The BWP timer (bwp-InactivityTimer) is stopped. When the BWP timer expires, the downlink (DL) BWP is switched to the default BWP (if the default BWP is configured) or switched to the initial BWP (initial downlink BWP) (if the default BWP is not configured), and thus the BWP in which a channel measurement report is transmitted in the dormant state may be changed. Accordingly, the BWP timer should be stopped.

All HARQ buffers corresponding to the Scell are emptied.
If the cell hibernation timer expires in the Scell,
The Scell (or BWP) is hibernated.
The cell deactivation (ScellDeactivationTimer) is stopped.
The cell hibernation timer is stopped.
The dormant cell deactivation timer starts or restarts. The timer starts or restarts so that the state is automatically transitioned to the deactivated state even in the dormant state.
All HARQ buffers corresponding to the Scell are emptied.
—If the dormant cell hibernation timer expires in the Scell,
The Scell (or BWP) is deactivated.
The dormant cell deactivation timer is stopped. In the disclosure, detailed embodiment 2-4 when the Scell in which the BWP is configured is hibernated is described below.
If the Scell receives an indication indicating transition to the dormant state (if the BWP is hibernated)
If the Scell was in the deactivated state before receiving the indication indicating hibernation of the Scell
  A downlink (DL) BWP and an uplink (UL) BWP of the Scell are hibernated to a first active downlink BWP (indicated by a firstActiveDownlinkBWP-Id) and a first active uplink BWP (indicated by a firstActiveUplinkBWP-id) indicated through an RRC message.
If the Scell was in the activated state before receiving the indication indicating hibernation of the Scell
  A downlink (DL) BWP and an uplink (UL) BWP of the Scell are switched to a first active downlink BWP (indicated by a firstActiveDownlinkBWP-Id) and a first active uplink BWP (indicated by a firstActiveUplinkBWP-id) indicated through an RRC message.
  The switched first active downlink BWP (indicated by firstActiveDownlinkBWP-Id) and first active uplink BWP (indicated by firstActiveUplinkBWP-id) are hibernated.
The cell deactivation timer (ScellDeactivationTimer) is stopped.
The cell hibernation timer (ScellHibernationTimer) is stopped if the cell hibernation timer was configured.
The dormant cell deactivation timer (dormantScellDeactivationTimer) starts or restarts.
The BWP timer (bwp-InactivityTimer) is stopped. When the BWP timer expires, the downlink (DL) BWP is switched to the default BWP (if the default BWP is configured) or switched to the initial BWP (initial downlink BWP) (if the default BWP is not configured), and thus the BWP in which a channel measurement report is transmitted may be changed from the dormant state. Accordingly, the BWP timer should be stopped.
All HARQ buffers corresponding to the Scell are emptied.
—If the cell hibernation timer expires in the Scell,
The Scell (or BWP) is hibernated.
The cell deactivation timer (ScellDeactivationTimer) is stopped.
The cell hibernation timer is stopped.
The dormant cell deactivation timer starts or restarts. The timer starts or restarts so that the state is automatically transitioned to the deactivated state even in the dormant state.
All HARQ buffers corresponding to the Scell are emptied.
If the dormant cell hibernation timer expires in the Scell,
The Scell (or BWP) is deactivated.
The dormant cell deactivation timer is stopped.

In the disclosure, detailed embodiment 2-5 when the Scell in which the BWP is configured is hibernated is described below.
If the Scell receives an indication indicating transition to the dormant state (if the BWP is hibernated)
If the Scell was in the deactivated state before receiving the indication indicating hibernation of the Scell
  The downlink (DL) BWP of the Scell is hibernated to the first active downlink BWP (indicated by firstActiveDownlinkBWP-Id) indicated through an RRC message.
  The uplink (UL) BWP of the Scell is hibernated to the first active uplink BWP (indicated by firstActiveUplinkBWP-Id) indicated through an RRC message. Since the uplink BWP may not be used in the dormant state, the uplink BWP is not needed to be hibernated.
If the Scell was in the activated state before receiving the indication indicating hibernation of the Scell
  The downlink (DL) BWP of the Scell is switched and hibernated to the first active downlink BWP (indicated by firstActiveDownlinkBWP-Id) indicated through an RRC message.
  The uplink (UL) BWP of the Scell is switched and hibernated to the first active uplink BWP (indicated by firstActiveUplinkBWP-Id) indicated through an RRC message.
The cell deactivation timer (ScellDeactivationTimer) is stopped.
The cell hibernation timer (ScellHibernationTimer) is stopped if the cell hibernation timer was configured.
The dormant cell deactivation timer (dormantScellDeactivationTimer) starts or restarts.
The BWP timer (bwp-InactivityTimer) is stopped. When the BWP timer expires, the downlink (DL) BWP is switched to the default BWP (if the default BWP is configured) or switched to the initial BWP (initial downlink BWP) (if the default BWP is not configured), and thus the BWP in which a channel measurement report is transmitted in the dormant state may be changed. Accordingly, the BWP timer should be stopped.
All HARQ buffers corresponding to the Scell are emptied.
If the cell hibernation timer expires in the Scell,
The Scell (or BWP) is hibernated.
The cell deactivation timer (ScellDeactivationTimer) is stopped.
The cell hibernation timer is stopped.
The dormant cell deactivation timer starts or restarts. The timer starts or restarts so that the state is automatically transitioned to the deactivated state even in the dormant state.
All HARQ buffers corresponding to the Scell are emptied.
If the dormant cell hibernation timer expires in the Scell,
The Scell (or BWP) is deactivated.
The dormant cell deactivation timer is stopped.

In the disclosure, detailed embodiment 2-6 when the Scell in which the BWP is configured is hibernated is described below.

If the Scell receives an indication indicating transition to the dormant state (if the BWP is hibernated),
　If the Scell was in the deactivated state before receiving the indication indicating hibernation of the Scell
　　The downlink (DL) BWP of the Scell is hibernated to the first active downlink BWP (indicated by firstActiveDownlinkBWP-Id) indicated through an RRC message. Since the uplink BWP may not be used in the dormant state, the uplink BWP is not needed to be hibernated.
　If the Scell was in the activated state before receiving the indication indicating hibernation of the Scell
　　The downlink (DL) BWP of the Scell is switched and hibernated to the first active downlink BWP (indicated by firstActiveDownlinkBWP-Id) indicated through an RRC message.
　　The uplink (UL) BWP of the Scell is deactivated (when the Scell is activated in the future, advance switching is not needed since switching and activation to the first active downlink BWP is performed, and the uplink BWP may be deactivated since the uplink BWP is not used in the dormant state.
　The cell deactivation timer (ScellDeactivationTimer) is stopped.
　The cell hibernation timer (ScellHibernationTimer) is stopped if the cell hibernation timer was configured.
　The dormant cell deactivation timer (dormantScellDeactivationTimer) starts or restarts.
　The BWP timer (bwp-InactivityTimer) is stopped. When the BWP timer expires, the downlink (DL) BWP is switched to the default BWP (if the default BWP is configured) or switched to the initial BWP (initial downlink BWP) (if the default BWP is not configured), and thus the BWP in which a channel measurement report is transmitted in the dormant state may be changed. Accordingly, the BWP timer should be stopped.
　All HARQ buffers corresponding to the Scell are emptied.
If the cell hibernation timer expires in the Scell,
　The Scell (or BWP) is hibernated.
　The cell deactivation timer (ScellDeactivationTimer) is stopped.
　The cell hibernation timer is stopped.
　The dormant cell deactivation timer starts or restarts. The timer starts or restarts so that the state is automatically transitioned to the deactivated state even in the dormant state.
　All HARQ buffers corresponding to the Scell are emptied.
If the dormant cell hibernation timer expires in the Scell,
　The Scell (or BWP) is deactivated.
　The dormant cell deactivation timer is stopped.

In the disclosure, detailed embodiment 2-7 when the Scell in which the BWP is configured is hibernated is described below.
If the Scell receives an indication indicating transition to the dormant state (if the BWP is hibernated),
　If the Scell was in the deactivated state before receiving the indication indicating hibernation of the Scell
　　A downlink (DL) BWP and an uplink (UL) BWP of the Scell are hibernated to a first active downlink BWP (indicated by a firstActiveDownlinkBWP-Id) and a first active uplink BWP (indicated by a firstActiveUplinkBWP-id) indicated through an RRC message.
　If the Scell was in the activated state before receiving the indication indicating hibernation of the Scell
　　A downlink (DL) BWP and an uplink (UL) BWP of the Scell are activated to a first active downlink BWP (indicated by a firstActiveDownlinkBWP-Id) and a first active uplink BWP (indicated by a firstActiveUplinkBWP-id) indicated through an RRC message.
　　A downlink (DL) BWP and an uplink (UL) BWP of the Scell are switched to a first active downlink BWP (indicated by a firstActiveDownlinkBWP-Id) and a first active uplink BWP (indicated by a firstActiveUplinkBWP-id) indicated through an RRC message.
　　The switched first active downlink BWP (indicated by firstActiveDownlinkBWP-Id) and first active uplink BWP (indicated by firstActiveUplinkBWP-id) are hibernated.
　The cell deactivation timer (ScellDeactivationTimer) is stopped.
　The cell hibernation timer (ScellHibernationTimer) is stopped if the cell hibernation timer was configured.
　The dormant cell deactivation timer (dormantScellDeactivationTimer) starts or restarts.
　The BWP timer (bwp-InactivityTimer) is stopped. When the BWP timer expires, the downlink (DL) BWP is switched to the default BWP (if the default BWP is configured) or switched to the initial BWP (initial downlink BWP) (if the default BWP is not configured), and thus the BWP in which a channel measurement report is transmitted in the dormant state may be changed. Accordingly, the BWP timer should be stopped.
　All HARQ buffers corresponding to the Scell are emptied.
If the cell hibernation timer expires in the Scell,
　The Scell (or BWP) is hibernated.
　The cell deactivation timer (ScellDeactivationTimer) is stopped.
　The cell hibernation timer is stopped.
　The dormant cell deactivation timer starts or restarts. The timer starts or restarts so that the state is automatically transitioned to the deactivated state even in the dormant state.
　All HARQ buffers corresponding to the Scell are emptied.
If the dormant cell hibernation timer expires in the Scell,
　The Scell (or BWP) is deactivated.
　The dormant cell deactivation timer is stopped.

In the disclosure, detailed embodiment 2-8 when the Scell in which the BWP is configured is hibernated is described below.
If the Scell receives an indication indicating transition to the dormant state (if the BWP is hibernated),
　If the Scell was in the deactivated state before receiving the indication indicating hibernation of the Scell
　　The downlink (DL) BWP of the Scell is hibernated to the first active downlink BWP (indicated by firstActiveDownlinkBWP-Id) indicated through an RRC message.
　　The uplink (UL) BWP of the Scell is switched and hibernated to the first active uplink BWP (indicated by firstActiveUplinkBWP-Id) indicated through an RRC message. Since the uplink BWP may not be used in the dormant state, the uplink BWP is not needed to be hibernated.
　If the Scell was in the activated state before receiving the indication indicating hibernation of the Scell
　　If the downlink (DL) BWP used when the Scell is in the activated state is not the first active downlink BWP (indicated by firstActiveDownlinkBWP-Id) indicated through an RRC message,
　　　The downlink (DL) BWP of the Scell is switched and hibernated to the first active downlink BWP (indicated by firstActiveDownlinkBWP-Id) indicated through an RRC message.

If the uplink (UL) BWP used when the Scell is in the activated state is not the first active uplink BWP (indicated by firstActiveUplinkBWP-Id) indicated through an RRC message, The uplink (UL) BWP of the Scell is switched and hibernated to the first active uplink BWP (indicated by firstActiveUplinkBWP-Id) indicated through an RRC message.

The cell deactivation timer (ScellDeactivationTimer) is stopped.

The cell hibernation timer (ScellHibernationTimer) is stopped if the cell hibernation timer was configured.

The dormant cell deactivation timer (dormantScellDeactivationTimer) starts or restarts.

The BWP timer (bwp-InactivityTimer) is stopped. When the BWP timer expires, the downlink (DL) BWP is switched to the default BWP (if the default BWP is configured) or switched to the initial BWP (initial downlink BWP) (if the default BWP is not configured), and thus the BWP in which a channel measurement report is transmitted in the dormant state may be changed. Accordingly, the BWP timer should be stopped.

All HARQ buffers corresponding to the Scell are emptied.

If the cell hibernation timer expires in the Scell,

The Scell (or BWP) is hibernated.

The cell deactivation timer (ScellDeactivationTimer) is stopped.

The cell hibernation timer is stopped.

The dormant cell deactivation timer starts or restarts. The timer starts or restarts so that the state is automatically transitioned to the deactivated state even in the dormant state.

All HARQ buffers corresponding to the Scell are emptied.

If the dormant cell hibernation timer expires in the Scell,

The Scell (or BWP) is deactivated.

The dormant cell deactivation timer is stopped.

In the disclosure, detailed embodiment 2-9 when the Scell in which the BWP is configured is hibernated is described below.

If the Scell receives an indication indicating transition to the dormant state (if the BWP is hibernated), If the Scell was in the deactivated state before receiving the indication indicating hibernation of the Scell The downlink (DL) BWP of the Scell is hibernated to the first active downlink BWP (indicated by firstActiveDownlinkBWP-Id) indicated through an RRC message. Since the uplink BWP may not be used in the dormant state, the uplink BWP is not needed to be hibernated.

If the Scell was in the activated state before receiving the indication indicating hibernation of the Scell If the downlink (DL) BWP used when the Scell is in the activated state is not the first active downlink BWP (indicated by firstActiveDownlinkBWP-Id) indicated through an RRC message, The downlink (DL) BWP of the Scell is switched and hibernated to the first active downlink BWP (indicated by firstActiveDownlinkBWP-Id) indicated through an RRC message.

The uplink (UL) BWP of the Scell is deactivated (when the Scell is activated in the future, advance switching is not needed since switching and activation to the first active downlink BWP is performed, and the uplink BWP may be deactivated since the uplink BWP is not used in the dormant state.

The cell deactivation timer (ScellDeactivationTimer) is stopped.

The cell hibernation timer (ScellHibernationTimer) is stopped if the cell hibernation timer was configured.

The dormant cell deactivation timer (dormantScellDeactivationTimer) starts or restarts.

The BWP timer (bwp-InactivityTimer) is stopped. When the BWP timer expires, the downlink (DL) BWP is switched to the default BWP (if the default BWP is configured) or switched to the initial BWP (initial downlink BWP) (if the default BWP is not configured), and thus the BWP in which a channel measurement report is transmitted in the dormant state may be changed. Accordingly, the BWP timer should be stopped.

All HARQ buffers corresponding to the Scell are emptied.

If the cell hibernation timer expires in the Scell,

The Scell (or BWP) is hibernated.

The cell deactivation timer (ScellDeactivationTimer) is stopped.

The cell hibernation timer is stopped.

The dormant cell deactivation timer starts or restarts. The timer starts or restarts so that the state is automatically transitioned to the deactivated state even in the dormant state.

All HARQ buffers corresponding to the Scell are emptied.

If the dormant cell hibernation timer expires in the Scell,

The Scell (or BWP) is deactivated.

The dormant cell deactivation timer is stopped.

In another method, detailed embodiments 2-1, 2-2, 2-3, 2-4, 2-5, 2-6, 2-7, 2-8, and 2-9 when the Scell in which the BWP is configured is hibernated according to the disclosure may be expanded to an embodiment in which the first active downlink BWP or the first active uplink BWP is changed to the initial downlink BWP or the initial uplink BWP.

In another method, detailed embodiments 2-1, 2-2, 2-3, 2-4, 2-5, 2-6, 2-7, 2-8, and 2-9 when the Scell in which the BWP is configured is hibernated according to the disclosure may be expanded to an embodiment in which the first active downlink BWP or the first active uplink BWP is newly defined for a dormant state through an RRC message and changed to the indicated first dormant downlink BWP (firstDormantDownlinkBWP) or first dormant uplink BWP (firstDormantUplinkBWP).

In another method, detailed embodiments 2-1, 2-2, 2-3, 2-4, 2-5, 2-6, 2-7, 2-8, and 2-9 when the Scell in which the BWP is configured is hibernated according to the disclosure may be expanded to an embodiment in which the first active downlink BWP is changed to the default BWP.

In the disclosure, detailed embodiment 3-1 when the Scell in which the BWP is configured is deactivated is described below.

If the Scell receives an indication of transition to the deactivated state,

The BWP configured in the Scell is deactivated.

The BWP deactivation timer configured for the BWP is stopped.

The gNB may indicate BWP switching to the terminal in the dormant state of the Scell proposed in the disclosure through a PDCCH, a MAC CE, or an RRC message, and the terminal may perform BWP switching for the active or dormant Scell according to the indication of the gNB. As proposed above, in the dormant state, the terminal may perform channel measurement for the Scell and report a measurement result to the gNB. Accordingly, when the gNB receives the channel measurement result of the dormant Scell, it is possible to increase implementation freedom of the gNB to switch the BWP in order to detect channel measurement information of another BWP on the basis of the measurement result.

In another method, in the dormant state of the Scell proposed in the disclosure, the gNB cannot indicate BWP switching to the terminal through the PDCCH, the MAC CE, or the RRC message, and even though the BWP switching is indicated, the terminal ignores the indication. When the terminal transitions to the activated state, activation to the first activation BWP is performed, and thus a channel measurement report on another BWP in the dormant state may not be useful. Accordingly, in order to reduce complexity of terminal implementation, the use of BWP switching may be limited in the dormant state.

Hereinafter, the disclosure proposes state transition MAC control information (MAC Control Element: MAC CE) indicating the activated state, the dormant state, or the deactivated state of each Scell.

FIG. 1I illustrates MAC control information indicating state transition to an activated state, a dormant state, or a deactivated state proposed in the disclosure.

Active and inactive MAC CEs proposed in the disclosure may have the structure illustrated in FIG. 1I according to an embodiment. For example, the active and inactive MAC CEs may be divided into a MAC CE format 1i-05 having the size of 1 byte that supports 7. Scells and a MAC CE format 1i-10 having the size of 4 bytes that supports 31. Scells. Further, the MAC CEs have the following characteristics.

In the case in which a dormant MAC CE is not received and only active and inactive MAC CEs are received, the terminal operates as described below.

If each field of the active and inactive MAC CEs indicates an Scell identifier, a value corresponding to each field may indicate whether the Scell is activated or deactivated. If a value of the indicator for the Scell indicated by the Scell identifier is 1, the Scell is activated when the state of the Scell is the deactivated state. However, if the state of the Scell is a state other than the deactivated state, the indicator value is ignored. If a value of the indicator for the Scell indicated by the Scell identifier is 0, the Scell is deactivated. For example, the Scell is deactivated when the value of the indicator for the Scell is 0 regardless of the state of the Scell.

The dormant MAC CE proposed in the disclosure may have the formats illustrated in FIG. 1I according to an embodiment. The dormant MAC CE may be divided into the MAC CE format 1i-05 having the size of 1 byte that supports 7. Scells and the MAC CE format 1i-05 having the size of 4 bytes that supports 31. Scells. Further, the MAC CEs have the following characteristics.

In the case in which the active and inactive MAC CEs are not received and only the dormant MAC CE is received, the terminal operates as described below.

If each field of the dormant MAC CE indicates an Scell identifier, a value corresponding to each field may indicate whether the Scell is activated or deactivated. If a value of an indicator for the Scell indicated by the Scell identifier is 1, the Scell is hibernated. For example, the Scell is hibernated when the value of the indicator for the Scell is 1 regardless of the state of the Scell. If the value of the indicator for the Scell indicated by the Scell identifier is 0, the Scell is activated when the state of the Scell is the dormant state. However, if the state of the Scell is a state other than the dormant state, the indicator value is ignored.

In the case in which the active and inactive MAC CEs and the dormant MAC CE are received by one MAC layer device, the terminal operation is as described below.

If each field of the active and inactive MAC CEs and the dormant MAC CE indicates an Scell identifier, a combination of values corresponding to the fields may indicate state transition of the Scell to the activated, dormant, or deactivated state. For the active and inactive MAC CEs and the dormant MAC CE, MAC CEs having the size of 1 byte or MAC CEs having the size of 4 bytes may be received together by one MAC layer device. If two types of MAC CEs are received together, the state transition of each Scell indicated by the MAC CE may be determined according to a combination of indication values of the MAC CEs as shown in Table 1 below.

TABLE 1

| Hibernation MAC control element Ci | Activation/Deactivation MAC control element Ci | SCell shall be |
|---|---|---|
| 0 | 0 | Deactivated |
| 0 | 1 | Activated |
| 1 | 0 | Reserved MAC control element combination |
| 1 | 1 | Dormant |

Figure 1J:
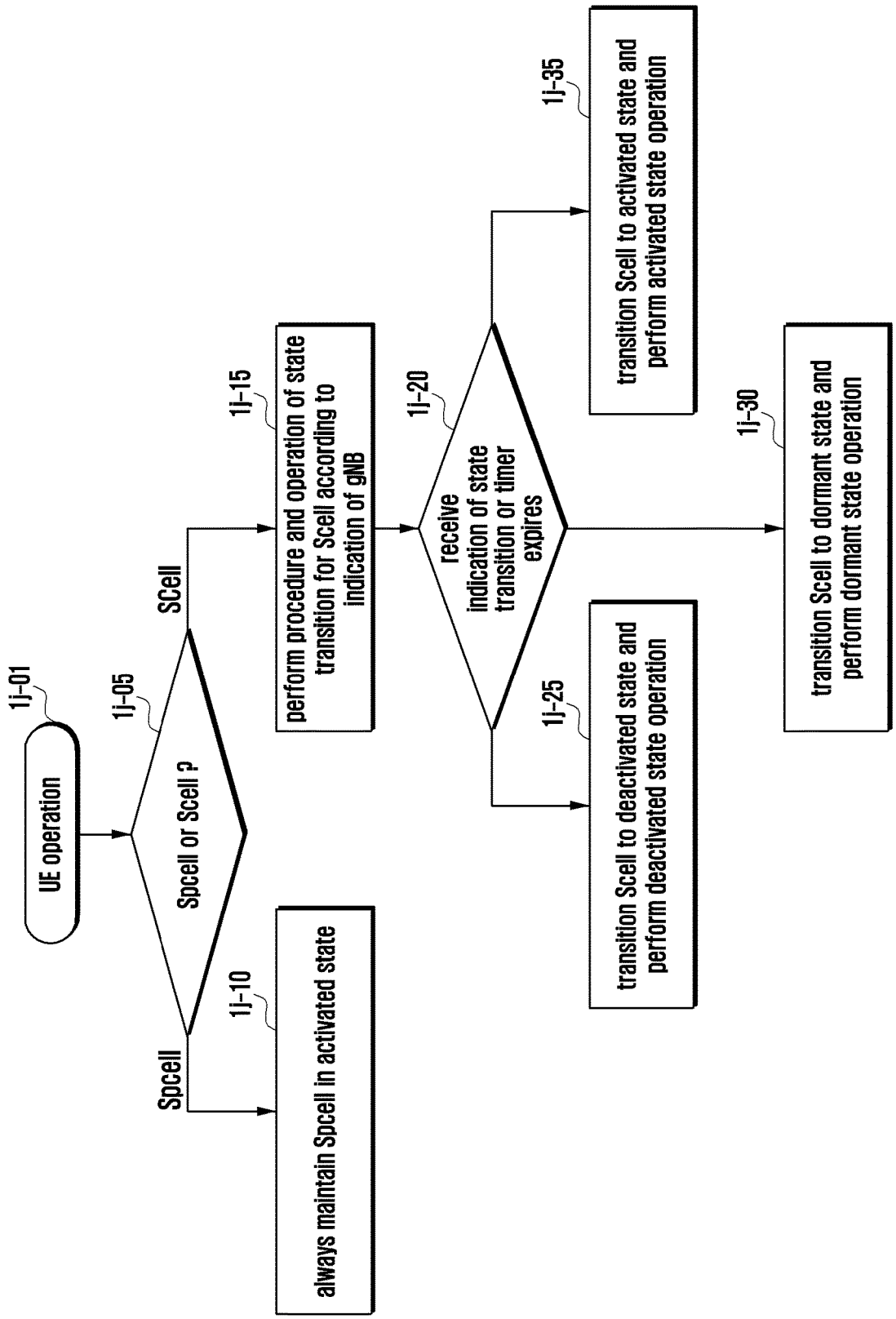
FIG. 1J illustrates a terminal operation for transitioning a state of a cell configured in the terminal according to the disclosure.

FIG. 1J illustrates a terminal operation for transitioning a state of a cell configured in the terminal according to the disclosure.

In FIG. 1J, the gNB may configure a plurality of Scells together with an Spcell (Pcell or Pscell) in the terminal.

If the configured cell is the Spcell in step 1j-05, the terminal may always maintain the Spcell in the activated state with an indication of the gNB in step 1j-10. If the configured cell is the Scell in step 1j-05, the terminal may transition the state according to the indication of the gNB or expiration of a timer configured in the cell. For example, if the gNB indicates the state transition of the Scell through an RRC message or a MAC CE or if a timer configured by the gNB expires and thus a state transition operation of the Scell is triggered, the terminal may transition the state of the Scell to the activated state, the dormant state, or the deactivated state and perform operations suitable for the respective states proposed in the disclosure in steps 1j-25, 1j-30, and 1j-35.

Figure 1K:
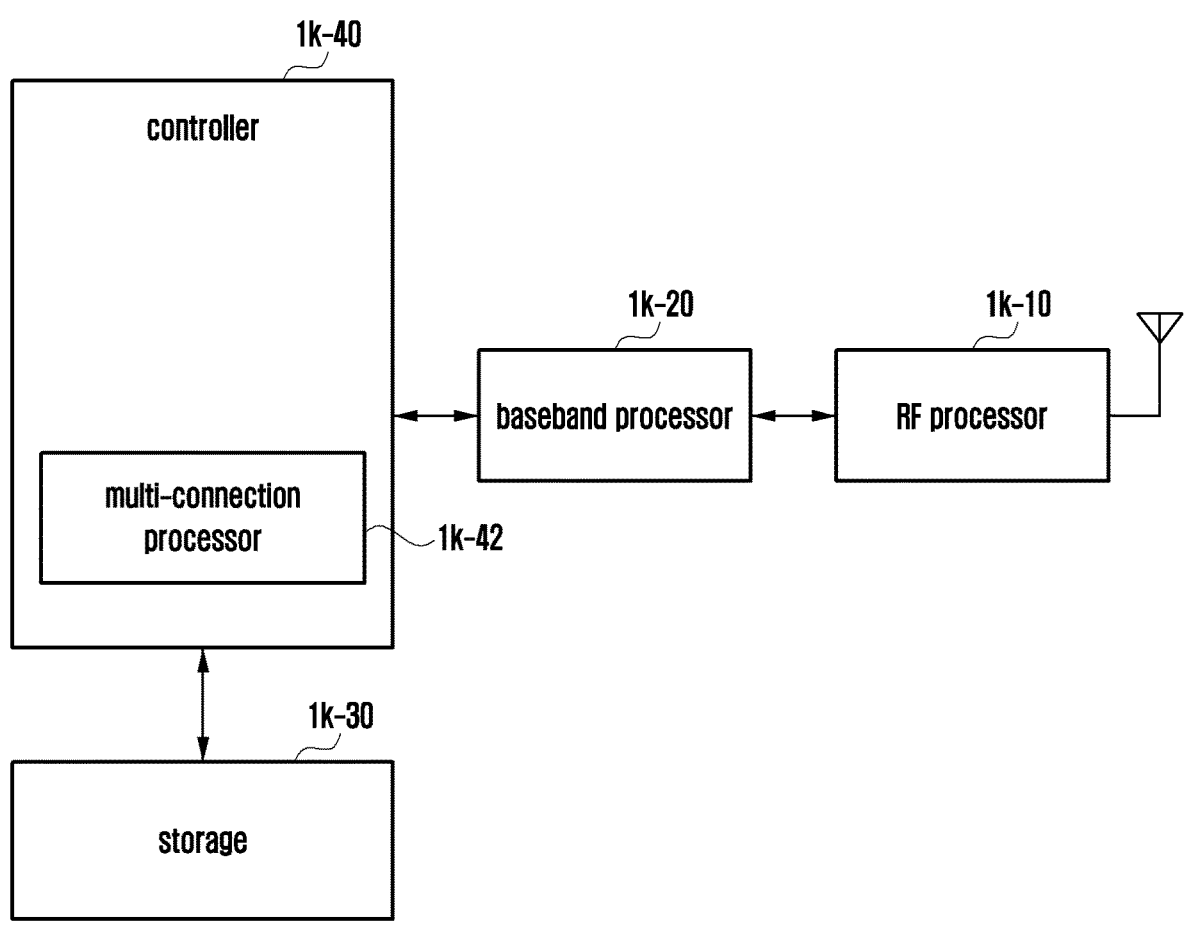
FIG. 1K illustrates the structure of the terminal to which an embodiment of the disclosure can be applied.

FIG. 1K illustrates the structure of the terminal to which an embodiment of the disclosure can be applied.

Referring to FIG. 1K, the terminal includes a Radio Frequency (RF) processor 1k-10, a baseband processor 1k-20, a storage 1k-30, and a controller 1k-40.

The RF processor 1k-10 performs a function for transmitting and receiving a signal through a wireless channel, such as band conversion and amplification of a signal. Specifically, the RF processor 1k-10 up-converts a baseband signal provided from the baseband processor 1k-20 into an RF band signal, transmits the RF band signal through an antenna, and then down-converts the RF band signal received through the antenna into a baseband signal. For example, the RF processor 1k-10 may include a transmission filter, a reception filter, an amplifier, a mixer, an oscillator, a Digital-to-Analog Convertor (DAC), an Analog-to-Digital Convertor (ADC), and the like. Although FIG. 1K illustrates only one antenna, the terminal may include a plurality of antennas. Further, the RF processor 1k-10 may include a plurality of RF chains. Moreover, the RF processor 1k-10 may perform beamforming. For the beamforming, the RF processor 1k-10 may control a phase and a size of each signal transmitted/received through a plurality of antennas or antenna elements. The RF processor may perform MIMO and receive a plurality of layers when performing the MIMO operation. The RF processor 1k-10 may perform reception beam sweeping by appropriately configuring a plurality of antennas or antenna elements according to the control of the controller or may control a direction of the reception beam and a beam width for cooperation of the reception beam and the transmission beam.

The baseband processor 1k-20 performs a function for a conversion between a baseband signal and a bitstream according to a physical layer standard of the system. For example, when data is transmitted, the baseband processor 1k-20 generates complex symbols by encoding and modulating a transmission bitstream. Further, when data is received, the baseband processor 1k-20 reconstructs a reception bitstream by demodulating and decoding a baseband signal provided from the RF processor 1k-10. For example, in an Orthogonal Frequency Division Multiplexing (OFDM) scheme, when data is transmitted, the baseband processor 1k-20 generates complex symbols by encoding and modulating a transmission bitstream, mapping the complex symbols to subcarriers, and then configures OFDM symbols through an Inverse Fast Fourier Transform (IFFT) operation and a Cyclic Prefix (CP) insertion. Further, when data is received, the baseband processor 1k-20 divides the baseband signal provided from the RF processor 1k-10 in units of OFDM symbols, reconstructs the signals mapped to the subcarriers through a Fast Fourier Transform (FFT) operation, and then reconstructs a reception bitstream through demodulation and decoding.

The baseband processor 1k-20 and the RF processor 1k-10 transmit and receive a signal as described above. Accordingly, the baseband processor 1k-20 and the RF processor 1k-10 may be referred to as a transmitter, a receiver, a transceiver, or a communication unit. Further, at least one of the baseband processor 1k-20 and the RF processor 1k-10 may include a plurality of communication modules for supporting a plurality of different radio access technologies. In addition, at least one of the baseband processor 1k-20 and the RF processor 1k-10 may include different communication modules for supporting signals in different frequency bands. For example, the different radio access technologies may include an LTE network and an NR network. Further, the different frequency bands may include a Super High Frequency (SHF) (for example, 2.5 GHz and 5 Ghz) band and a millimeter (mm) wave (for example, 60 GHz) band.

The storage 1k-30 stores data such as a basic program, an application program, and setting information for the operation of the terminal. The storage 1k-30 provides the stored data according to a request from the controller 1k-40.

The controller 1k-40 controls the overall operation of the terminal. For example, the controller 1k-40 transmits and receives signals through the baseband processor 1k-20 and the RF processor 1k-10. Further, the controller 1k-40 records data in the storage 1k-40 and reads the data. To this end, the controller 1k-40 may include at least one processor. For example, the controller 1k-40 may include a Communication Processor (CP) that performs a control for communication, and an Application Processor (AP) that controls a higher layer such as an application.

Figure 1L:
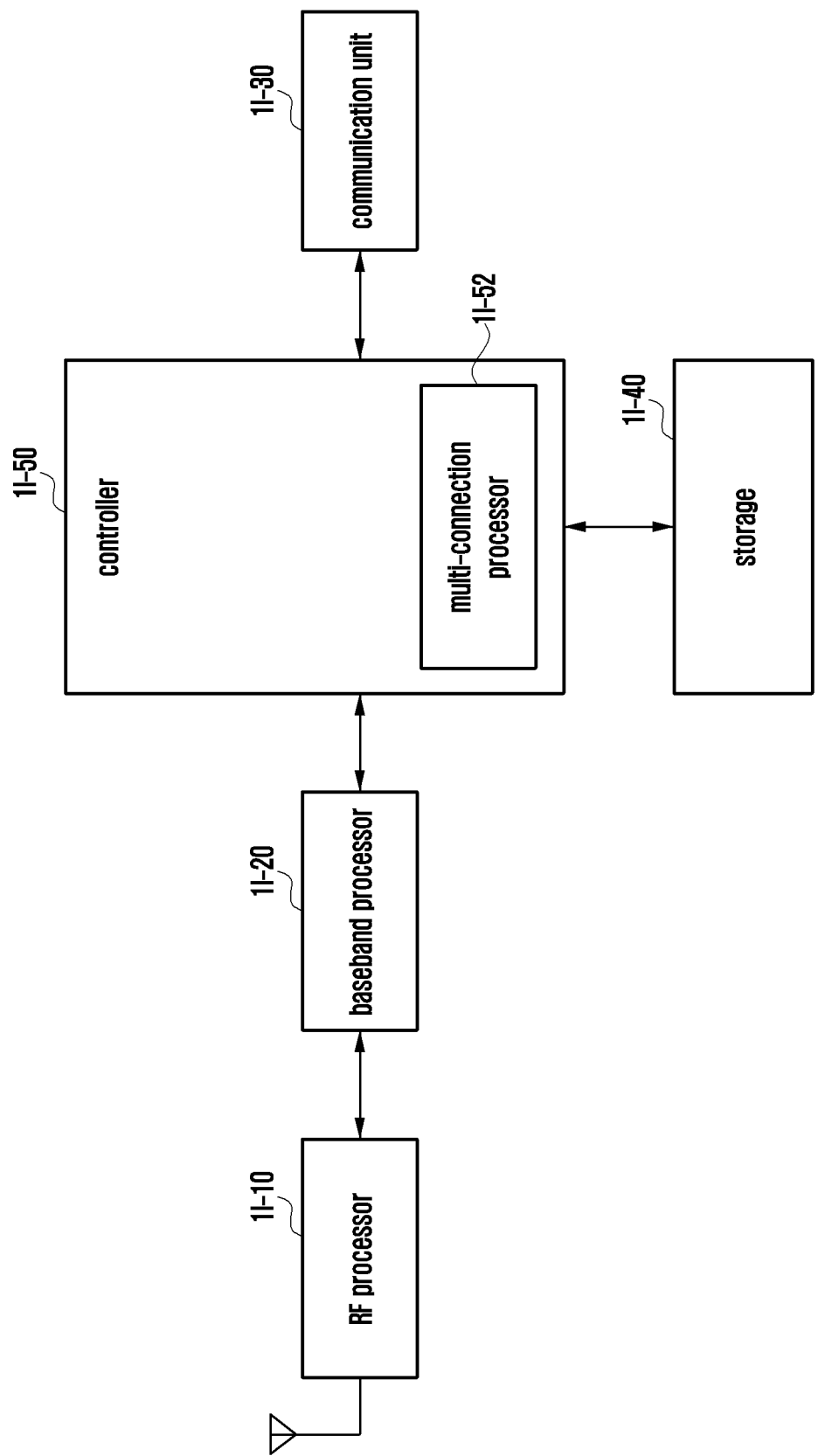
FIG. 1L is a block diagram illustrating a gNB in a wireless communication system to which an embodiment of the disclosure can be applied.

FIG. 1L is a block diagram illustrating a gNB in a wireless communication system to which an embodiment of the disclosure can be applied.

As illustrated in FIG. 1L, the gNB includes an RF processor 1l-10, a baseband processor 1l-20, a backhaul communication unit 1l-30, a storage 1l-40, and a controller 1l-50.

The RF processor 1l-10 performs a function for transmitting and receiving a signal through a wireless channel, such as band conversion and amplification of a signal. Specifically, the RF processor 1l-10 up-converts a baseband signal provided from the baseband processor 1l-20 into an RF band signal and then transmits the converted signal through an antenna, and down-converts an RF band signal received through the antenna into a baseband signal. For example, the RF processor 1l-10 may include a transmission filter, a reception filter, an amplifier, a mixer, an oscillator, a DAC, and an ADC. Although FIG. 1L illustrates only one antenna, the first access node may include a plurality of antennas. In addition, the RF processor 1l-10 may include a plurality of RF chains. The RF processor 1l-10 may perform beamforming. For the beamforming, the RF processor 1l-10 may control a phase and a size of each of the signals transmitted and received through a plurality of antennas or antenna elements. The RF processor may perform a downlink MIMO operation by transmitting one or more layers.

The baseband processor 1l-20 performs a function of performing conversion between a baseband signal and a bitstream according to a physical-layer standard of the first radio access technology. For example, when data is transmitted, the baseband processor 1l-20 generates complex symbols by encoding and modulating a transmission bitstream. Further, when data is received, the baseband processor 1l-20 reconstructs a reception bitstream by demodulating and decoding a baseband signal provided from the RF processing unit 1l-10. For example, in an OFDM scheme, when data is transmitted, the baseband processor 1l-20 may generate complex symbols by encoding and modulating the transmission bitstream, map the complex symbols to subcarriers, and then configure OFDM symbols through an IFFT operation and CP insertion. In addition, when data is received, the baseband processor 1l-20 divides a baseband signal provided from the RF processor 1l-10 in units of OFDM symbols, recovers signals mapped with sub-carriers through an FFT operation, and then recovers a reception bit string through demodulation and decoding. The baseband processor 1l-20 and the RF processor 1l-10 transmit and receive a signal as described above. Accordingly, the baseband processor 1l-20 and the RF processor 1l-10 may be referred to as a transmitter, a receiver, a transceiver, a communication unit, or a wireless communication unit.

The communication unit 1l-30 provides an interface for communicating with other nodes within the network.

The storage 1l-40 stores data such as a basic program, an application, and setting information for the operation of the MeNB. Particularly, the storage 1l-40 may store information on a bearer allocated to the accessed terminal and a measurement result reported from the accessed terminal. Further, the storage 1l-40 may store information which is a reference for determining whether to allow or interrupt multiple accesses to the terminal. The storage 1l-40 provides stored data in response to a request from the controller 1l-50.

The controller 1l-50 controls the overall operation of the MeNB. For example, the controller 1l-50 transmits and receives a signal through the baseband processor 1l-20 and the RF processing unit 1l-10 or through the backhaul communication unit 1l-30. Further, the controller 1l-50 records data in the storage 1*l*-40 and reads the data. To this end, the controller 1*l*-50 may include at least one processor.

Embodiment 3

Figure 2A:
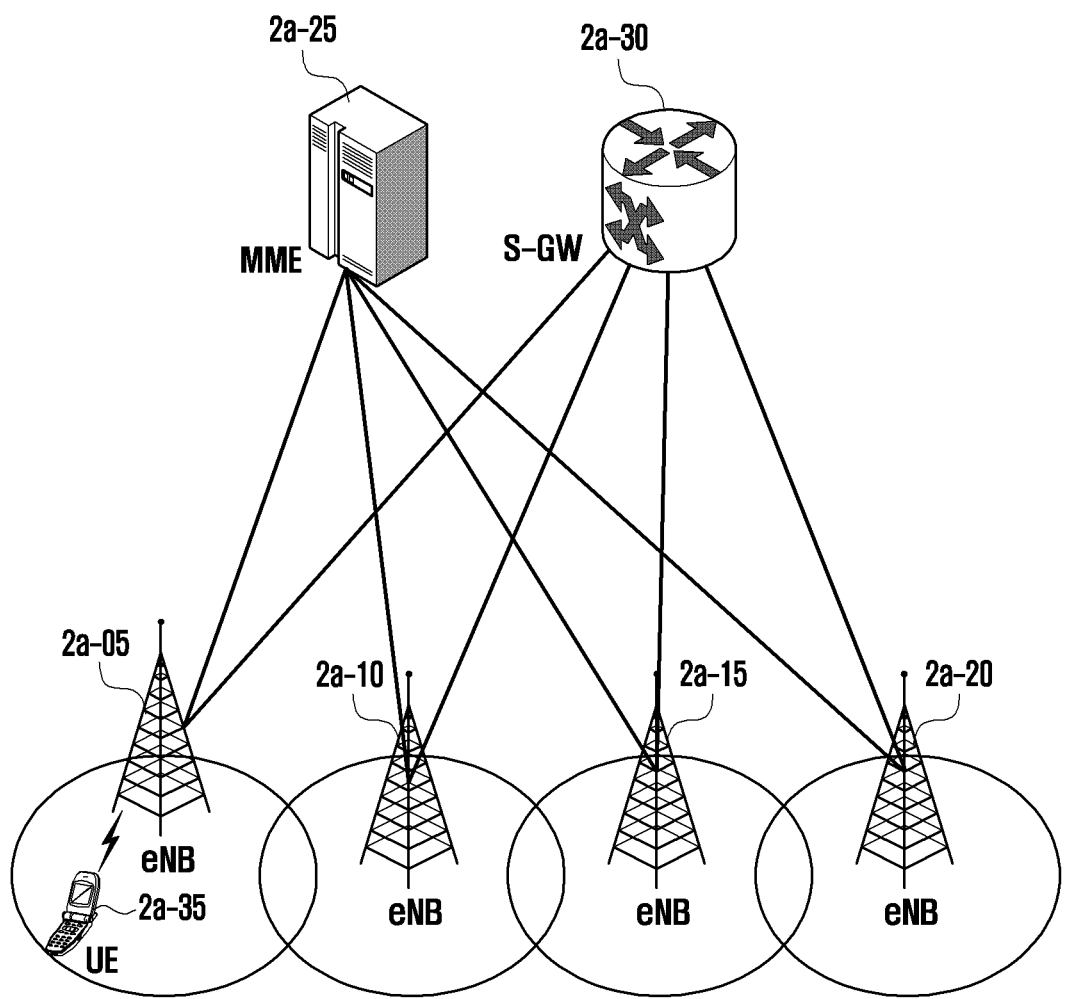
FIG. 2A illustrates the structure of an LTE system to which the disclosure can be applied.

FIG. 2A illustrates the structure of an LTE system to which the disclosure can be applied.

Referring to FIG. 2A, a radio access network of the LTE system includes next-generation base stations (Evolved Node Bs (ENBs), Node Bs, or base stations) 2*a*-05, 2*a*-10, 2*a*-15, and 2*a*-20, a Mobility Management Entity (MME) 2*a*-25, and a Serving GateWay (S-GW) 2*a*-30. A user terminal (hereinafter, referred to as a User Equipment (UE) or a terminal) 2*a*-35 accesses an external network through the ENBs 2*a*-05 to 2*a*-20 and the S-GW 2*a*-30.

In FIG. 2A, the ENBs 2*a*-05 to 2*a*-20 correspond to the conventional node Bs of the UMTS system. The ENB is connected to the UE 2*a*-35 through a radio channel, and performs a more complicated role than that of the conventional node B. In the LTE system, since all user traffic including a real-time service such as Voice over IP (VoIP) via an Internet protocol are served through a shared channel, an apparatus for collecting and scheduling status information on buffer statuses of UEs, available transmission power status, and channel statuses is required, and the ENBs 2*a*-05 to 2*a*-20 may serve as this apparatus. One ENB generally controls a plurality of cells. For, example, in order to implement a transmission rate of 100 Mbps, the LTE system uses an Orthogonal Frequency Division Multiplexing (OFDM) as a radio access technology in a bandwidth of 20 MHz. Further, an Adaptive Modulation and Coding (AMC) scheme of determining a modulation scheme and a channel coding rate is applied depending on the channel status of the terminal. The S-GW 2*a*-30 is a device for providing a data bearer, and generates or removes the data bearer under a control of the MME 2*a*-25. The MME is a device for performing not only a function of managing mobility of the terminal but also various control functions and is connected to a plurality of eNBs.

Figure 2B:
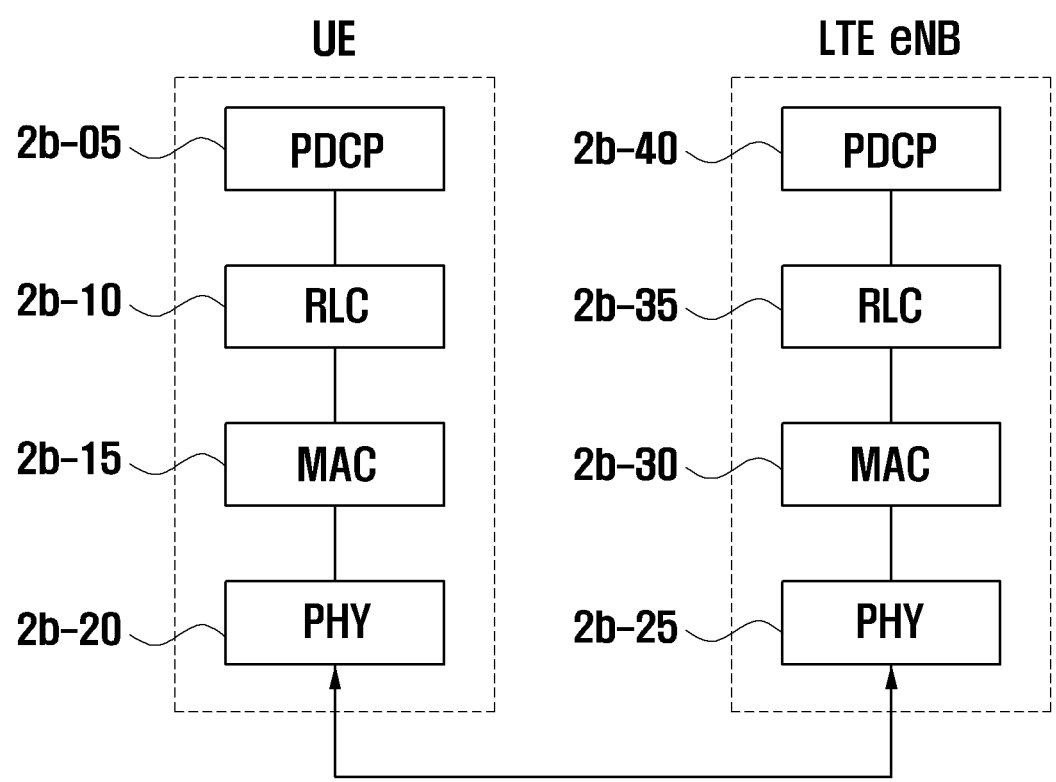
FIG. 2B illustrates the structure of a wireless protocol in the LTE system to which the disclosure can be applied.

FIG. 2B illustrates the structure of a wireless protocol in the LTE system to which the disclosure can be applied.

Referring to FIG. 2B, the terminal and the ENB include Packet Data Convergence Protocols (PDCPs) 2*b*-05 and 2*b*-40, Radio Link Controls (RLCs) 2*b*-10 and 2*b*-35, and Medium Access Controls (MACs) 2*b*-15 and 2*b*-30 in the wireless protocol of the LTE system. The Packet Data Convergence Protocols (PDCPs) 2*b*-05 and 2*b*-40 performs an operation of compressing/reconstructing an IP header. Main functions of the PDCP are described below.

- Header compression and decompression function ((Header compression and decompression: ROHC only)
- User data transmission function (Transfer of user data)
- Sequential delivery function (In-sequence delivery of upper layer PDUs at PDCP re-establishment procedure for RLC AM)
- Reordering function (For split bearers in DC (only support for RLC AM): PDCP PDU routing for transmission and PDCP PDU reordering for reception)
- Duplicate detection function (Duplicate detection of lower layer SDUs at PDCP re-establishment procedure for RLC AM)
- Retransmission function (Retransmission of PDCP SDUs at handover and, for split bearers in DC, of PDCP PDUs at PDCP data-recovery procedure, for RLC AM)
- Ciphering and deciphering function (Ciphering and deciphering)
- Timer-based SDU removal function (Timer-based SDU discard in uplink)

Radio Link Controls (RLCs) 2*b*-10 and 2*b*-35 reconfigure a PDCP Packet Data Unit (PDU) to be the appropriate size and perform an ARQ operation. Main functions of the RLC are described below.

- Data transmission function (Transfer of upper layer PDUs)
- ARQ function (Error Correction through ARQ (only for AM data transfer))
- Concatenation, segmentation, and reassembly function (Concatenation, segmentation, and reassembly of RLC SDUs (only for UM and AM data transfer))
- Re-segmentation function (Re-segmentation of RLC data PDUs (only for AM data transfer))
- Reordering function (Reordering of RLC data PDUs (only for UM and AM data transfer)
- Duplication detection function (only for UM and AM data transfer))
- Error detection function (Protocol error detection (only for AM data transfer))
- RLC SDU deletion function (RLC SDU discard (only for UM and AM data transfer))
- RLC re-establishment function (RLC re-establishment)

The MACs 2*b*-15 and 2*b*-30 are connected with various RLC layer devices included in one terminal, and perform an operation for multiplexing RLC PDUs to the MAC PDU and demultiplexing the RLC PDUs from the MAC PDU. Main functions of the MAC are described below.

- Mapping function (Mapping between logical channels and transport channels)
- Multiplexing and demultiplexing function (Multiplexing/demultiplexing of MAC SDUs belonging to one or different logical channels into/from Transport Blocks (TB) delivered to/from the physical layer on transport channels)
- Scheduling information report function (Scheduling information reporting)
- HARQ function (Error correction through HARQ)
- Logical channel priority control function (Priority handling between logical channels of one UE)
- Terminal priority control function (Priority handling between UEs by means of dynamic scheduling)
- MBMS service identification function (MBMS service identification)
- Transport format selection function (Transport format selection)
- Padding function (Padding)

The PHY layers 2*b*-20 and 2*b*-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 2C:
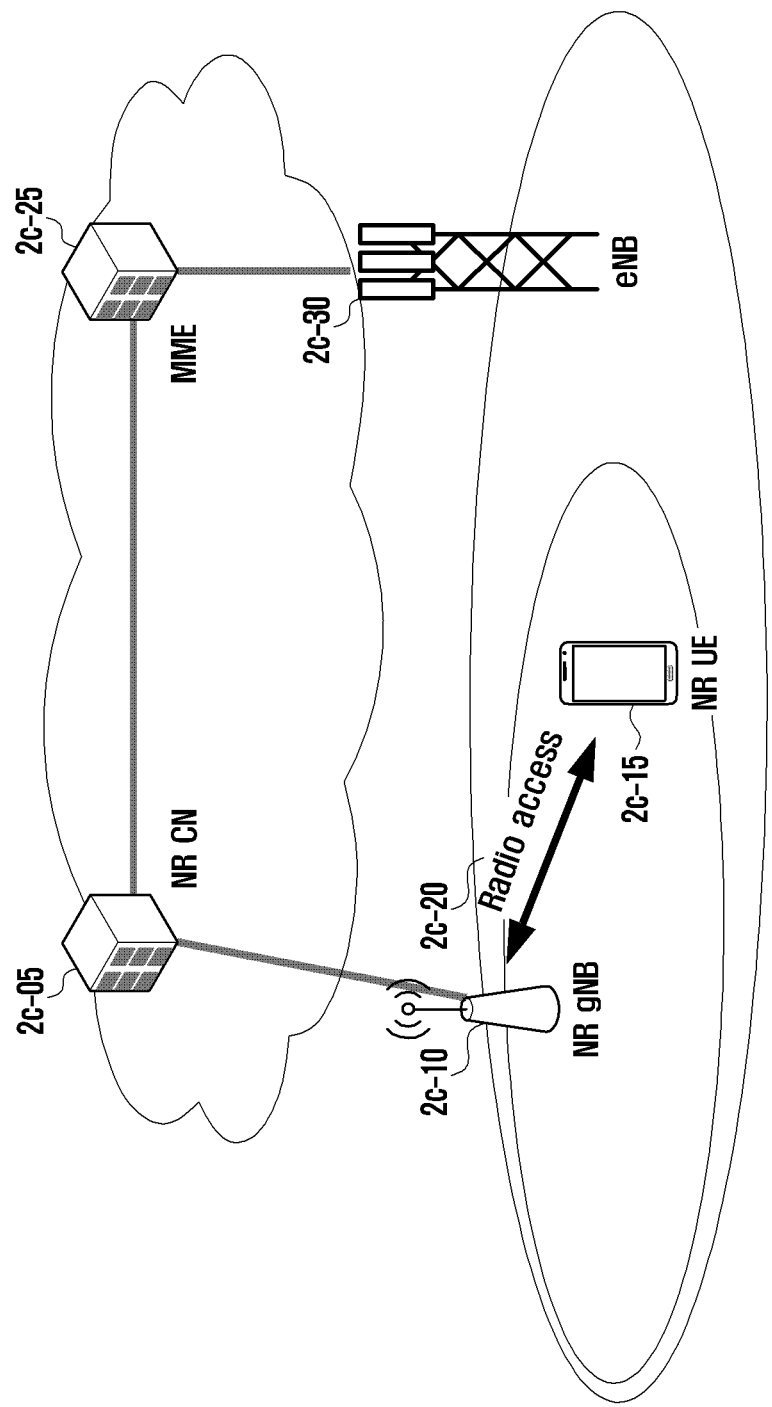
FIG. 2C illustrates the structure of a next-generation mobile communication system to which the disclosure can be applied.

FIG. 2C illustrates the structure of a next-generation mobile communication system to which the disclosure can be applied.

Referring to FIG. 2C, a radio access network of a next-generation mobile communication system (hereinafter, NR or 5G) includes a next-generation base station 2*c*-10 (hereinafter, referred to as a New Radio Node B, an NR gNB, or an NR base station) and a New Radio Core Network (NR CN) 2*c*-05. A user equipment 2*c*-15 (hereinafter, referred to as a New Radio User Equipment (NR UE) or a terminal) accesses an external network through the NR gNB 2*c*-10 and the NR CN 2*c*-05.

In FIG. 2C, the NR gNB 2c-10 corresponds to an evolved Node B (eNB) of the conventional LTE system. The NR gNB may be connected to an NR UE 2c-15 through a radio channel and may provide better service than the conventional node B. Since all user traffic is served through a shared channel in the next-generation mobile communication system, a device for collecting and scheduling status information such as channel statuses of UEs, available transmission power statuses, and channel statuses is required, and the NR NB 2c-10 serves as the device. One NR gNB generally controls a plurality of cells. The NR gNB may have a bandwidth wider than the conventional maximum bandwidth in order to implement super-high-speed data transmission compared to conventional LTE and may apply Orthogonal Frequency Division Multiplexing (OFDM) through radio access technology and further apply beamforming technology. Further, an Adaptive Modulation and Coding (AMC) scheme of determining a modulation scheme and a channel coding rate is applied depending on the channel status of the terminal. The NR CN 2c-05 performs a function of supporting mobility, configuring a bearer, and configuring a QoS. The NR CN is a device for performing a function of managing the mobility of the terminal and various control functions, and is connected to a plurality of base stations. Further, the next-generation mobile communication system may interwork with the conventional LTE system, and the NR CN is connected to an MME 2c-25 through a network interface. The MME is connected to an eNB 2c-30, which is a conventional base station.

Figure 2D:
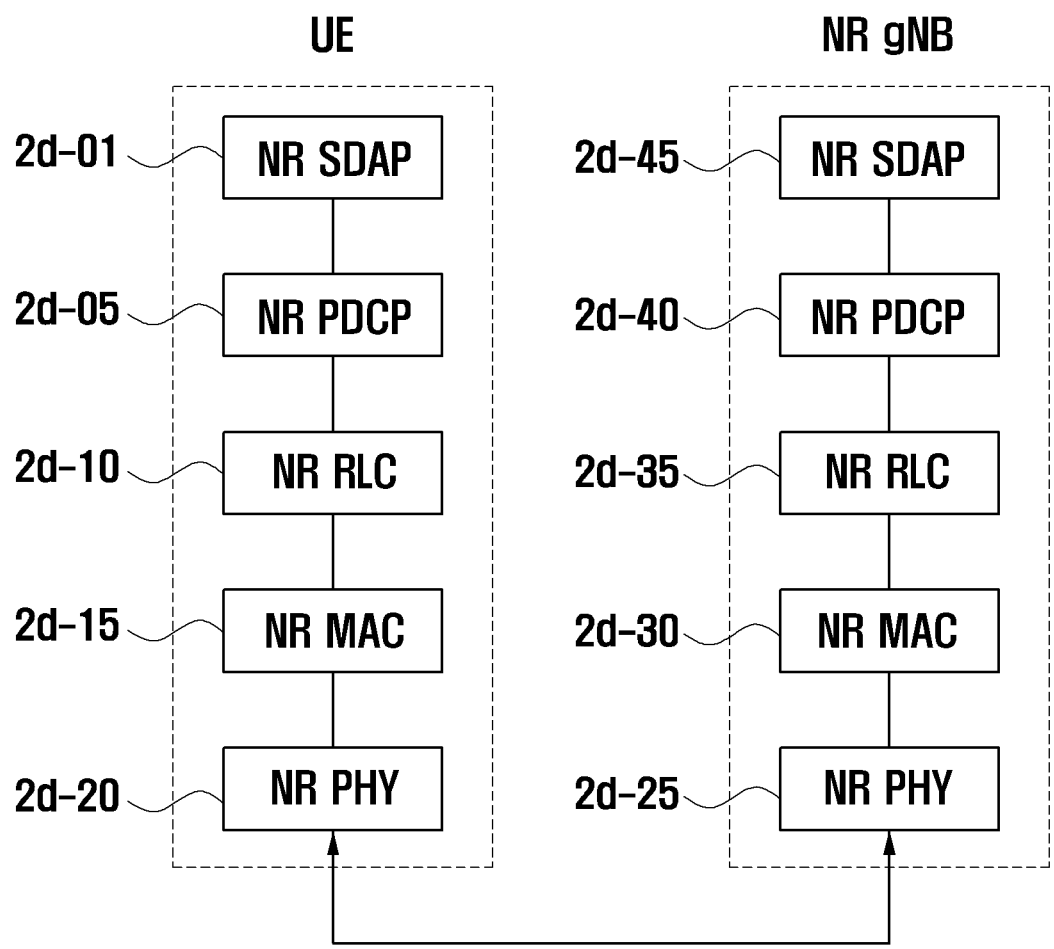
FIG. 2D illustrates the structure of a wireless protocol of the next-generation mobile communication system to which the disclosure can be applied.

FIG. 2D illustrates the structure of a wireless protocol of the next-generation mobile communication system to which the disclosure can be applied.

Referring to FIG. 2D, the terminal and the NR gNB include NR SDAPs 2d-01 and 2d-45, NR PDCPs 2d-05 and 2d-40, NR RLCs 2d-10 and 2d-35, and NR MACs 2d-15 and 2d-30 in the wireless protocol of the next-generation mobile communication system.

The main functions of the NR SDAPs 2d-01 and 2d-45 may include some of the following functions.

User data transmission function (transfer of user-plane data)
    Function of mapping QoS flow and a data bearer for uplink and downlink (mapping between a QoS flow and a DRB for both DL and UL)
    Function of marking a QoS flow ID for uplink and downlink (marking QoS flow ID in both DL and UL packets)
    Function of mapping reflective QoS flow to a data bearer for uplink SDAP PDUs (reflective QoS flow to DRB mapping for the UL SDAP PDUs)

With respect to the SDAP layer device, the terminal may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the terminal updates or reconfigures information on mapping of QoS flow and a data bearer in uplink and downlink. The SDAP header may include QoS flow ID information indicating the QoS. The QoS information may be used as data-processing-priority or scheduling information to support a seamless service.

The main functions of the NR PDCPs 2d-05 and 2d-40 may include some of the following functions.

Header compression and decompression function (Header compression and decompression: ROHC only)
    User data transmission function (Transfer of user data)
    Sequential delivery function (In-sequence delivery of upper layer PDUs)
    Non-sequential delivery function (Out-of-sequence delivery of upper layer PDUs)
    Reordering function (PDCP PDU reordering for reception)
    Duplicate detection function (Duplicate detection of lower layer SDUs)
    Retransmission function (Retransmission of PDCP SDUs)
    Ciphering and deciphering function (Ciphering and deciphering)
    Timer-based SDU removal function (Timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the recorded data regardless of the order, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 2d-10 and 2d-35 may include some of the following functions.

Data transmission function (Transfer of upper layer PDUs)
    Sequential delivery function (In-sequence delivery of upper layer PDUs)
    Non-sequential delivery function (Out-of-sequence delivery of upper layer PDUs)
    ARQ function (Error correction through ARQ)
    Concatenation, segmentation, and reassembly function (Concatenation, segmentation, and reassembly of RLC SDUs)
    Re-segmentation function (Re-segmentation of RLC data PDUs)
    Reordering function (Reordering of RLC data PDUs)
    Duplicate detection function (Duplicate detection)
    Error detection function (Protocol error detection)
    RLC SDU deletion function (RLC SDU discard)
    RLC re-establishment function (RLC re-establishment)

The sequential delivery function (In-sequence delivery) of the NR RLC device is a function of sequentially transferring PDCP SDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording PDCP PDUs lost due to the reordering, a function of reporting statuses of the lost PDCP PDUs to a transmitting side, a function of making a request for retransmitting the lost PDCP PDUs, a function of, if there is a lost RLC SDU, sequentially transferring only RLC SDUs preceding the lost RLC SDU to the higher layer, a function of, if a predetermined timer expires even though there is a lost RLC SDU, sequentially transferring all RLC SDUs received before the timer starts to the higher layer, or a function of, if a predetermined timer expires even though there is a lost RLC SDU, sequentially transferring all RLC SDUs received up to that point in time to the higher layer. Further, the NR RLC device may process the RLC PDUs sequentially in a reception order thereof (according to an arrival order regardless of a serial number or a sequence number) and may transfer the RLC PDUs to the PDCP device regardless of the sequence thereof (out-of-sequence delivery). In the case of segments, the NR RLC device may receive segments which are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 2d-15 and 2d-30 may be connected to a plurality of NR RLC layer devices configured in one terminal, and the main functions of the NR MACs may include some of the following functions.

Mapping function (Mapping between logical channels and transport channels)
Multiplexing and demultiplexing function (Multiplexing/demultiplexing of MAC SDUs)
Scheduling information report function (Scheduling information reporting)
HARQ function (Error correction through HARQ)
Logical channel priority control function (Priority handling between logical channels of one UE)
Terminal priority control function (Priority handling between UEs by means of dynamic scheduling)
MBMS service identification function (MBMS service identification)
Transport format selection function (Transport format selection)
Padding function (Padding)

The NR PHY layers 2d-20 and 2d-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

The disclosure proposes a method of rapidly activating carrier aggregation and saving a terminal battery in the next-generation mobile communication system.

The network or the NR gNB may configure a Spcell (Pcell and PScell) and a plurality of Scells in the terminal. The Spcell refers to a Pcell when the terminal communicates with one NR gNB, and indicates a Pcell of a master base station or a PScell of a secondary base station when the terminal communicates with two base stations (the master base station and the secondary base station). The Pcell or the Pscell is a primary cell used by each MAC layer device for communication between the terminal and the NR gNB, and correspond to a cell for synchronizing timing, performing random access, transmitting HARQ ACK/NACK feedback through PUCCH transmission resources, and exchanging most control signals. A technology in which the NR gNB operates a plurality of Scells as well as the Spcell to increase uplink or downlink transmission resources is referred to as carrier aggregation.

Upon receiving the configuration of the Spcell and the plurality of Scells, the terminal may receive a configuration of a mode for each Scell. The mode of the Scell may include an active mode and a deactivated mode. In the active mode, the terminal may exchange uplink or downlink data with the NR gNB in the active mode Scell (or an activated BWP of the Scell), monitor a Physical Downlink Control Channel (PDCCH) to identify an indication of the NR gNB, measure a channel for the downlink of the active mode Scell (or the activated BWP of the Scell), periodically report measurement information to the NR gNB, and periodically transmit a pilot signal (Sounding Reference Signal: SRS) to the NR gNB to allow the NR gNB to measure an uplink channel However, in the deactivated mode, the terminal may not transmit or receive data to or from the NR gNB in the Scell, may not monitor a PDCCH to identify an indication of the NR gNB, may not measure a channel, may not report measurement, and may not transmit a pilot signal.

Accordingly, in order to activate Scells in the deactivated mode, the NR gNB first configures frequency measurement configuration information in the terminal through an RRC message, and the terminal measures a cell or a frequency on the basis of the frequency measurement configuration information. After receiving the cell or frequency measurement report of the terminal, the NR gNB may activate the deactivated Scells on the basis of the frequency/channel measurement information. Accordingly, much latency is generated when the NR gNB activates carrier aggregation for the terminal.

The disclosure proposes a dormant mode for the Scell (or BWP) to reduce latency and save a terminal battery.

In the dormant mode, the terminal may not transmit or receive data to or from the NR gNB in the dormant Scell or the dormant BandWidth Part (BWP), may not monitor a PDCCH to identify an indication of the NR gNB, and may not transmit a pilot signal. However, the terminal may measure a channel and report a measurement result for the measured frequency/cell/channel periodically or when an event is generated according to the configuration of the NR gNB. Accordingly, the terminal neither monitors the PDCCH nor transmits the pilot signal in the dormant Scell or the dormant BWP, thereby saving the battery compared to the active mode. Unlike the deactivated mode, the channel measurement report is transmitted, and thus the NR gNB may use carrier aggregation by rapidly activating the dormant Scell or the dormant BWP on the basis of the measurement report.

Since a frequency in a notably high band can be used in the next-generation mobile communication system, a frequency bandwidth may also be very wide. However, in terminal implementation, completely supporting the very wide bandwidth requires high implementation complexity, which incurs high costs. Accordingly, the next-generation mobile communication system may introduce the concept of a BandWidth Part (BWP), and a plurality of BWPs may be configured in one cell (Spcell or Scell). The terminal may transmit and receive data in one or a plurality of BWPs according to an indication of the NR gNB.

The disclosure proposes a state transition method and a detailed operation thereof in consideration of an Scell and a plurality of BWPs configured in the Scell when the dormant mode proposed in the disclosure is introduced. Further, the disclosure proposes each of a method of managing the dormant mode in units of Scells (Scell-level) and transitioning the state and a method of managing the dormant mode in units of bandwidth parts (BWP-level) and transitioning the state, and proposes a detailed operation of the bandwidth part according to each mode (active, deactivated, or dormant).

In addition, one or a plurality of BWPs may be configured as the activated state, dormant state, or the deactivated state in one cell (Spcell, Pcell, Pscell, or Scell) for each link (downlink or uplink) in the disclosure. For example, it is possible to increase a data transmission rate through a method similar to carrier aggregation for one cell by transitioning only the downlink (or uplink) to the activated state and also reduce a battery by not allowing the uplink (or downlink) at the same time. For the downlink (or uplink), it is possible to allow the terminal measure a channel and report only a channel measurement result by transitioning only the downlink (or uplink) to the dormant state in one cell. Furthermore, it is possible to reduce the battery of the terminal by transitioning the downlink (or uplink) to the deactivated state in one cell. An indication of the state transition of each link for each cell may be configured through an RRC message, a MAC CE, or Downlink Control Information (DCI) of a PDCCH.

In the disclosure, the BWP may be used without distinction between the uplink and the downlink, and the meaning thereof may be each of an uplink BWP and a downlink BWP according to the context.

In the disclosure, the link may be used without any distinction between the uplink and the downlink, and the meaning thereof may indicate each of the uplink and the downlink.

Figure 2E:
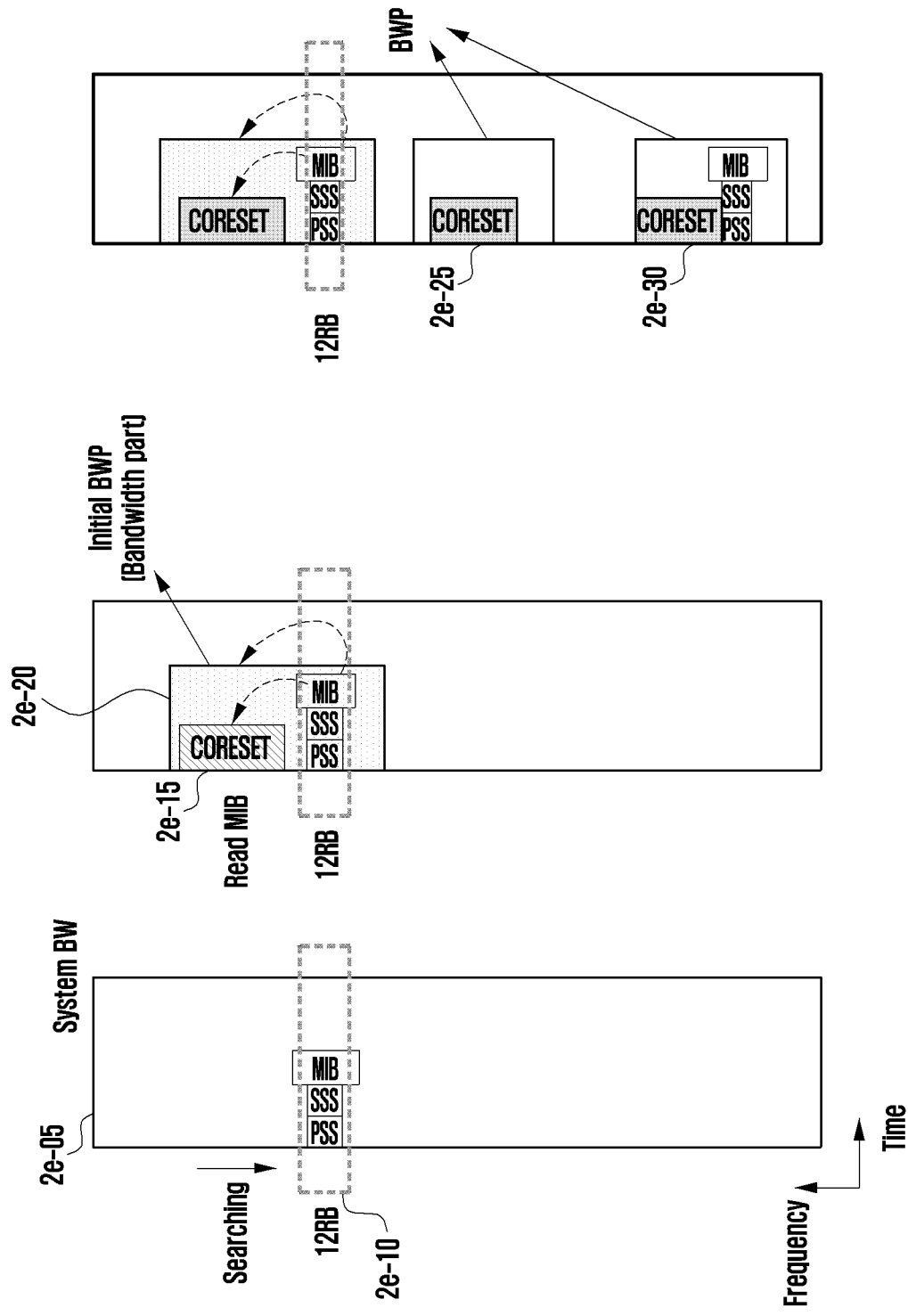
FIG. 2EA illustrates a procedure of serving the terminal through the efficient use of a very wide frequency bandwidth in a next-generation mobile communication system of the disclosure.
Figure 2E:
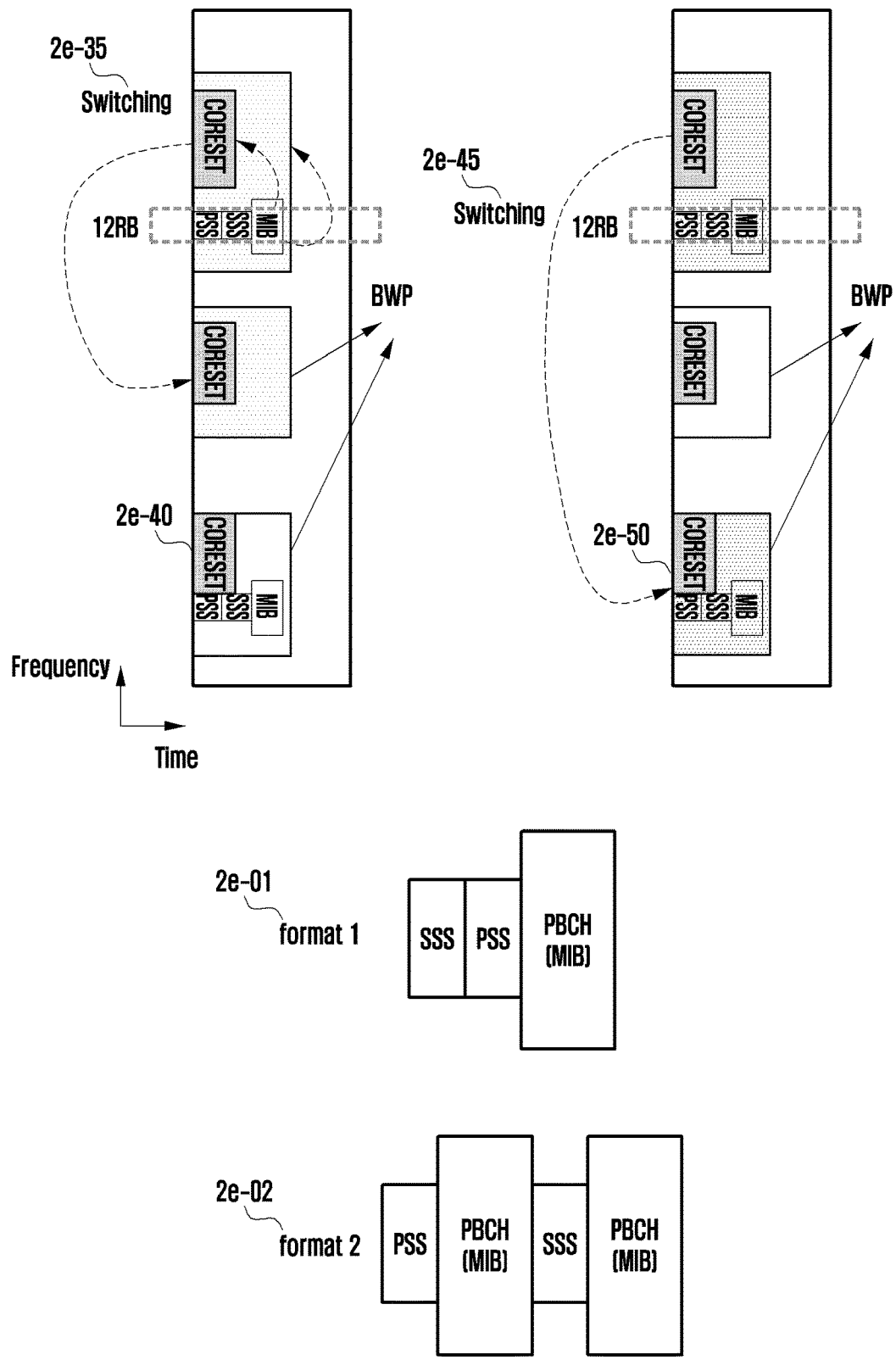

FIGS. 2EA and 2EB illustrate procedures of serving the terminal through the efficient use of a very wide frequency bandwidth in the next-generation mobile communication system of the disclosure.

In FIG. 2EA and FIG. 2EB, a method of providing service to UEs having different capabilities or categories by efficiently using a very wide frequency bandwidth and saving a battery in the next-generation mobile communication system is described.

One cell in which the NR gNB provides service may serve a very wide frequency band as indicated by reference numeral 2e-05. However, in order to provide service to UEs having different capabilities, the wide frequency BWP may be divided into a plurality of BWPs to manage one cell.

First, the terminal of which power is initially turned on may search the entire frequency band provided by a service provider (PLMN) in units of predetermined resource blocks (for example, in units of 12 Resource Blocks (RBs)). For example, the terminal may start discovering a Primary Synchronization Sequence (PSS)/Secondary Synchronization Sequence (SSS) in the entire system BWP in units of resource blocks, as indicated by reference numeral 2e-10. If the terminal searches for the PSS/SSS 2e-01 or 2e-02 in units of resource blocks and then detects the signals, the terminal may read the signals, analyze (decode) the signals, and identify a boundary between a subframe and a radio transmission resource frame (radio frame). Accordingly, the terminal may divide subframes in units of 1 ms and synchronize a downlink signal with the base station. The Resource Block (RB) is the size of a predetermined frequency resource and a predetermined time resource, and may be defined as a two-dimensional unit. For example, time resources may be defined in units of 1 ms, and frequency resources may be defined as 12 subcarriers (1 carrier×15 kHz=180 kHz). If the terminal completes synchronization, the terminal may identify information on a control resource set (CORESET) by checking a Master system Information Block (MIB) or Minimum System Information (MSI) and identify initial access BandWidth Part (BWP) information as indicated by reference numerals 2e-15 and 2e-20. CORESET information refers to the location of time/frequency transmission resources through which a control signal is transmitted from the NR gNB, and may be, for example, the location of resources through which a PDCCH channel is transmitted. Specifically, the CORESET information is information indicating where first system information (system information block 1: SIB 1) is transmitted from and indicates frequency/time resources through which a PDCCH is transmitted. The terminal may identify information on an initial BWP by reading the first system information. As described above, if the terminal completes synchronization of the downlink signal with the NR gNB and is able to receive a control signal, the terminal may perform a random-access procedure in an initial BWP of a cell on which the terminal camps, make a request for configuring an RRC connection, receive an RRC message, and make an RRC connection configuration.

In the RRC connection configuration, a plurality of BWPs may be configured per cell (Pcell, Pscell, Spcell, or Scell). A plurality of BWPs may be configured for the downlink within one cell, and separately, a plurality of BWPs may be configured for the uplink.

The plurality of BWPs may be indicated and configured by BWP identifiers to be used as initial BWPs, default BWPs, or first active BWPs.

The initial BWP may be used as a cell-specific BWP, one of which exists per cell, and may be used as a BWP in which the terminal initially accessing the cell may configure the connection in the cell through a random-access procedure or in which the terminal configuring the connection may perform synchronization. The NR gNB may configure an initial downlink BWP to be used in downlink and an initial uplink BWP to be used in uplink for each cell. Configuration information of the initial BWP may be broadcasted through first system information (system information 1: SIB 1) indicated by the CORESET, and may be configured again in the terminal which accesses the NR gNB through an RRC message. The initial BWP may be used while being designated with BWP identifier number 0 in each of the uplink and the downlink. For example, all UEs accessing the same cell may equally designate the same initial BWP by the BWP identifier number 0 and use the same. This confers an advantage of easily performing a contention-based random-access procedure because the NR gNB can transmit a Random-Access Response (RAR) message in the initial BWP, which all UEs can read, during the random-access procedure.

The first active BWP may be UE-specifically configured, and the NR gNB may designate and indicate the first active BWP using a BWP identifier among a plurality of BWPs. The first active BWP may be configured for each of the downlink and the uplink, and a first active downlink BWP and a first active uplink BWP may be configured by respective BWP identifiers. When a plurality of BWPs is configured in one cell, the first active BWP may be used to indicate which BWP is to be activated and used first. For example, when a Pcell or Pscell and a plurality of Scells are configured in the terminal and a plurality of BWPs is configured in each Pcell or Pscell or each Scell, if the Pcell, the Pscell, or the Scell is activated, the terminal may activate and use a first active BWP among the plurality of BWPs configured in the Pcell, Pscell, or Scell. The first active downlink BWP may be activated and used for the downlink, and the first active uplink BWP may be activated and used for the uplink.

The operation in which the terminal switches the downlink BWP of the Scell to activate the first active downlink BWP and switches the uplink BWP to activate the first active uplink BWP may be performed when an indication of activation of the Scell or the BWP in the deactivated state is received through an RRC message, MAC control information, or DCI. Further, the operation may be performed when an indication indicating transition of the Scell or the BWP to the dormant state is received through an RRC message, MAC control information, or DCI. This is because the NR gNB can effectively use carrier aggregation by measuring and reporting a frequency/channel for the first active downlink/uplink BWP when a channel measurement report is transmitted in the dormant state since the terminal switches the downlink BWP to the first active downlink BWP to activate the downlink BWP and switches the uplink BWP to the first active uplink BWP to activate the uplink BWP when the Scell or the BWP is activated.

The default BWP may be UE-specifically configured, and the NR gNB may designate and indicate the default BWP using a BWP identifier among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP. If the timer expires, the terminal may fall back or switch the downlink BWP activated in the cell to the default BWP. The switching may be a procedure of deactivating the currently activated BWP and activating the BWP to be switched to, and may be triggered through an RRC message, MAC control information (MAC control element), or L1 signaling (downlink control information (DCI) of a PDCCH). The switching may be triggered through an indication of the BWP to be activated or switched to, and the BWP may be indicated by a BWP identifier (for example, 0, 1, 2, 3, or 4).

The reason why the default BWP is used only for the downlink is to make it easy to perform NR gNB scheduling because the NR gNB allows the terminal to receive an indication of the NR gNB (for example, DCI of a PDCCH) by falling back to the default BWP for each cell after a predetermined time. For example, if the NR gNB configures the default BWP of the UEs accessing one cell as the initial BWP, the NR gNB may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the NR gNB, the default BWP may be defined and configured for the uplink and thus used like the default BWP of the downlink.

Figure 2F:
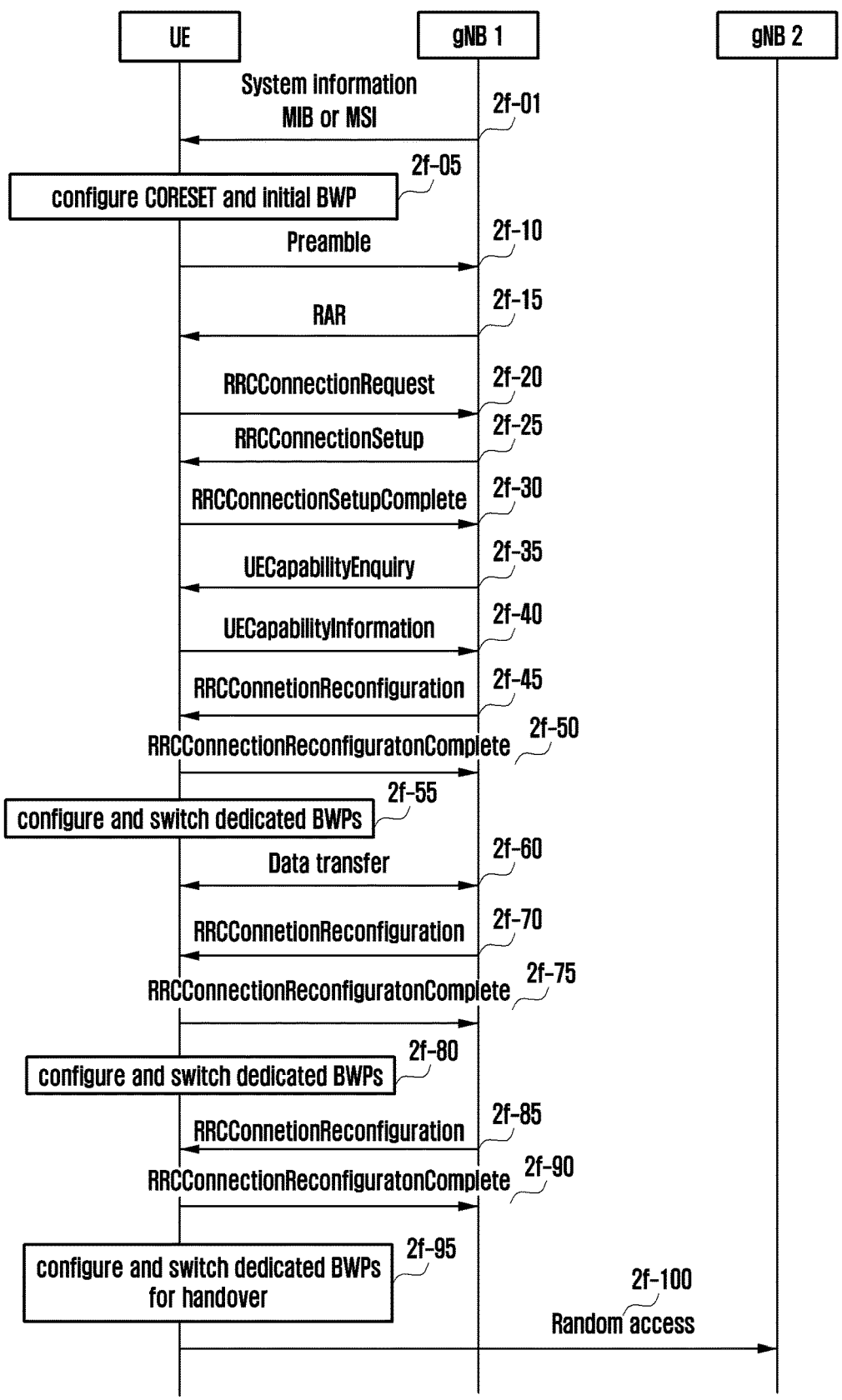
FIG. 2F illustrates a procedure in which the terminal switches from an RRC-idle mode to an RRC-connected mode in the next-generation mobile communication system, which is a method of configuring a plurality of BandWidth Parts (BWPs) and configuring a default BWP or a first active BWP.

FIG. 2F illustrates a procedure in which the terminal switches from an RRC-idle mode to an RRC-connected mode in the next-generation mobile communication system, which is a method of configuring a plurality of BandWidth Parts (BWPs) and configuring a default BWP or a first active BWP.

One cell in which the gNB provides service may serve a very wide frequency band. First, the terminal may search the entire frequency band provided by a service provider (PLMN) in units of predetermined resource blocks (for example, in units of 12 Resource Blocks (RBs)). That is, the terminal may start discovering a primary synchronization sequence (PSS)/secondary synchronization sequence (SSS) in the entire system bandwidth in units of resource blocks. If the terminal searches for the PSS/SSS in units of resource blocks and then detects the signals, the terminal may read the signals, analyze (decode) the signals, and identify a boundary between a subframe and a radio transmission resource frame (radio frame). If the terminal completes synchronization, the terminal may read system information of a cell on which the terminal currently camps. For example, the terminal may identify information on a control resource set (CORESET) by checking a Master system Information Block (MIB) or Minimum System Information (MSI) and identify initial access BandWidth Part (BWP) information by reading system information in steps 2f-01 and 2f-05. CORESET information refers to the location of time/frequency transmission resources through which a control signal is transmitted from the NR gNB, and may be, for example, the location of resources through which a PDCCH channel is transmitted.

As described above, if the terminal completes synchronization of the downlink signal with the gNB and is able to receive a control signal, the terminal may perform a random-access procedure in the initial BWP, receive a random-access response, make a request for configuring an RRC connection, receive an RRC message, and configure the RRC connection in steps 2f-10, 2f-15, 2f-20, 2f-25, and 2f-30.

If the basic RRC connection is completely configured, the gNB may transmit an RRC message which asks about a UE capability to the terminal (UECapabilityEnquiry) in order to identify the UE capability in 2f-35. In another method, the gNB may ask the MME or the AMF about the UE capability in order to identify the UE capability. This is because the MME or the AMF may have UE capability information if the terminal previously accessed the terminal. If there is no UE capability information required by the gNB, the gNB may make a request for UE capability to the terminal.

The reason why the gNB transmits the RRC message to the terminal to identify the UE capability is to identify the UE capability, for example, information indicating a frequency band that the terminal can read or on an area of the frequency band that the terminal can read. After identifying the UE capability, the gNB may configure an appropriate BWP in the terminal. If the terminal receives the RRC message which enquires about the UE capability, the terminal may transmit information containing information indicating the range of bandwidth that the terminal supports, indicate an offset from a reference center frequency to indicate a range of bandwidth supported in the current system bandwidth, information directly indicating a start point and an end point of the supported frequency bandwidth, or information indicating a center frequency and a bandwidth in step 2f-40.

The BWP may be configured through an RRCSetup message or an RRCResume message of the RRC connection configuration in step 2f-25 or an RRCReconfiguration message in step 2f-45, the RRC message may include configuration information of a PCell, a Pscell, or a plurality of Scells, and a plurality of BWPs may be configured for each cell (PCell, Pscell, or Scell). When a plurality of BWPs is configured for each cell, a plurality of BWPs to be used in the downlink of each cell may be configured. In the case of an FDD system, a plurality of BWPs to be used in the uplink of each cell may be configured to be distinguished from downlink BWPs. In the case of a TDD system, a plurality of BWPs to be used in common in the downlink and the uplink of each cell may be configured.

Information for configuring BWPs of each cell (PCell, Pscell, or Scell) may include at least one piece of the following information.

Downlink BWP configuration information of the cell
   Initial downlink BWP configuration information
      A plurality of pieces of BWP configuration information and BWP IDs corresponding to the respective BWPs
      Downlink initial state configuration information of the cell (for example, activated state, dormant state, or deactivated state)
      A BWP ID indicating a first active downlink BWP
      A BWP ID indicating a default BWP
      BWP deactivation timer configuration and a timer value
Uplink BWP configuration information of the cell
   Initial uplink BWP configuration information
      A plurality of pieces of BWP configuration information and BWP IDs corresponding to the respective BWPs
      Uplink initial state configuration information of the cell (for example, activated state, dormant state, or deactivated state)
      A BWP ID indicating a first active uplink BWP The configured initial BWP, default BWP, or first active BWP may be used for the following purpose, and may be operated so as to suit the purpose.

The initial BWP may be used as a cell-specific BWP, one of which exists per cell, and may be used as a BWP in which the terminal initially accessing the cell may configure the connection in the cell through a random-access procedure or in which the terminal configuring the connection may perform synchronization. The gNB may configure an initial downlink BWP to be used in downlink and an initial uplink BWP to be used in uplink for each cell. Configuration information of the initial BWP may be broadcasted through first system information (system information 1: SIB 1) indicated by the CORESET, and may be configured again in the terminal which accesses the gNB through an RRC message. The initial BWP may be used while being designated with BWP identifier number 0 in each of the uplink and the downlink. For example, all UEs accessing the same cell may equally designate the same initial BWP by the BWP identifier number 0 and use the same. This confers an advantage of easily performing a contention-based random-access procedure because the gNB can transmit a Random-Access Response (RAR) message in the initial BWP, which all UEs can read, during the random-access procedure.

The first active BWP may be UE-specifically configured, and the gNB may designate and indicate the first active BWP using a BWP identifier among a plurality of BWPs. The first active BWP may be configured for each of the downlink and the uplink, and include a first active downlink BWP and a first active uplink BWP configured as respective BWP identifiers. When a plurality of BWPs is configured in one cell, the first active BWP may be used to indicate which BWP is to be activated and used first. For example, when a Pcell or Pscell and a plurality of Scells are configured in the terminal and a plurality of BWPs is configured in each Pcell or Pscell or each Scell, if the Pcell, the Pscell, or the Scell is activated, the terminal may activate and use a first active BWP among the plurality of BWPs configured in the Pcell, Pscell, or Scell. For example, the first active downlink BWP may be activated and used for the downlink, and the first active uplink BWP may be activated and used for the uplink.

The operation in which the terminal switches the downlink BWP of the Scell to activate the first active downlink BWP and switches the uplink BWP to activate the first active uplink BWP may be performed when an indication of activation of the Scell or the BWP in the deactivated state is received through an RRC message, MAC control information, or DCI. Further, the operation may be performed when an indication indicating transition of the Scell or the BWP to the dormant state is received through an RRC message, MAC control information, or DCI. This is because the NR gNB can effectively use carrier aggregation by measuring and reporting a frequency/channel for the first active downlink/uplink BWP when a channel measurement report is transmitted in the dormant state since the terminal switches the downlink BWP to the first active downlink BWP to activate the downlink BWP and switches the uplink BWP to the first active uplink BWP to activate the uplink BWP when the Scell or the BWP is activated.

The default BWP may be UE-specifically configured, and the gNB may designate and indicate the default BWP using a BWP identifier among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP. If the timer expires, the terminal may fall back or switch the downlink BWP activated in the cell to the default BWP. The switching may be a procedure of deactivating the currently activated BWP and activating the BWP to be switched to, and may be triggered through an RRC message, MAC control information (MAC control element), or L1 signaling (Downlink Control Information (DCI) of a PDCCH). The switching may be triggered through an indication of the BWP to be activated or switched to, and the BWP may be indicated by a BWP identifier (for example, 0, 1, 2, 3, or 4).

The reason why the default BWP is used only for the downlink is to make it easy to perform gNB scheduling because the gNB allows the terminal to receive an indication of the gNB (for example, DCI of a PDCCH) by falling back to the default BWP for each cell after a predetermined time. For example, if the gNB configures the default BWP of the UEs accessing one cell as the initial BWP, the gNB may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the gNB, the default BWP may be defined and configured for the uplink and thus used like the default BWP of the downlink.

In an RRCSetup message of the RRC connection configuration, an RRCResume message of step 2*f*-25, or an RRCReconfiguration message of step 2*f*-45, a state transition timer may be configured to allow the terminal to transition the state by itself even though the terminal does not receive an indication through an RRC message, MAC control information, or DCI of a PDCCH. For example, if a cell deactivation timer (ScellDeactivationTimer) or a downlink (or uplink) deactivation timer (DLDeactivationTimer or ULDeactivationTimer) is configured for each Scell or downlink (or uplink) and the cell deactivation timer or the downlink (or uplink) deactivation timer expires, the Scell or the downlink (or uplink) may be transitioned to the deactivated state. Further, if a cell hibernation timer (ScellHibernationTimer) or a downlink (or uplink) hibernation timer (DLHibernationTimer or ULHibernationTimer) is configured for each Scell or downlink (or uplink) and the cell hibernation timer or the downlink (or uplink) hibernation timer expires, the Scell or the downlink (or uplink) may be transitioned to the dormant state. The cell hibernation timer or the downlink (or uplink) hibernation timer expires, only the Scell or the downlink (or uplink) in the activated state may be transitioned to the dormant state, and the Scell or the downlink (or uplink) in the deactivated state or the dormant state may not be transitioned to the dormant state. Further, a dormant cell deactivation timer (dormantScellDeactivationTimer) or a dormant or downlink (or uplink) deactivation timer (dormantDLDeactivationTimer or dormantULDeactivationTimer) may be configured for each Scell or downlink (uplink), and the Scell or the downlink (uplink) in the dormant state may be transitioned to the deactivated state. When the dormant cell deactivation timer or the dormant or downlink (uplink) deactivation timer expires, only the Scell or the downlink (or uplink) in the dormant state may be transitioned to the deactivated state, and the Scell or the downlink (uplink) in the activated state or the deactivated state may not be transitioned to the deactivated state. If the cell deactivation timer (ScellDeactivationTimer) (or the downlink (or uplink) deactivation timer) and the cell hibernation timer (ScellHibernationTimer) (or the downlink (or uplink) hibernation timer) are configured together, the cell hibernation timer (ScellHibernationTimer) (or the downlink (or uplink) hibernation timer) is prioritized. For example, if the cell hibernation timer (ScellHibernationTimer) (or the downlink (or uplink) hibernation timer) is configured, the corresponding Scell or downlink (or uplink) is not deactivated even though the cell deactivation timer (ScellDeactivationTimer) (or the downlink (or uplink) deactivation timer) expires. In other words, if the cell hibernation timer (or downlink (or uplink) hibernation timer) is configured, the Scell or the downlink (or uplink) may be first transitioned from the activated state to the dormant state due to expiration of the cell hibernation timer, and the cell having transitioned to the dormant state is transitioned to the deactivated state again due to expiration of the dormant cell deactivation timer. Accordingly, if the cell hibernation timer is configured, the cell deactivation timer does not influence the Scell or downlink (or uplink) state transition, and if the cell hibernation timer is configured even though the cell deactivation timer expires, the Scell or downlink (or uplink) may not be transitioned to the deactivated state.

When the cell deactivation timer (or downlink (or uplink) deactivation timer) is not configured in the RRC message, the terminal may consider that the cell deactivation timer (or downlink (or uplink) deactivation timer) is configured as an infinite value.

Further, frequency measurement configuration information (measurement configuration) and frequency measurement gap configuration information (measurement gap information) may be configured in an RRCSetup message of the RRC connection configuration, the RRCResume message of step 2f-25, or the RRCReconfiguration message of step 2f-45, and frequency measurement object information (measurement object) may be included. The frequency measurement object may include information on a BWP in which a Reference Signal (RS)/Synchronization Signal (SS) for measurement is configured, and may also include a center frequency, a bandwidth corresponding to a BWP, and a time pattern that should be applied during measurement.

The measurement report gap information may include at least one of a measurement gap length corresponding to the time for which measurement is performed, a measurement gap period, and measurement gap start time information. The RS is a signal of the gNB transmitted according to a partial time/frequency pattern in transmission resources of a subframe in which a control signal or a data signal is transmitted, and may be used to determine the strength of a signal of the corresponding BWP or the corresponding cell. The SS is a periodically transmitted synchronization signal such as a PSS or an SSS, and may be used to determine the strength of a signal of the corresponding BWP or the corresponding cell.

As described above, when the RRC connection configuration is completed, the terminal may configure a plurality of BWPs according to the indication configured through the RRC message. Further, in order to save a battery, the terminal may activate one or a small number of BWPs among the plurality of configured BWPs. For example, the gNB may indicate one BWP to be activated. The gNB may indicate activation of a BWP through an RRC message, MAC control information (MAC CE), or L1 signaling (PHY layer control signal such as a PDCCH) (for example, indicate whether to perform activation or deactivation through bitmap information) to indicate switching from the initial access BWP to a new BWP. Since there are many new accessing users in the initial access BWP, it may be more advantageous for scheduling to allocate a new BWP and separately manage the connected users. This is because the initial access BWP may be shared and used by all UEs in common rather than being configured in a UE-specific manner. Further, the default BWP may be dynamically indicated through the MAC control information, L1 signaling, or system information (in order to reduce signaling overhead).

Hereinafter, the disclosure newly proposes a dormant state in the next-generation mobile communication system and proposes a method of supporting transition between three states in units of links (downlinks or uplinks).

Figure 2G:
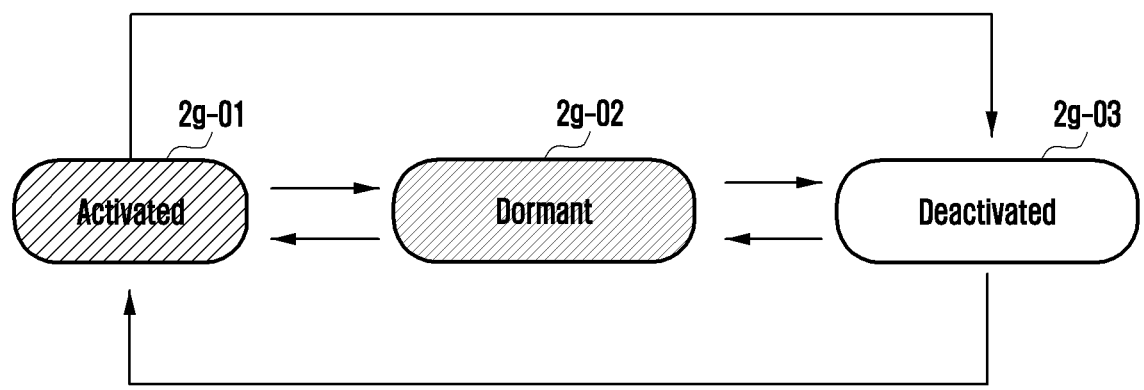
FIG. 2G illustrates a procedure of transitioning a state of a downlink or an uplink of a cell proposed in the disclosure.

FIG. 2G illustrates a state transition procedure for each link proposed in the disclosure.

As illustrated in FIG. 2G, the link of each cell of the terminal (downlink or uplink) may have an activated state 2g-01, a deactivated state 2g-03, or a dormant state 2g-02. The terminal may perform state transition due to an indication by configuration information of the RRC message, MAC control information, or DCI of a PDCCH.

A state transition operation (activated, deactivated, or dormant state) of the link of the Scell proposed in the disclosure may be performed as follows.

The case in which the link (downlink or uplink) of the Scell is configured through the RRC message, The case in which Scell activation and deactivation MAC CEs are received, The case in which a link (downlink or uplink) activation, deactivation, and hibernation MAC CEs are received, The case in which an Scell hibernation MAC CE is received The case in which a cell hibernation timer is not configured in an activated state Scell and a configured cell deactivation timer expires, The case in which a link (downlink or uplink) hibernation timer is not configured in an active link (downlink or uplink) and a configured link (downlink or uplink) deactivation timer expires, The case in which a cell hibernation timer configured in an active Scell expires, The case in which a link (downlink or uplink) hibernation timer configured in an active link (downlink or uplink) expires, The case in which a dormant Scell deactivation timer configured in a dormant Scell expires, The case in which a dormant link (downlink or uplink) deactivation timer configured in a dormant link (downlink or uplink) expires, Further, the state transition operation proposed in the disclosure may have the following characteristics.

An Spcell (Pcell or Pscell) (or link (downlink or uplink) of the cell) cannot be transitioned to a dormant state and is always in an activated state. The Spcell performs synchronization with the terminal, is used to transmit and receive a primary control signal, and the connection with the gNB is released if the Spcell is dormant or inactive, so the Spcell should always remain in the activated state.

If a PUCCH is configured, even an Scell cannot be transitioned to the dormant state. The Scell should be in the activated state since there may be another cell that should transmit feedback of HARQ ACK/NACK through the PUCCH.

Due to this feature, if a cell deactivation timer (ScellDeactivationTimer) is not applied to the Spcell or to the Scell in which the PUCCH is configured, the cell deactivation timer may operate only for other Scells.

A cell hibernation timer (ScellHibernationTimer) may be prioritized over the cell deactivation timer (ScellDeactivationTimer). If one value is set as a timer value through the RRC message, the same value may be applied to all cells. In another method, the gNB may configure different timer values for Scells or BWPs in consideration of the characteristics of each Scell or BWP.

If the Scell is not indicated as being active or dormant through the RRC message, the Scell may basically operate in the deactivated state initially.

Embodiment 3-1 of the disclosure proposes an operation of each cell (Scell) and a BWP according to each state when an activated state, an inactive, or a dormant state proposed in the disclosure is applied in the next-generation mobile communication system using a BWP.

In embodiment 3-1 of the disclosure, when the activated state, inactive, state or dormant state is operated and state transition is performed, the state transition is performed in units of links (downlinks or uplinks), and when the state transition is performed in units of links (downlinks or uplinks), the state of the link (downlink or uplink) of which the state will be transitioned is transitioned according to an indication of the state transition. For example, when the link (downlink or uplink) is transitioned from the activated state to the dormant state, the link (downlink or uplink) may be transitioned to the dormant state.

Figure 2H:
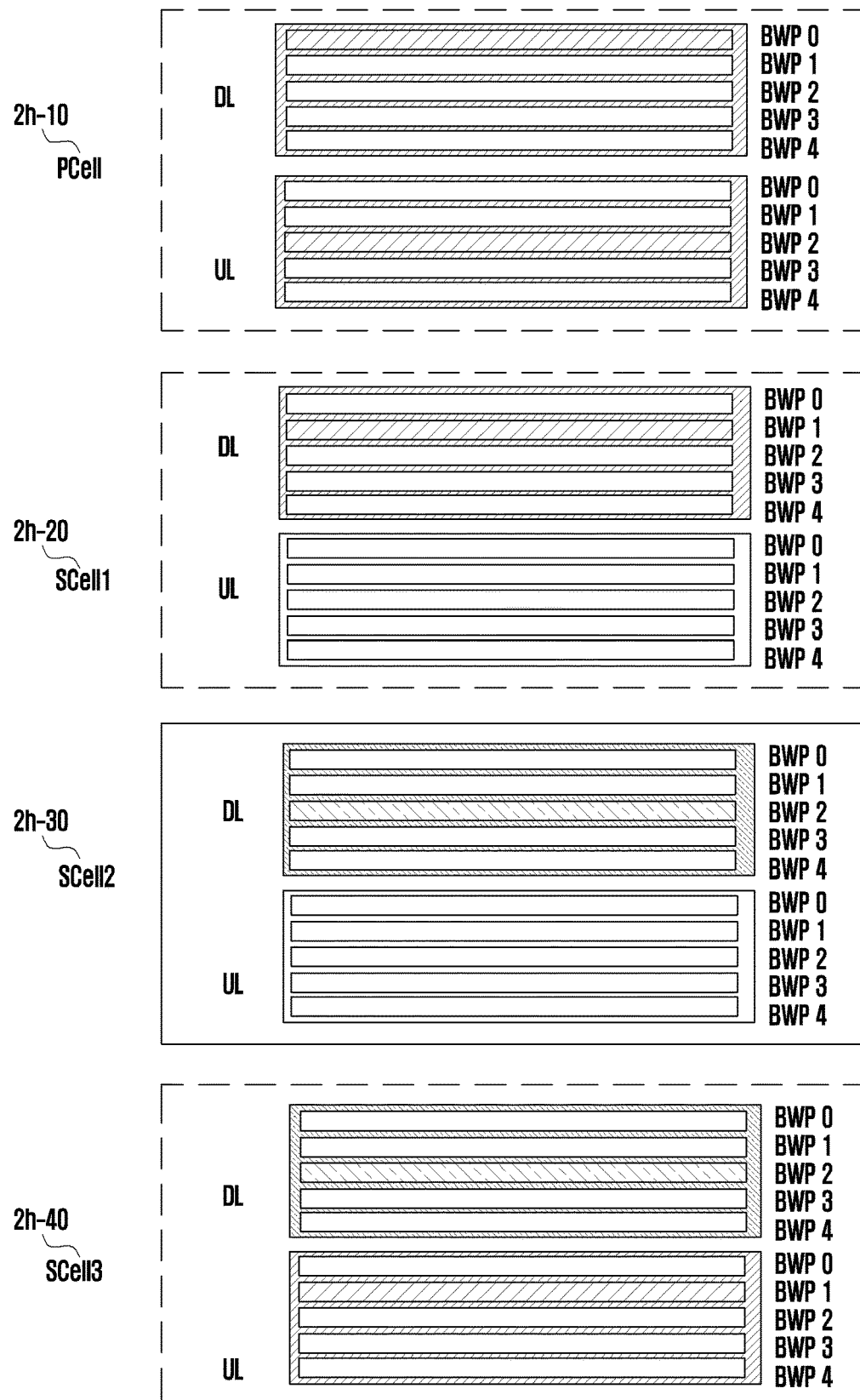
FIG. 2H illustrates a state transition method for each link of each cell through state transition for each link of each cell proposed in the disclosure.

FIG. 2H illustrates a link (downlink or uplink) state transition method through state transition in units of links (downlinks or uplinks) proposed in the disclosure.

In embodiment 3-1 of the disclosure, when the activated state, the deactivated state, or the dormant state is operated in units of links (downlinks or uplinks) and state transition is performed through an indication of the link (downlink or uplink) belonging to the Scell when the state transition is performed in units of links (downlinks or uplinks) as illustrated in FIG. 2H.

As illustrated in FIG. 2H, a Pcell 2h-10 may always maintain an activated state to prevent the release of a wireless connection between the gNB and the terminal. In the case of an FDD system, each cell (Pcell or each of Scells) may distinguish frequencies for the downlink and the uplink, and a plurality of BWPs may be configured for each of the downlink and the uplink. In the case of a TDD system, frequencies may not be distinguished between the downlink and the uplink, and a plurality of BWPs may be configured without distinction between the downlink and the uplink.

For example, as illustrated in FIG. 2H, the gNB may configure a first Scell 2h-20, a second Scell 2h-30, and a third Scell 2h-40 in the terminal If the gNB transitions the downlink of the first Scell 2h-20 to the activated state through an RRC message or a MAC CE, the terminal may activate the downlink configured in the first Scell and transition the indicated BWP (for example, first active BWP) among a plurality of BWPs configured in the downlink to the activated state.

If the gNB transitions the downlink of the second Scell 2h-30 to the dormant state through an RRC message or a MAC CE, the terminal may hibernate the downlink configured in the second Scell and transition the indicated BWP (for example, first active BWP) among a plurality of BWPs configured in the downlink to the dormant state.

If the gNB transitions the downlink of the third Scell 2h-40 to the dormant state through an RRC message or a MAC CE, the terminal may hibernate the downlink configured in the third Scell and transition the indicated BWP (for example, first active BWP) among a plurality of BWPs configured in the downlink to the dormant state. Further, if the gNB transitions the uplink of the third Scell 2h-40 to the activated state through an RRC message or a MAC CE, the terminal may activate the uplink configured in the third Scell and transition the indicated BWP (for example, first active BWP) among a plurality of BWPs configured in the uplink to the activated state.

Hereinafter, the disclosure proposes a state transition operation of the BWP when the gNB indicates the state transition in units of links (uplinks or downlinks) to the terminal as described above.

If a (uplink activation) MAC layer device receives a MAC CE or an RRC message indicating activation of the uplink, the terminal may perform some or all of a plurality of the following operations.

A predetermined BWP (for example, a first active BWP) of the link is activated.

A Sounding Reference Signal (SRS) is transmitted to allow the gNB to measure a channel for the uplink in the activated BWP. For example, the SRS may be periodically transmitted.

If a PUCCH is configured in the activated BWP, the PUCCH is transmitted.

A BWP or link deactivation timer starts or restarts for the link. In another method, the BWP or link deactivation timer may start or restart only when a BWP or link hibernation timer is not configured.

If there are suspended type 1 configuration transmission resources, the resources may be initialized according to a stored type 1 transmission resource configuration or may be initialized again and used. The type 1 configuration transmission resources are periodic (uplink or downlink) transmission resources pre-allocated through an RRC message, which can be used after being activated through the RRC message.

A PHR for the BWP is triggered.

If a (downlink activation) MAC layer device receives a MAC CE or an RRC message indicating activation of the downlink, some or all of a plurality of the following operations may be performed.

A predetermined BWP (for example, first active BWP) of the uplink is activated.

The terminal may report a channel measurement result (CSI, CQI, PMI, RI, PTI, or CRI) for the downlink in the activated BWP according to a configuration of the gNB.

A PDCCH is monitored to read an indication of the gNB in the activated BWP.

A PDCCH is monitored to read cross scheduling in the activated BWP.

A BWP deactivation timer starts or restarts for the link. In another method, the BWP deactivation timer may start or restart only when a BWP hibernation timer is not configured.

If there are suspended type 1 configuration transmission resources, the resources may be initialized according to a stored type 1 transmission resource configuration or may be initialized again and used. The type 1 configuration transmission resources are periodic (uplink or downlink) transmission resources pre-allocated through an RRC message, which can be used after being activated through the RRC message.

If the link hibernation timer is configured for the link, The link hibernation timer starts or restarts for the link.

If a (downlink deactivation) MAC layer device receives a MAC CE indicating deactivation of a downlink of any cell or an RRC message indicating deactivation thereof, Alternatively, if a link deactivation timer for the activated cell expires and a link hibernation timer is not configured (if the link hibernation timer is configured, the link hibernation timer should be prioritized, and thus expiration of the link deactivation timer is ignored. For example, if the link hibernation timer is configured, the link state should be first transitioned from the activated state to the dormant state and then from the dormant state to the deactivated state), The terminal may perform some or all of a plurality of the following operations.

A downlink BWP of the Scell is deactivated.

The terminal stops the BWP deactivation timer configured or operated in the link of the Scell. If the deactivated link is a downlink, the BWP deactivation timer stops. However, if the deactivated link is an uplink, the BWP deactivation timer does not stop. This is because the BWP timer operates only for the downlink.

Periodic downlink transmission resources (DL SPS or configured downlink assignment) or periodic uplink transmission resources (UL SPS or configured uplink grant Type 2) configured in the downlink may be released (cleared). The term "release (clear)" means that configuration information such as periodicity information configured through the RRC message is stored in the terminal but information on periodic transmission resources activated or indicated through L1 signaling (for example, DCI) is removed (cleared or released) and is not used anymore. The periodic transmission resources may be called type 2 configuration transmission resources.

The periodic uplink transmission resources (configured uplink grant type 1 configured through RRC) configured in the downlink may be suspended. The term "suspend" means that transmission resource configuration information configured through the RRC message is stored in the terminal but is not used anymore. The periodic transmission resources may be called type 1 configuration transmission resources.

All HARQ buffers configured for the downlink are emptied.

If an (uplink deactivation) MAC layer device receives a MAC CE indicating deactivation of a downlink of any cell or an RRC message indicating deactivation thereof, Alternatively, if a link deactivation timer for the activated cell expires and a link hibernation timer is not configured (if the link hibernation timer is configured, the link hibernation timer should be prioritized, and thus expiration of the link deactivation timer is ignored. For example, if the link hibernation timer is configured, the link state should be first transitioned from the activated state to the dormant state and then from the dormant state to the deactivated state), The terminal may perform some or all of a plurality of the following operations.

A BWP of the uplink is deactivated.

If the deactivated link is an uplink, the BWP deactivation timer does not stop. This is because the BWP timer operates only for the downlink.

Periodic downlink transmission resources (DL SPS or configured downlink assignment) or periodic uplink transmission resources (UL SPS or configured uplink grant Type 2) configured in the uplink may be released (cleared). The term "release (clear)" means that configuration information such as periodicity information configured through the RRC message is stored in the terminal but information on periodic transmission resources activated or indicated through L1 signaling (for example, DCI) is removed (cleared or released) and is not used anymore. The periodic transmission resources may be called type 2 configuration transmission resources.

If there are PUSCH transmission resources configured for periodic channel measurement information (semi-persistent CSI reporting) for the uplink, the PUSCH transmission resources are released (cleared).

The periodic uplink transmission resources (configured uplink grant type 1 configured through RRC) configured in the uplink may be suspended. The term "suspend" means that transmission resource configuration information configured through the RRC message is stored in the terminal but is not used anymore. The periodic transmission resources may be called type 1 configuration transmission resources.

All HARQ buffers configured for the uplink are emptied.

If a PDCCH indicates that there is downlink data (downlink assignment) in any activated link or allocates uplink transmission resources (uplink grant), or if a PDCCH indicates that there is downlink data (downlink assignment) for the activated link in a serving cell for scheduling the activated Scell or allocates uplink transmission resources (uplink grant), Alternatively, if any MAC PDU is transmitted through pre-configured downlink transmission resources (configured downlink assignment) or pre-configured uplink transmission resources (configured uplink grant) for the activated configured link, The terminal restarts the link deactivation timer being driven for the link. In another method, the link deactivation timer may restart only when link hibernation is not configured.

If the link hibernation timer is configured for the link, the link hibernation timer restarts.

If the link of the Scell is deactivated or is in the deactivated state,

The terminal does not transmit an SRS for the link of the Scell.

The terminal neither performs (CSI, CQI, PMI, RI, PTI, or CRI) nor reports channel measurement for the downlink in the link of the Scell.

Uplink data is not transmitted through UL-SCH in the link of the Scell.

A random access procedure is not performed for the link of the Scell.

The terminal does not monitor a PDCCH in the link of the Scell.

The terminal does not monitor a PDCCH for the link of the Scell. For example, in the case of cross scheduling, a PDCCH for the Scell is not monitored in a cell in which the scheduling is performed.

The PUCCH or SPUCCH is not transmitted in the link.

If there is a random access procedure being performed during transition of the link to the deactivated state, the random access procedure is canceled. If the deactivated link is a downlink, the random access procedure may be performed without cancel thereof. This is because a preamble is transmitted through the uplink and a random access response is received through the downlink of the Pcell when the random access procedure is performed in the Scell. Accordingly, if the deactivated link is an uplink, the random access procedure should be canceled.

The dormant state is not applied to an Spcell or an Scell in which a PUCCH is configured.

The MAC layer device may operate two timers to efficiently manage the dormant state of the Scell.

Link hibernation timer (BWPHibernationTimer): operates in a link configured in the terminal but does not operate in an Scell in which a PUCCH is configured. If the link hibernation timer expires, the MAC layer device transitions the link in the activated state to the dormant state. For example, the cell hibernation timer may be applied only to the Scell in the activated state. One value configured through RRC is equally applied to the cell hibernation timer of each Scell. The cell hibernation timer may be prioritized over the cell deactivation timer. For example, the cell hibernation timer is configured, and if the cell hibernation timer is being driven, the cell deactivation timer is driven or is not transitioned to the deactivated state even though the cell deactivation timer expires, and the cell deactivation timer does not influence the Scell.

Dormant link deactivation timer (dormantBWPDeactivationTimer): operates in an Scell configured in the terminal but does not operate in an Scell in which a PUCCH is configured. If the dormant link deactivation timer expires, the MAC layer device transitions the link in the dormant state to the deactivated state. One value configured through RRC may be equally applied to the dormant cell deactivation timer of each link. For example, the dormant link deactivation timer is applied only to the link in the dormant state.

If the dormant state is indicated through the RRC message when the link is configured, the terminal may transition the link to the dormant state. If the dormant state is indicated in the link state configuration of the RRC message for handover or SCG change, the terminal may transition the link to the dormant state.

If the MAC layer device receives an indication of the dormant state when the link configuration is received through the RRC message, or receives a MAC CE indicating transition of the link to the dormant state, The terminal may perform some or all of a plurality of the following operations.

The link of the Scell is transitioned to the dormant state.

The cell deactivation timer configured or driven in the link of the Scell is stopped.

If the link hibernation timer is configured in the BWP of the Scell, the BWP hibernation timer is stopped.

The dormant link deactivation timer starts or restarts in the BWP of the Scell.

The link deactivation timer configured for the link of the Scell is stopped. This is to prevent an unnecessary BWP-switching procedure in the Scell.

Periodic Downlink transmission resources (DL SPS or configured downlink assignment) or periodic uplink transmission resources (UL SPS or configured uplink grant Type 2) configured in the link of the Scell may be released (cleared). The term "release (clear)" means that configuration information such as periodicity information configured through the RRC message is stored in the terminal but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP is transitioned from the activated state to the dormant state. This is because there is no information on periodic transmission resources activated or indicated through L1 signaling when the BWP is transitioned from the deactivated state to the dormant state.

The periodic uplink transmission resources (configured uplink grant Type 1 configured through RRC) configured in the link of the Scell may be suspended. The term "suspend" means that transmission resource configuration information configured through the RRC message is stored in the terminal but is not used anymore. The proposed method, that is, the operation of suspending the periodic uplink transmission resources (configured uplink grant Type 1), may be performed only when the BWP is transitioned from the activated state to the dormant state. This is because periodic transmission resources are not used when the BWP is transitioned from the deactivated state to the dormant state.

All HARQ buffers configured in the link are emptied.

If the link hibernation timer expires in the activated BWP of the Scell,

The terminal transitions the link of the Scell to the dormant state.

The terminal stops the BWP deactivation timer configured or operated in the link of the Scell. If the hibernated link is a downlink, the BWP deactivation timer is stopped. However, if the hibernated link is an uplink, the BWP deactivation timer does not stop. This is because the BWP timer operates only for the downlink.

The terminal stops the link hibernation timer configured or driven in the link of the Scell.

The terminal starts or restarts the dormant link deactivation timer in the link of the Scell.

If the dormant link deactivation timer configured in the dormant link expires,

The link of the Scell is transitioned to the deactivated state.

The dormant link deactivation timer of the link of the Scell is stopped.

If the link of the Scell is in the dormant state

The terminal does not transmit an SRS for the Scell.

The terminal performs channel measurement (CIS, CQI, PMI, RI, PTI, or CRI) for the downlink according to the configuration of the gNB and transmits a measurement report in the link of the Scell. For example, the terminal may periodically report the channel or frequency measurement.

Uplink data is not transmitted through UL-SCH in the Scell.

A random access procedure is not performed for the link of the Scell.

The terminal does not monitor a PDCCH in the link of the Scell.

The terminal does not monitor a PDCCH for the link of the Scell. For example, in the case of cross scheduling, a PDCCH for the Scell is not monitored in a cell in which the scheduling is performed.

A PUCCH or an SPUCCH is not transmitted in the Scell.

The downlink BWP may be hibernated, and channel measurement may be performed and reported. Further, the uplink BWP of the Scell may be deactivated and not used. This is because the channel is measured only for the downlink BWP in the dormant Scell and the measurement result is reported to the uplink BWP of the Spcell (Pcell or Pscell) or the Scell in which there is a PUCCH.

A downlink (DL) BWP and an uplink (UL) BWP of the link of the Scell are hibernated to a first active downlink BWP (indicated by a firstActiveDownlinkBWP-Id) and a first active uplink BWP (indicated by a firstActiveUplinkBWP-id) indicated through an RRC message since the transition of the link of the Scell to the dormant state is indicated. This is because the first active uplink/downlink BWP configured through the RRC message is activated when an inactive-state or dormant BWP transitions to the activated state, and thus it is efficient to transmit a channel measurement report of the dormant state in the first active uplink/downlink BWP. In another method, during the transition to the dormant state, only the downlink BWP may be switched and made to hibernate to the first active downlink BWP. This is because the uplink BWP is also switched and activated to the first active uplink BWP when the BWP is activated. If the BWP in the activated state was originally the first active downlink or uplink BWP in the BWP before the indication of the dormant state, the BWP may be hibernated without the switching operation.

Periodic Downlink transmission resources (DL SPS or configured downlink assignment) or periodic uplink transmission resources (UL SPS or configured uplink grant Type 2) configured in the link of the Scell may be released (cleared). The term "release (clear)" means that configuration information such as periodicity information configured through the RRC message is stored in the terminal but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP is transitioned from the activated state to the dormant state. This is because there is no information on periodic transmission resources activated or indicated through L1 signaling when the BWP is transitioned from the deactivated state to the dormant state.

The periodic uplink transmission resources (configured uplink grant Type 1 configured through RRC) configured in the link of the Scell may be suspended. The term "suspend" means that transmission resource configuration information configured through the RRC message is stored in the terminal but is not used anymore. The proposed method, for example, the operation of suspending the periodic uplink transmission resources (configured uplink grant Type 1) may be performed only when the BWP is transitioned from the activated state to the dormant state. This is because periodic transmission resources are not used when the BWP is transitioned from the deactivated state to the dormant state.

If there is a random access procedure being performed during transition of the link to the dormant state, the random access procedure is canceled. If the hibernated link is a downlink, the random access procedure may be performed without cancel. This is because a preamble is transmitted through the uplink and a random access response is received through the downlink of the Pcell when the random access procedure is performed in the Scell. Accordingly, if the hibernated link is an uplink, the random access procedure should be canceled.

Hereinafter, the disclosure proposes state transition MAC control information (MAC Control Element: MAC CE) indicating the activated state, the dormant state, or the deactivated state of each link.

FIG. 2I illustrates MAC control information indicating state transition to an activated state, a dormant state, or a deactivated state proposed in the disclosure.

Active and inactive MAC CEs proposed in the disclosure may have the structure illustrated in FIG. 2I according to an embodiment. For example, the active and inactive MAC CEs may be divided into a MAC CE format 2i-05 having the size of 1 byte that supports 7. Scells and a MAC CE format 2i-10 having the size of 4 bytes that supports 31. Scells. Further, the MAC CEs have the following characteristics.

In the case in which a dormant MAC CE is not received and only active and inactive MAC CEs are received, the terminal operates as described below.

If each field of the active and inactive MAC CEs indicates an Scell identifier, a value corresponding to each field may indicate whether the Scell is activated or deactivated. If a value of the indicator for the Scell indicated by the Scell identifier is 1, the Scell is activated when the state of the Scell is the deactivated state. However, if the state of the Scell is a state other than the deactivated state, the indicator value is ignored. If a value of the indicator for the Scell indicated by the Scell identifier is 0, the Scell is deactivated. For example, the Scell is deactivated when the value of the indicator for the Scell is 0 regardless of the state of the Scell.

The dormant MAC CEs proposed in the disclosure are merely an embodiment and may have a format illustrated in FIG. 2I, and may be divided into a MAC CE format 2*i*-05 having the size of 1 byte supporting 7 Scells and a MAC CE format 2*i*-05 having the size of 4 bytes supporting 31 Scells. Further, the MAC CEs have the following characteristics.

In the case in which the active and inactive MAC CEs are not received and only the dormant MAC CE is received, the terminal operates as described below.

If each field of the dormant MAC CE indicates an Scell identifier, a value corresponding to each field may indicate whether the Scell is activated or deactivated. If a value of an indicator for the Scell indicated by the Scell identifier is 1, the Scell is hibernated. For example, the Scell is hibernated when the value of the indicator for the Scell is 1 regardless of the state of the Scell. If the value of the indicator for the Scell indicated by the Scell identifier is 0, the Scell is activated when the state of the Scell is the dormant state. However, if the state of the Scell is a state other than the dormant state, the indicator value is ignored.

In the case in which the active and inactive MAC CEs and the dormant MAC CE are received by one MAC layer device, the terminal operation is as described below.

If each field of the active and inactive MAC CEs and the dormant MAC CE indicates an Scell identifier, a combination of values corresponding to the fields may indicate state transition of the Scell to the activated, dormant, or deactivated state. For the active and inactive MAC CEs and the dormant MAC CE, MAC CEs having the size of 1 byte or MAC CEs having the size of 4 bytes may be received together by one MAC layer device. If two types of MAC CEs are received together, the state transition of each Scell indicated by the MAC CE may be determined according to a combination of indication values of the MAC CEs as shown in Table 2 below.

TABLE 2

| Hibernation MAC control element Ci | Activation/Deactivation MAC control element Ci | SCell shall be |
|---|---|---|
| 0 | 0 | Deactivated |
| 0 | 1 | Activated |
| 1 | 0 | Reserved MAC control element combination |
| 1 | 1 | Dormant |

The activated, deactivated, and dormant states for each link may be indicated using an R field included in the format of the cell active and inactive MAC CEs or the cell dormant MAC CE proposed above. For example, when the R field is 0, it may indicate transition of the downlink of the cell to the activated, deactivated, or dormant state. When the R field is 1, it may indicate transition of the uplink of the cell to the activated, deactivated, or dormant state. In another method, the R field may be defined and used to indicate only the state transition of the downlink (or uplink). Further, a MAC CE including each cell identifier and each link indicator or state indicator may be defined as indicated by reference numeral 2*i*-15 and state transition for each link for each cell may be indicated.

As described above, the uplink may indicate an uplink BWP, and the downlink may indicate a downlink BWP. This is because only one activated or hibernated BWP can be operated for each uplink or downlink.

Hereinafter, the disclosure proposes in detail a method of operating the state transition in units of BWPs (bandwidth part-level) proposed in the disclosure to rapidly activate the carrier aggregation and save the battery of the terminal.

In the disclosure, the BWP may be configured for each cell in the RRCSetup message, the RRCReconfiguration message, or the RRCResume message as described with reference to FIG. 2F. The RRC message may include configuration information for a PCell, a Pscell, or a plurality of Scells and configure a plurality of BWPs for each cell (PCell, Pscell, or Scell). When the plurality of BWPs are configured for each cell, a plurality of BWPs to be used in the downlink of each cell may be configured in the RRC message. In the case of an FDD system, a plurality of BWPs to be used in the uplink of each cell may be configured to be distinguished from downlink BWPs. In the case of a TDD system, a plurality of BWPs to be used in common in the downlink and the uplink of each cell may be configured.

In a first method of the information configuration method for configuring the BWP of each cell (PCell, Pscell, or Scell), one or a plurality of pieces of the following information is included and a new indicator is introduced in the BWP and thus whether each BWP is a normal BWP (for example, a BWP that can be operated or configured in an activated state or a deactivated state) or a dormant BWP (for example, a BWP that can be operated or configured in a dormant state) may be indicated. For example, whether the BWP is a dormant BWP or not may be indicated through a BWP identifier.

Downlink BWP configuration information of each cell
    Initial downlink BWP configuration information
    A plurality of pieces of BWP configuration information and BWP IDs corresponding to the respective BWPs
    Downlink initial configuration information of the cell (for example, activated state, dormant state, or deactivated state)
    A BWP ID indicating a first active downlink BWP
    A BWP ID indicating a default BWP
    A BWP ID indicating a dormant BWP
    BWP deactivation timer configuration and a timer value Uplink BWP configuration information of each cell
    Initial uplink BWP configuration information
    A plurality of pieces of BWP configuration information and BWP IDs corresponding to the respective BWPs
    Uplink initial configuration information of the cell (for example, activated state, dormant state, or deactivated state)
    A BWP ID indicating a first active uplink BWP
    A BWP ID indicating a dormant BWP As another method of the information configuration method of configuring the BWP of each cell (PCell, Pscell, or Scell), a second method may separate configuration information by not configuring configuration information (for example, a search space, PDCCH transmission resources, and periodicity) required to read a PDCCH for a BWP corresponding to a dormant BWP (in another method, periodicity may be configured to be very long along with other configuration information) or configuring only some of the configuration information and configuring configuration information required to read a PDCCH for a normal BWP (for example, a search space, PDCCH transmission resources, and periodicity). This is because the dormant BWP is a BWP to reduce battery consumption of the terminal by not reading the PDCCH and may perform channel measurement and reporting a channel measurement result to the PCell so as to rapidly activate the BWP or the cell, thereby promptly allocating uplink or downlink transmission resources. However, for cross-carrier scheduling through the PCell, some pieces of information for reading the PDCCH (for example, search space information) may be configured to receive switching or the indication for the dormant BWP of the other SCell. Accordingly, the dormant BWP in the disclosure may indicate a BWP in which configuration information (for example, a search space, PDCCH transmission resources (CORESET resource information), or periodicity) for PDCCH monitoring is not configured, a BWP in which there is no CORESET resource information in the configuration information for PDCCH monitoring but search space information is configured for cross-carrier scheduling, a BWP in which only some of the configuration information for PDCCH monitoring is configured, a BWP indicated by a dormant BWP identifier, or a BWP in which the configuration information for PDCCH monitoring is configured but which is configured to perform monitoring with very long periodicity.

Accordingly, as described above, the uplink or downlink normal BWP should be configured for each cell, but the dormant BWP may be or may not be configured for each cell, and the configuration thereof may be handled by NR gNB implementation according to the purpose thereof. Further, a first active BWP, a default BWP, or an initial BWP may be configured as the dormant BWP according to NR gNB implementation.

In the dormant BWP, the terminal cannot exchange data with the NR gNB, does not monitor a PDCCH to identify an indication of the NR gNB, does not transmit a pilot signal, but measures a channel, and reports a measurement result for the measured frequency/cell/channel periodically or when an event is generated according to a configuration of the NR gNB. Accordingly, the terminal does not monitor the PDCCH and not transmit the pilot signal in the dormant BWP, thereby reducing a battery compared to the active mode. Unlike the deactivated mode, the terminal transmits a channel measurement report, so that the NR gNB may rapidly activate the cell in which the dormant BWP is configured on the basis of the measurement report of the dormant BWP to use carrier aggregation.

The terminal operation for the dormant BWP (dormant Band Width Part) according to the disclosure is described below.

If the terminal receives an indication indicating operation in the dormant BWP for a serving cell (PCell or SCell), receives an indication indicating hibernation of the cell through DCI (L1 control signal) of a PDCCH, a MAC CE, or an RRC message, or receives an indication indicating switching a BWP (for example, a downlink BWP) to the dormant BWP through DCI (L1 control signal) of a PDCCH, a MAC CE, or an RRC message (in the case in which the indication is received through the L1 control signal of the PDCCH, the terminal may receive the indication by the PDCCH of its own cell through self-scheduling or the indication by the PDCCH for the PCell through cross-carrier scheduling), of if the BWP hibernation timer is configured and expires, one or a plurality of operations among the following operations may be performed.

Switching to the indicated uplink or downlink BWP or a predetermined BWP (for example, the dormant BWP) is performed, and the BWP is hibernated.

The cell deactivation timer configured or driven in the cell or BWP is stopped.

The BWP hibernation timer is stopped when the BWP hibernation timer is configured in the BWP of the cell.

The dormant BWP deactivation timer starts or restarts in the BWP of the cell.

The BWP deactivation timer configured for the BWP of the cell stops. This is to prevent an unnecessary BWP switching procedure in the cell.

Periodic downlink transmission resources (DL SPS or configured downlink assignment) or periodic uplink transmission resources (UL SPS or configured uplink grant type 2) configured in the BPW of the cell may be released (cleared). The term "release (clear)" means that configuration information such as periodicity information configured through the RRC message is stored in the terminal but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP is transitioned from the activated state to the dormant state. This is because there is no information on periodic transmission resources activated or indicated through L1 signaling when the BWP is transitioned from the deactivated state to the dormant state. In another method, the periodic transmission resources may be released only when the periodic downlink transmission resources or the periodic uplink transmission resources are configured or configured and used.

The periodic uplink transmission resources (configured uplink grant type 1 configured through RRC) configured in the BWP of the cell may be suspended. The term "suspend" means that transmission resource configuration information configured through the RRC message is stored in the terminal but is not used anymore. The proposed method, that is, the operation of suspending the periodic uplink transmission resources (configured uplink grant type 1), may be performed only when the BWP is transitioned from the activated state to the dormant state. This is because periodic transmission resources are not used when the BWP is transitioned from the deactivated state to the dormant state. In another method, the periodic transmission resources may be released only when the periodic downlink transmission resources or the periodic uplink transmission resources are configured or configured and used.

All HARQ buffers configured in the uplink or downlink BWP are all emptied.

The terminal does not transmit an SRS for the uplink BWP of the cell.

The terminal performs channel measurement (CSI, CQI, PMI, RI, PTI, or CRI) for the downlink according to the configuration of the gNB and transmits a measurement report in the BWP of the cell. For example, the terminal may periodically transmit a channel or frequency measurement report.

The terminal does not transmit uplink data through a UL-SCH in the BWP of the cell.

A random access procedure is not performed for the BWP of the cell.

The terminal does not monitor a PDCCH in the BWP of the cell.

The terminal does not monitor a PDCCH for the BWP of the cell. However, in the case of cross-scheduling, an indication may be received through monitoring of a PDCCH for the cell (for example, SCell) in the scheduled cell (for example, PCell).

The PUCCH or SPUCCH is not transmitted in the BWP of the cell.

The downlink BWP may be hibernated, and channel measurement may be performed and reported. Further, the uplink BWP of the cell may be deactivated and not used. This is because the channel is measured only for the downlink BWP in the dormant Scell and the measurement result is reported to the uplink BWP of the Spcell (Pcell or Pscell) or the Scell in which there is a PUCCH.

If an indication indicating switching to the dormant BWP for the downlink is made or an indication indicating hibernation of the BWP is made, a random access procedure may be performed without cancelling the same. This is because a preamble is transmitted through the uplink and a random access response is received through the downlink of the Pcell when the random access procedure is performed in the Scell. Accordingly, even though the downlink BWP is hibernated or switched to the dormant BWP, any problem does not occur.

The terminal operation for the active BWP (active Band Width Part) according to the disclosure is described below.

If an indication indicating activation of a BWP (for example, a downlink BWP) of the current cell (PCell or SCell) or activation of the cell is received through DCI (L1 control signal) of a PDCCH, a MAC CE, or an RRC message or if an indication indicating switching of a BWP (for example, a downlink BWP) to an active BWP (or a BWP other than the dormant BWP) is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations among the following operations may be performed.

Switching and activation to the indicated uplink or downlink BWP is performed. Alternatively, the uplink or downlink BWP is switched to a predetermined BWP (for example, an uplink or uplink first active BWP), and the BWP is activated.

A Sounding Reference Signal (SRS) is transmitted to allow the gNB to measure a channel for the uplink in the activated BWP. For example, the SRS may be periodically transmitted.

If a PUCCH is configured in the activated BWP, the PUCCH is transmitted.

A BWP or cell deactivation timer starts or restarts. In another method, the BWP or cell deactivation timer may start or restart only when a BWP or cell hibernation timer is not configured. If the BWP or cell hibernation timer can be configured through the RRC message, the BWP or cell may be hibernated when the timer expires. For example, the BWP or cell deactivation timer may start or restart only in the hibernated BWP or cell.

If there are suspended type 1 configuration transmission resources, stored type 1 transmission resources may be initialed as original and used. The type 1 configuration transmission resources are periodic (uplink or downlink) transmission resources pre-allocated through an RRC message, which can be used after being activated through the RRC message.

A PHR is triggered for the BWP.

The terminal may report a channel measurement result (CSI, CQI, PMI, RI, PTI, or CRI) for the downlink in the activated BWP according to a configuration of the gNB.

A PDCCH is monitored to read an indication of the gNB in the activated BWP.

A PDCCH is monitored to read cross scheduling in the activated BWP.

The BWP deactivation timer starts or restarts. In another method, the BWP deactivation timer may start or restart only when a BWP hibernation timer is not configured. If the BWP hibernation timer can be configured through the RRC message, the BWP may be hibernated or switched to a dormant BWP when the timer expires. For example, the BWP deactivation timer may start or restart only in the dormant BWP.

If a link BWP hibernation timer is configured for the BWP,

The BWP hibernation timer may start or restart for the BWP.

The terminal operation for the inactive BWP (active Band Width Part) according to the disclosure is described below.

If an indication indicating deactivation of a BWP (for example, a downlink BWP) of the current cell (PCell or SCell) is received through DCI (L1 control signal) of a PDCCH, a MAC CE, or an RRC message, or an indication indicating deactivation of a BWP (for example, a downlink BWP) or an indication indicating switching to an inactive BWP is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), or if the BWP or cell deactivation timer expires in the cell, one or a plurality of operations among the following operations may be performed.

The cell or the indicated uplink or downlink BWP is deactivated.

The stops the BWP deactivation timer (for example, deactivation timer for the downlink BWP) configured and driven in the cell or BWP.

Periodic downlink transmission resources (DL SPS or configured downlink assignment) or periodic uplink transmission resources (UL SPS or configured uplink grant type 2) configured in the cell or BPW may be released (cleared). The term "release (clear)" means that configuration information such as periodicity information configured through the RRC message is stored in the terminal but information on periodic transmission resources activated or indicated through L1 signaling (for example, DCI) is removed (cleared or released) and is not used anymore. The periodic transmission resources may be called type 2 configuration transmission resources. Further, the operation of releasing (clearing) the periodic transmission resources may be performed only when the Scell transitions from the activated state to the deactivated state. This is because the releasing (clearing) operation is not needed when the transition is made from the dormant state to the deactivated state because there are no periodic transmission resources in the dormant state. In another method, the periodic transmission resources may be released only when the periodic downlink transmission resources or the periodic uplink transmission resources are configured or configured and used.

The periodic uplink transmission resources (configured uplink grant type 1 configured through RRC) configured in the cell or BWP may be suspended. The term "suspend" means that transmission resource configuration information configured through the RRC message is stored in the terminal but is not used anymore. The periodic transmission resources may be called type 1 configuration transmission resources. Further, the operation of releasing (clearing) the periodic transmission resources may be performed only when the Scell transitions from the activated state to the deactivated state. This is because the releasing (clearing) operation is not needed when the transition is made from the dormant state to the deactivated state because there are no periodic transmission resources in the dormant state. In another method, the periodic transmission resources may be released only when the periodic downlink transmission resources or the periodic uplink transmission resources are configured or configured and used.

All HARQ buffers configured for the cell or BWP are emptied.

The periodic transmission resources are released (cleared) if there are PUSCH transmission resources configured for a periodic channel measurement report (semi-persistent CSI reporting) for the cell or BWP.

The terminal does not transmit an SRS for the cell or BWP.

The terminal neither measures a channel (CSI, CQI, PMI, RI, PTI, or CRI) for the downlink nor reports the channel measurement for the cell or BWP.

The terminal does not transmit uplink data through a UL-SCH in the cell or BWP.

A random access procedure is not performed for the cell or BWP.

The terminal does not monitor a PDCCH in the cell or BWP.

The terminal does not monitor a PDCCH for the cell or BWP. Further, in the case of cross-scheduling, a PDCCH for the cell is not monitored in the scheduled cell.

A PUCCH or SPUCCH is not transmitted in the cell or BWP.

In the disclosure, the activated state, the deactivated state, or the dormant state are operated and cell or BWP transition or switching is performed in units of BWPs. When state transition or switching is performed in units of BWPs, a BWP indicated to have state transition or switching (a downlink BWP or an uplink BWP) is transitioned or switched according to an indication of state transition or switching. For example, if a BWP (a downlink or uplink BWP) is transitioned from an activated state to a dormant state or switched to a dormant, the BWP may be transitioned to the dormant state or switched to the dormant BWP.

In the disclosure, BWP switching means that, if BWP switching is indicated with a BWP identifier through PDCCH DCI while downlink assignment is allocated, the downlink BWP is switched to a BWP indicated by the BWP identifier, and if BWP switching is indicated with a BWP identifier through PDCCH DCI while a UL grant is allocated, the uplink BWP is switched to a BWP indicated by the BWP identifier. The terminal operation follows a DCI format although description for the uplink and the downlink is not separated since PDCCH DCI formats are different for the downlink assignment (format1) and the UL grant (format0).

The method of operating the state transition in units of BWPs (BWP levels) and the operation of the BWP according to each state proposed in the disclosure may be expanded and applied to various embodiments. Hereinafter, the disclosure describes detailed embodiments for expanding and applying the content proposed in the disclosure.

Embodiment 3-2 for performing state transition in units of BWPs and performing the operation according thereto in the disclosure is described below.

In embodiment 3-2 of the disclosure, a dormant BWP is configured by an indicator or a BWP identifier when a plurality of BWPs are configured in the terminal for each cell through the RRC message as illustrated in FIG. 2F. The gNB may indicate switching of the BWP for the cell in an activated state to the dormant BWP through DCI of the PDCCH which is L1 signaling and perform no PDCCH monitoring and no data transmission/reception in the dormant BWP but transmits a channel measurement report therein, thereby reducing terminal battery consumption and enabling rapid BWP activation. The gNB may transmit DCI of the PDCCH which is L1 signaling in the cell (self-scheduling) or transmit the same in the PCell (cross-carrier scheduling) so as to indicate BWP switching. When data transmission/reception for the activated cell switched to the dormant BWP is needed, the gNB may indicate switching of the cell in the activated state to a BWP (or an active BWP) which is not the dormant BWP among a plurality of BWPs configured through an RRC message using DCI of a PDCCH corresponding to L1 signaling, monitor the PDCCH again in the switched BWP, and start data transmission and reception. The gNB may indicate switching by transmitting DCI of the PDCCH corresponding to L1 signaling in the PCell (cross-carrier scheduling). This is because, when the BWP of the activated cell is switched to the dormant BWP, the PDCCH is not monitored for the cell, and thus the BWP switching may be indicated for the cell through the application of cross-carrier scheduling to the PCell. In embodiment 3-2 of the disclosure, the BWP is not operated or used in the cell in the deactivated state. Further, in embodiment 3-2 of the disclosure, the BWP switching to the dormant BWP indicates switching of a downlink BWP. This is because the operation of not monitoring the PDCCH and the operation of reporting the channel measurement are operations for the downlink BWP of the cell by the terminal. Further, in embodiment 3-2, when a MAC CE indicating activation or deactivation of the cell is received by the terminal and the MAC CE indicates activation of the activated cell switched to a dormant BWP, the terminal may not follow or may ignore the indication of the MAC CE. When the MAC CE indicates deactivation of the activated cell switched to the dormant BWP, the terminal may deactivate the cell according to the indication of the MAC CE and deactivate a downlink or uplink BWP configured in the cell.

Embodiment 3-2-1 of a detailed operation related to a BWP of a MAC layer device and a BWP deactivation timer according to embodiment 3-2 of the disclosure is described below, and the BWP deactivation timer starts or restarts only when a default BWP is configured and a BWP instructed to be switched is not a dormant BWP or not the default BWP or when the default BWP is not configured and a BWP instructed to be switched is not the dormant BWP or not an initial BWP.

If the MAC layer device receives an indication of a PDCCH for switching of a BWP of a serving cell (PCell, PSCell, or SCell), the MAC layer device operates as follows with respect to a serving cell in which a BWP deactivation timer is configured.
- 1> If the PDCCH for the BWP switching indication is received and the MAC layer device switches the downlink active BWP according to the indication,
  - 2> If a downlink default BWP identifier (defaultDownlinkBWP-Id) is configured and the MAC layer device performs switching to a BWP which is not instructed by the downlink default BWP identifier or a downlink dormant BWP,
  - 2> If a downlink default BWP identifier (defaultDownlinkBWP-Id) is not configured and the MAC layer device performs switching to a BWP which is not a downlink initial BWP or a downlink dormant BWP,
    - 3> A BWP deactivation timer (bwp-InactivityTimer) for the downlink active BWP starts or restarts.

Embodiment 3-2-2 of a detailed operation related to a BWP of a MAC layer device and a BWP deactivation timer according to embodiment 3-2 of the disclosure is described below, and the BWP deactivation timer starts or restarts only when the switched and activated BWP is not the dormant BWP.

If the MAC layer device receives an indication of a PDCCH for switching of a BWP of a serving cell (PCell, PSCell, or SCell), the MAC layer device operates with respect to a serving cell in which a BWP deactivation timer is configured as follows.
- 1> If the PDCCH for the BWP switching indication is received and the MAC layer device switches the downlink active BWP according to the indication,
  - 2> If a downlink default BWP identifier (defaultDownlinkBWP-Id) is configured and the MAC layer device switches to a BWP which is not instructed by the downlink default identifier,
  - 2> If a downlink default BWP identifier (defaultDownlinkBWP-Id) is not configured and the MAC layer device switches to a BWP which is not a downlink initial BWP,
    - 3> If the switched and activated downlink BWP is not the dormant BWP or not the BWP indicated by the dormant BWP identifier,
  - 4> The BWP deactivation timer (bwp-InactivityTimer) for the downlink active BWP starts or restarts.

Embodiment 3-2-3 of a detailed operation related to a detailed operation related to an uplink BWP when a downlink BWP of a MAC layer device is switched to a dormant BWP according to 3-2 of the disclosure is described below, and an active uplink BWP is deactivated when a downlink BWP is switched to a dormant BWP. This is because the PDCCH is not monitored and data transmission/reception is not performed in the dormant BWP and thus the uplink BWP is not used.

If the MAC layer device receives the indication of the PDCCH for switching of the BWP of the serving cell (PCell, PSCell, or SCell),
- 1> If there is no random access procedure which is being performed by the serving cell,
- 1> Alternatively, if a random access procedure which is being performed by the serving cell is successfully completed when the PDCCH indicated by the C-RNTI is received,
  - 2> the terminal switches the current BWP of the serving cell to a BWP indicated by the PDCCH.
  - 2> If the BWP indicated by the PDCCH is a downlink BWP having the same BWP identifier as a downlink dormant BWP identifier or if the switched and activated BWP is a downlink dormant BWP,
    - 3> an active uplink BWP of the current serving cell is deactivated.
    - 3> If a BWP activation timer for the active downlink BWP is being driven in the current serving cell, the BWP activation timer is stopped. This is to prevent automatic switching and activation of the dormant BWP to the default (battery consumption due to PDCCH monitoring). If the default BWP is configured as the dormant BWP, the above problem may be prevented.
    - 3> In another method, if the cell deactivation timer is being driven, the cell deactivation timer may be stopped. The operation is applied to prevent cell deactivation of the dormant BWP due to expiration of the cell timer and automatic deactivation of the dormant BWP.

Embodiment 3-2-4 of a detailed operation related to an uplink BWP when a downlink BWP of the MAC device is a dormant BWP and is switched to a normal BWP which is not the dormant BWP according to embodiment 3-2 of the disclosure is described below, and the uplink BWP is switched and activated to a first active BWP if the downlink BWP is switched from the dormant BWP to the normal BWP.

If the MAC layer device receives the indication of the PDCCH for switching of the BWP of the serving cell (PCell, PSCell, or SCell),
- 1> If there is no random access procedure which is being performed by the serving cell,
- 1> Alternatively, if a random access procedure which is being performed by the serving cell is successfully completed when the PDCCH indicated by the C-RNTI is received,
  - 2> the terminal switches the current BWP of the serving cell to a BWP indicated by the PDCCH.
  - 2> If the BWP indicated by the PDCCH is a downlink BWP having the same BWP identifier as a downlink dormant BWP identifier or if the switched and activated BWP is a downlink dormant BWP,
    - 3> an active uplink BWP of the current serving cell is deactivated.
    - 3> If a BWP activation timer related to the active downlink BWP is being driven in the current serving cell, the BWP activation timer is stopped. This is to prevent automatic switching and activation of the dormant BWP to the default BWP (battery consumption due to PDCCH monitoring). If the default BWP is configured as the dormant BWP, the above problem may be prevented.
    - 3> In another method, if the cell deactivation timer is being driven, the cell deactivation timer may be stopped. The operation is applied to prevent cell deactivation of the dormant BWP due to expiration of the cell timer and automatic deactivation of the dormant BWP.
2> If the active downlink BWP (for example, previous downlink BWP) is a dormant BWP or is a BWP indicated by a dormant BWP identifier,
2> If a BWP indicated by the PDCCH is a BWP having a BWP identifier which is not the same as the dormant BWP identifier or if the switched and activated downlink BWP according to the indication of the PDCCH is not the dormant BWP,
   3> the uplink BWP of the current serving cell is activated to an uplink BWP indicated by a first active BWP identifier or a first active BWP.

Embodiment 3-2-5 of a detailed operation related to an uplink BWP when a downlink BWP of the MAC device is a dormant BWP and is switched to a normal BWP which is not the dormant BWP according to embodiment 3-2 of the disclosure is described below, and the uplink BWP is switched and activated to an uplink BWP having the same BWP identifier as the BWP identifier indicated by the PDCCH if the downlink BWP is switched from the dormant BWP to the normal BWP.

If the MAC layer device receives the indication of the PDCCH for switching of the BWP of the serving cell (PCell, PSCell, or SCell),
1> If there is no random access procedure which is being performed by the serving cell,
1> Alternatively, if a random access procedure which is being performed by the serving cell is successfully completed when the PDCCH indicated by the C-RNTI is received,
   2> the terminal switches the current BWP of the serving cell to a BWP indicated by the PDCCH.
   2> If the BWP indicated by the PDCCH is a downlink BWP having the same BWP identifier as a downlink dormant BWP identifier or if the switched and activated BWP is a downlink dormant BWP,
      3> an active uplink BWP of the current serving cell is deactivated.
      3> If a BWP activation timer related to the active downlink BWP is being driven in the current serving cell, the BWP activation timer is stopped. This is to prevent automatic switching and activation of the dormant BWP to the default BWP (battery consumption due to PDCCH monitoring). If the default BWP is configured as the dormant BWP, the above problem may be prevented.
      3> In another method, if the cell deactivation timer is being driven, the cell deactivation timer may be stopped. The operation is applied to prevent cell deactivation of the dormant BWP due to expiration of the cell timer and automatic deactivation of the dormant BWP.
   2> If the active downlink BWP (for example, previous downlink BWP) is a dormant BWP or is a BWP indicated by a dormant BWP identifier,
   2> If a BWP indicated by the PDCCH is a BWP having a BWP identifier which is not the same as the dormant BWP identifier or if the switched and activated downlink BWP according to the indication of the PDCCH is not the dormant BWP,
      3> The uplink BWP of the current serving cell is activated to an uplink BWP having the same BWP identifier as a BWP identifier indicated by the PDCCH or an uplink BWP having the same BWP identifier as a BWP identifier of the current downlink BWP.

Embodiment 3-2-6 of a detailed operation related to an uplink BWP when a downlink BWP of the MAC device is a dormant BWP and is switched to a normal BWP which is not the dormant BWP according to embodiment 3-2 of the disclosure is described below, and the uplink BWP is switched and activated to an uplink BWP activated when the previous downlink BWP was switched to the dormant BWP or a last activated uplink BWP if the downlink BWP is switched from the dormant BWP to the normal BWP.

If the MAC layer device receives the indication of the PDCCH for switching of the BWP of the serving cell (PCell, PSCell, or SCell),
1> If there is no random access procedure which is being performed by the serving cell,
1> Alternatively, if a random access procedure which is being performed by the serving cell is successfully completed when the PDCCH indicated by the C-RNTI is received,
   2> the terminal switches the current BWP of the serving cell to a BWP indicated by the PDCCH.
   2> If the BWP indicated by the PDCCH is a downlink BWP having the same BWP identifier as a downlink dormant BWP identifier or if the switched and activated BWP is a downlink dormant BWP,
      3> an active uplink BWP of the current serving cell is deactivated.
      3> If a BWP activation timer related to the active downlink BWP is being driven in the current serving cell, the BWP activation timer is stopped. This is to prevent automatic switching and activation of the dormant BWP to the default BWP (battery consumption due to PDCCH monitoring). If the default BWP is configured as the dormant BWP, the above problem may be prevented.
      3> In another method, if the cell deactivation timer is being driven, the cell deactivation timer may be stopped. The operation is applied to prevent cell deactivation of the dormant BWP due to expiration of the cell timer and automatic deactivation of the dormant BWP.
   2> If the active downlink BWP (for example, previous downlink BWP) is a dormant BWP or is a BWP indicated by a dormant BWP identifier,
   2> If a BWP indicated by the PDCCH is a BWP having a BWP identifier which is not the same as the dormant BWP identifier or if the switched and activated downlink BWP according to the indication of the PDCH is not the dormant BWP,
      3> The uplink BWP of the current serving cell is activated to an uplink BWP activated when a previous downlink BWP is switched to the dormant BWP or a last activated uplink BWP.

Embodiment 3-2 of a detailed operation depending on a cell state (activated state or deactivated state) of a MAC layer device according to embodiment 3-2 of the disclosure is described below.

If an indication indicating deactivation of a serving cell (PCell or SCell) is received through a MAC CE or an RRC message or if a cell deactivation timer has been configured and has expired, one or a plurality of operations among the following operations may be performed.

The downlink or uplink BWP is deactivated.

The cell deactivation timer configured or driven in the cell or BWP is stopped.

If the BWP deactivation timer configured for the BWP of the cell is being driven, the BWP deactivation timer is stopped. This is to prevent an unnecessary BWP switching procedure in the cell.

Periodic downlink transmission resources (DL SPS or configured downlink assignment) or periodic uplink transmission resources (UL SPS or configured uplink grant type 2) configured in the BPW of the cell may be released (cleared). The term "release (clear)" means that configuration information such as periodicity information configured through the RRC message is stored in the terminal but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP is transitioned from the activated state to the dormant state. This is because there is no information on periodic transmission resources activated or indicated through L1 signaling when the BWP is transitioned from the deactivated state to the dormant state. In another method, the periodic transmission resources may be released only when the periodic downlink transmission resources or the periodic uplink transmission resources are configured or configured and used.

The periodic uplink transmission resources (configured uplink grant type 1 configured through RRC) configured in the BWP of the cell may be suspended. The term "suspend" means that transmission resource configuration information configured through the RRC message is stored in the terminal but is not used anymore. The proposed method, that is, the operation of suspending the periodic uplink transmission resources (configured uplink grant type 1), may be performed only when the BWP is transitioned from the activated state to the dormant state. This is because periodic transmission resources are not used when the BWP is transitioned from the deactivated state to the dormant state. In another method, the periodic transmission resources may be released only when the periodic downlink transmission resources or the periodic uplink transmission resources are configured or configured and used.

All HARQ buffers configured in the uplink or downlink BWP are all emptied.

The terminal does not transmit an SRS for the uplink BWP of the cell.

Uplink data is not transmitted through a UL-SCH in the BWP of the cell.

A random access procedure is not performed for the BWP of the cell.

The terminal does not monitor a PDCCH in the BWP of the cell.

The terminal does not monitor a PDCCH for the BWP of the cell. However, in the case of cross-scheduling, if the dormant BWP is configured in the cell, an indication may be received through monitoring of a PDCCH for the cell (for example, SCell) in the scheduled cell (for example, PCell).

The PUCCH or SPUCCH is not transmitted in the BWP of the cell.

If an indication indicating activation of a BWP (for example, a downlink BWP) of the current cell (PCell or SCell) or activation of the cell is received through DCI (L1 control signal) of a PDCCH, a MAC CE, or an RRC message or if an indication indicating switching of a dormant BWP (for example, a downlink BWP) to an active BWP (or a BWP which is not the dormant BWP) is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations of the following operations may be performed.

If the current downlink BWP of the serving cell is not the dormant BWP or if the serving cell was previously in a deactivated state and is activated by the indication of the MAC CE, the uplink or downlink BWP is switched to a predetermined BWP (for example, an uplink BWP or uplink first active BWP) and the BWP is activated.

If the current downlink BWP of the serving cell is not the dormant BWP or if the serving cell was previously in a deactivated state and is activated by the indication of the MAC CE, a Sounding Reference Signal (SRS) is transmitted to enable the gNB to perform channel measurement for the uplink in the activated BWP. For example, the SRS may be periodically transmitted.

If the current downlink BWP of the serving cell is not the dormant BWP or if the serving cell was previously in a deactivated state and is activated by the indication of the MAC CE, a PUCCH is transmitted if the PUCCH is configured in the activated BWP.

If the current downlink BWP of the serving cell is not the dormant BWP or if the serving cell was previously in a deactivated state and is activated by the indication of the MAC CE, a BWP or cell deactivation timer starts or restarts. In another method, the BWP or cell deactivation timer may start or restart only when a BWP or cell hibernation timer is not configured. If the BWP or cell hibernation timer can be configured through the RRC message, the BWP or cell may be hibernated when the timer expires. For example, the BWP or cell deactivation timer may start or restart only in the hibernated BWP or cell.

If the current downlink BWP of the serving cell is not the dormant BWP or if the serving cell was previously in a deactivated state and is activated by the indication of the MAC CE, stored type 1 transmission resources may be initialized as original and used when there are suspended type 1 configuration transmission resources. The type 1 configuration transmission resources are periodic (uplink or downlink) transmission resources pre-allocated through an RRC message, which can be used after being activated through the RRC message.

If the current downlink BWP of the serving cell is not the dormant BWP or if the serving cell was previously in a deactivated state and is activated by the indication of the MAC CE, a PHR for the BWP is triggered.

The terminal may report a channel measurement result (CSI, CQI, PMI, RI, PTI, or CRI) for the downlink in the activated BWP according to a configuration of the gNB.

If the current downlink BWP of the serving cell is not the dormant BWP or if the serving cell was previously in a deactivated state and is activated by the indication of the MAC CE, a PDCCH is monitored to read an indication of the gNB in the activated BWP.

If the current downlink BWP of the serving cell is not the dormant BWP or if the serving cell was previously in a deactivated state and is activated by the indication of the MAC CE, a PDCCH is monitored to read cross-scheduling for the activated BWP.

If the current downlink BWP of the serving cell is not the dormant BWP or if the serving cell was previously in a deactivated state and is activated by the indication of the MAC CE, the BWP deactivation timer starts or restarts. In another method, the BWP deactivation timer may start or restart only when a BWP hibernation timer is not configured. If the BWP hibernation timer can be configured through the RRC message, the BWP may be switched to a dormant state or a dormant BWP when the timer expires. For example, the BWP deactivation timer may start or restart only in the dormant BWP.

If the current downlink BWP of the serving cell is not the dormant BWP or if the serving cell was previously in a deactivated state and is activated by the indication of the MAC CE, and if a link BWP hibernation timer is configured for the BWP, The BWP hibernation timer may start or restart for the BWP.

Further, in embodiment 3-2 of the disclosure, when the gNB triggers a random access procedure for the SCell, the gNB does not indicate BWP switching of the downlink BWP to the dormant BWP for the SCell. This is because the uplink BWP is deactivated when switching to the downlink dormant BWP is performed and thus the random access procedure cannot be successfully performed.

The operation related to switching of the normal BWP (for example, a BWP which is not the dormant BWP) or the dormant BWP is performed when the cell (for example, SCell) operating the BWP is in an activated state in embodiment 3-2 of the disclosure. Accordingly, when MAC control information (MAC Control Element (MAC CE)) including an indicator indicating activation or deactivation of the cell is received, the indicator may be ignored if the cell operates a downlink dormant BWP and receives the MAC CE including the indicator indicating activation of the cell, and the downlink dormant BWP of the cell is deactivated if the cell operates the downlink dormant BWP and receives the MAC CE including an indicator indicating deactivation of the cell. In another method, if a cell deactivation timer is being driven when a downlink BWP is switched to a dormant BWP, the cell deactivation timer is stopped in embodiment 3-2 of the disclosure. The operation is applied to prevent cell deactivation of the dormant BWP due to expiration of the cell timer and automatic deactivation of the dormant BWP.

Embodiment 3-3 for performing state transition in units of BWPs and performing the operation according thereto in the disclosure is described below.

In embodiment 3-3 of the disclosure, a dormant BWP is configured by an indicator or a BWP identifier when a plurality of BWPs are configured in the terminal for each cell through the RRC message as illustrated in FIG. 2F. When the gNB transmits the MAC CE including the indication indicating deactivation of a specific cell to the terminal and a dormant BWP is configured in the cell, the terminal deactivates the specific cell and perform switching to the dormant BWP according to the indication of the MAC CE. The terminal monitors no PDCCH and perform no data transmission/reception in the dormant BWP of the specific cell, but transmits a channel measurement report so as to reduce terminal battery consumption and enable rapid BWP activation. When there is a need to transmit and receive data for the inactive cell switched to the dormant BWP, the gNB may transmit the MAC CE including an indication indicating activation of a specific cell to the terminal. When the terminal receives the MAC CE, the terminal may activate the specific cell, and perform switching and activation to a first active BWP. The terminal may monitor the PDCCH and start data transmission/reception again in the switched BWP. However, if deactivation is indicated through the RRC message in the specific cell in embodiment 3-3 of the disclosure, all BWPs are deactivated even though the dormant BWP is configured in the specific cell. Upon receiving an indication indicating deactivation of the cell through the MAC CE for the deactivated cell through the RRC message, the terminal may activate the dormant BWP, perform an operation in the dormant BWP, and start a channel measurement report if the dormant BWP is configured for the cell.

In embodiment 3-3 of the disclosure, the dormant BWP is operated or used in the cell in the deactivated state. Further, in embodiment 3-3 of the disclosure, the BWP switching to the dormant BWP indicates switching of a downlink BWP. This is because the operation of not monitoring the PDCCH and the operation of reporting the channel measurement are operations for the downlink BWP of the cell by the terminal.

In embodiment 3-3 of the disclosure, for the state of the cell (for example, SCell), the activated state or the deactivated state is maintained and operated and the state transition between states is supported. For the state of the BWP, the activated state, the dormant state, or the deactivated state is maintained and operated and the state transition between BWPs or switching between BWPs is performed according to the cell state.

Embodiment 3-3-1 of a detailed operation depending on a cell state (activated state or deactivated state) of a MAC layer device according to embodiment 3-3 of the disclosure is described below.

If the terminal receives an indication of the operation as the dormant BWP for the serving cell (PCell or SCell), if the terminal receives an indication indicating deactivation of the cell through a MAC CE or an RRC message, if the terminal receives an indication indicating switching of a BWP (for example, a downlink BWP) to a dormant BWP through DCI of a PDCCH (L1 control signal), a MAC CE, or an RRC message, or if a cell deactivation timer was configured and has expired, one or a plurality of operations among the following operations may be performed.

If the dormant BWP is configured in the serving cell, the downlink BWP is switched to a BWP indicated by a dormant BWP identifier. Alternatively, the BWP is hibernated.

The uplink BWP is deactivated.

The cell deactivation timer configured or driven in the cell or BWP is stopped.

If the BWP deactivation timer configured for the BWP of the cell is being driven, the BWP deactivation timer is stopped. This is to prevent an unnecessary BWP switching procedure in the cell.

Periodic downlink transmission resources (DL SPS or configured downlink assignment) or periodic uplink transmission resources (UL SPS or configured uplink grant type 2) configured in the BPW of the cell may be released (cleared). The term "release (clear)" means that configuration information such as periodicity information configured through the RRC message is stored in the terminal but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP is transitioned from the activated state to the dormant state. This is because there is no information on periodic transmission resources activated or indicated through L1 signaling when the BWP is transitioned from the deactivated state to the dormant state. In another method, the periodic transmission resources may be released only when the periodic downlink transmission resources or the periodic uplink transmission resources are configured or configured and used.

The periodic uplink transmission resources (configured uplink grant type 1 configured through RRC) configured in the BWP of the cell may be suspended. The term "suspend" means that transmission resource configuration information configured through the RRC message is stored in the terminal but is not used anymore. The proposed method, that is, the operation of suspending the periodic uplink transmission resources (configured uplink grant type 1), may be performed only when the BWP is transitioned from the activated state to the dormant state. This is because periodic transmission resources are not used when the BWP is transitioned from the deactivated state to the dormant state. In another method, the periodic transmission resources may be released only when the periodic downlink transmission resources or the periodic uplink transmission resources are configured or configured and used.

All HARQ buffers configured in the uplink or downlink BWP are all emptied.

The terminal does not transmit an SRS for the uplink BWP of the cell.

If the dormant BWP is configured in the cell, the terminal measures a channel (CSI, CQI, PMI, RI, PTI, or CRI) for the downlink in the BWP according to the configuration of the gNB and reports the measurement. For example, the terminal may periodically report the channel or frequency measurement.

Uplink data is not transmitted through a UL-SCH in the BWP of the cell.

A random access procedure is not performed for the BWP of the cell.

The terminal does not monitor a PDCCH in the BWP of the cell.

The terminal does not monitor a PDCCH for the BWP of the cell. However, in the case of cross-scheduling, if the dormant BWP is configured in the cell, an indication may be received through monitoring of a PDCCH for the cell (for example, SCell) in the scheduled cell (for example, PCell).

The PUCCH or SPUCCH is not transmitted in the BWP of the cell.

If the dormant BWP is configured in the cell, the downlink BWP may be hibernated, and a channel measurement may be performed and reported. Further, an uplink BWP of the cell may be deactivated and not used. This is because the channel is measured only for the downlink BWP in the dormant Scell and the measurement result is reported to the uplink BWP of the Spcell (Pcell or Pscell) or the Scell in which there is a PUCCH.

The terminal operation for the active BWP (active Band Width Part) according to the disclosure is described below.

If an indication indicating activation of a BWP (for example, a downlink BWP) of the current cell (PCell or SCell) or activation of the cell is received through DCI (L1 control signal) of a PDCCH, a MAC CE, or an RRC message or if an indication indicating switching of a dormant BWP (for example, a downlink BWP) to an active BWP (or a BWP other than the dormant BWP) is received through DCI (L1 control signal) of a PDCCH, a MAC CE, or an RRC message (in the case in which the indication is received through the L1 control signal of the PDCCH, the indication may be received by the PDCCH of its own cell through self-scheduling or the indication may be received by the PDCCH of the PCell through cross-carrier scheduling), one or a plurality of operations among the following operations may be performed.

Switching and activation to the indicated uplink or downlink BWP is performed. Alternatively, the uplink or downlink BWP is switched to a predetermined BWP (for example, uplink or uplink first active BWP) and the BWP is activated.

A Sounding Reference Signal (SRS) is transmitted to allow the gNB to measure a channel for the uplink in the activated BWP. For example, the SRS may be periodically transmitted.

If a PUCCH is configured in the activated BWP, the PUCCH is transmitted.

The BWP or cell deactivation timer starts or restarts. In another method, the BWP or cell deactivation timer may start or restart only when a BWP or cell hibernation timer is not configured. If the BWP or cell hibernation timer can be configured through the RRC message, the BWP or cell may be hibernated when the timer expires. For example, the BWP or cell deactivation timer may start or restart only in the hibernated BWP or cell.

If there are suspended type 1 configuration transmission resources, stored type 1 transmission resources may be initialed as original and used. The type 1 configuration transmission resources are periodic (uplink or downlink) transmission resources preallocated through an RRC message, which can be used after being activated through the RRC message.

A PHR for the BWP is triggered.

The terminal may report a channel measurement result (CSI, CQI, PMI, RI, PTI, or CRI) for the downlink in the activated BWP according to a configuration of the gNB.

A PDCCH is monitored to read an indication of the gNB in the activated BWP.

A PDCCH is monitored to read cross scheduling in the activated BWP. The BWP deactivation timer starts or restarts. In another method, the BWP deactivation timer may start or restart only when a BWP hibernation timer is not configured. If the BWP hibernation timer can be configured through the RRC message, the BWP may be switched to a dormant state or a dormant BWP when the timer expires. For example, the BWP deactivation timer may start or restart only in the dormant BWP.

If a link BWP hibernation timer is configured for the BWP,

The BWP hibernation timer starts or restarts for the BWP.

Embodiment 3-1, 3-2, or 3-3 for performing state transition in units of BWPs and the operation according thereto may be combined or expanded to configure and operate various embodiments in the disclosure. For example, other embodiment 3-4 for operating state transmission in units of BWPs and the operation according thereto is described below.

In embodiment 3-4, a dormant BWP is configured by an indicator or a BWP identifier when a plurality of BWPs are configured in the terminal for each cell through the RRC message as illustrated in FIG. 2F. The gNB may indicate switching of the BWP for the cell in an activated state to the dormant BWP through DCI of the PDCCH which is L1 signaling and perform no PDCCH monitoring and no data transmission/reception in the dormant BWP but transmits a channel measurement report therein, thereby reducing terminal battery consumption and enabling rapid BWP activation. The gNB may transmit DCI of the PDCCH which is L1 signaling in the cell (self-scheduling) or transmit the same in the PCell (cross-carrier scheduling) so as to indicate BWP switching.

When data transmission/reception for the activated cell switched to the dormant BWP is needed, the gNB may transmit a MAC CE including an indicator indicating activation of the cell to the terminal, indicate switching of the dormant BWP for the cell in the activated state to a BWP (or an active BWP) which is not the dormant BWP among a plurality of BWPs configured through the RRC message, monitor a PDCCH again in the switched BWP, and start data transmission/reception.

If the gNB transmits a MAC CE including an indicator indicating deactivation of the cell to the terminal, the terminal may deactivate an uplink or downlink BWP of the specific cell and perform the deactivation operations proposed in the disclosure. In embodiment 3-4 of the disclosure, the BWP is not operated or used in the cell in the deactivated state. Further, in embodiment 3-4 of the disclosure, if switching the BWP to the dormant BWP is an indication of switching a downlink BWP, switching the dormant BWP to the active BWP may be performed by a cell activation indicator of the MAC CE. Detailed operations for the cell state and BWP switching may be performed on the basis of the operation proposed in embodiment 3-1, 3-2, or 3-3.

As described above, embodiments 3-1, 3-2, and 3-3 of the disclosure may be combined or expanded to configure and operate various embodiments.

Further, a new MAC CE for supporting embodiments of the disclosure and expanding to various embodiments may be designed or the conventional MAC CE function may be expanded.

For example, the MAC CEs proposed and described in FIG. 2I may be applied, and the R bit indicated by reference numeral 2i-05 or 2i-10 of FIG. 2I may be expanded and thus the function described in FIG. 2I of the disclosure may be expanded and applied.

For example, when the R bit is configured as 0, a 1-bit indicator indicating each SCell identifier may be defined and used as follows.
If the 1-bit indicator is configured as 0, state transition of the cell or BWP may be performed as follows.
The cell or BWP in the deactivated state is transitioned to the deactivated state or is maintained
The cell or BWP in the activated state is transitioned to the deactivated state
The cell or BWP in the dormant state is transitioned to the deactivated state
If the 1-bit indicator is configured as 1, state transition of the cell or BWP may be performed as follows.
The cell or BWP in the activated state is transitioned to the activated state or is maintained.
The cell or BWP in the deactivated state is transitioned to the activated state
The cell or BWP in the dormant state is transitioned to the dormant state or is maintained When the R bit is configured as 1, the 1-bit indicator indicating each cell (SCell) identifier may be defined and used as follows. In another method, a logical identifier may be newly defined and a new MAC CE may be defined and used as follows.
If the 1-bit indicator is configured as 0, state transition of the cell or BWP may be performed as follows.
The cell or BWP in the activated state is transitioned to the activated state or is maintained
The cell or BWP in the dormant state is transitioned to the activated state
The cell or BWP in the deactivated state is transitioned to the deactivated state or is maintained.
If the 1-bit indicator is configured as 1, state transition of the cell or BWP may be performed as follows.
The cell or BWP in the activated state is transitioned to the dormant state
The cell or BWP in the deactivated state is transitioned to the dormant state
The cell or BWP in the dormant state is transitioned to the dormant state or is maintained.

The MAC CE function described above by way of example may be variously expanded and designed to indicate state transition or switching of the cell or BWP and may be applied to the embodiments of the disclosure.

Figure 2J:
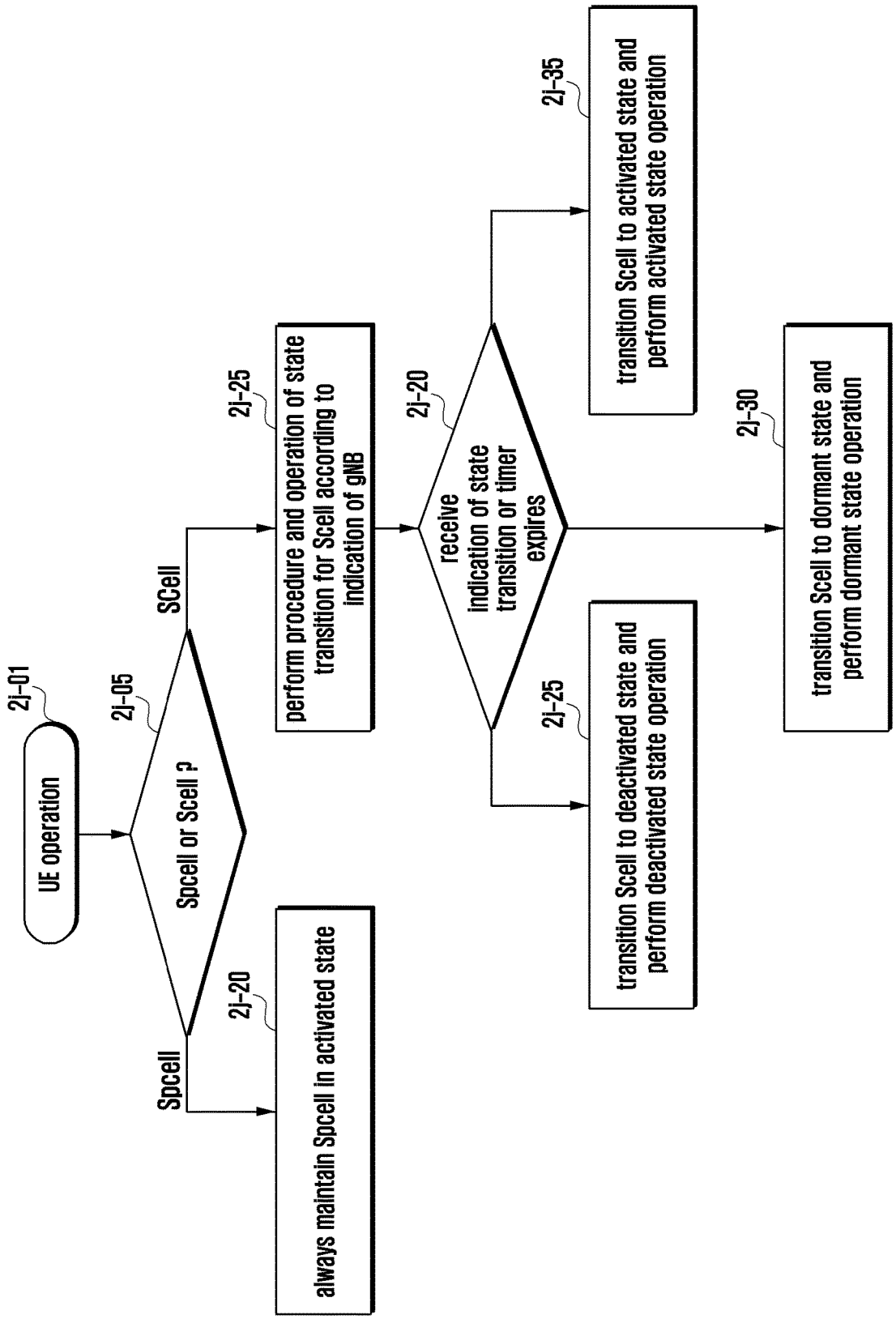
FIG. 2J illustrates a terminal operation for transitioning a state of a cell configured in the terminal according to the disclosure.

FIG. 2J illustrates a terminal operation for transitioning a state of a cell configured in the terminal according to the disclosure.

In FIG. 2J, the gNB may configure a plurality of Scells together with an Spcell (Pcell or Pscell) in the terminal.

If the configured cell is the Spcell in step 2j-05, the terminal may always maintain the Spcell in the activated state with an indication of the gNB in step 2j-10. If the configured cell is the Scell in step 2j-05, the terminal may transition the state according to the indication of the gNB or expiration of a timer configured in the cell. For example, if the NR gNB indicates the state transition of a link of any Scell through an RRC message or a MAC CE or if a timer configured by the gNB expires for a link of any cell and thus a state transition operation of the link of the Scell is triggered, the terminal may transition the link of the Scell to the activated state, the dormant state, or the deactivated state and perform operations suitable for the respective link states proposed in the disclosure in steps 2*j*-25, 2*j*-30, and 2*j*-35.

Figure 2K:
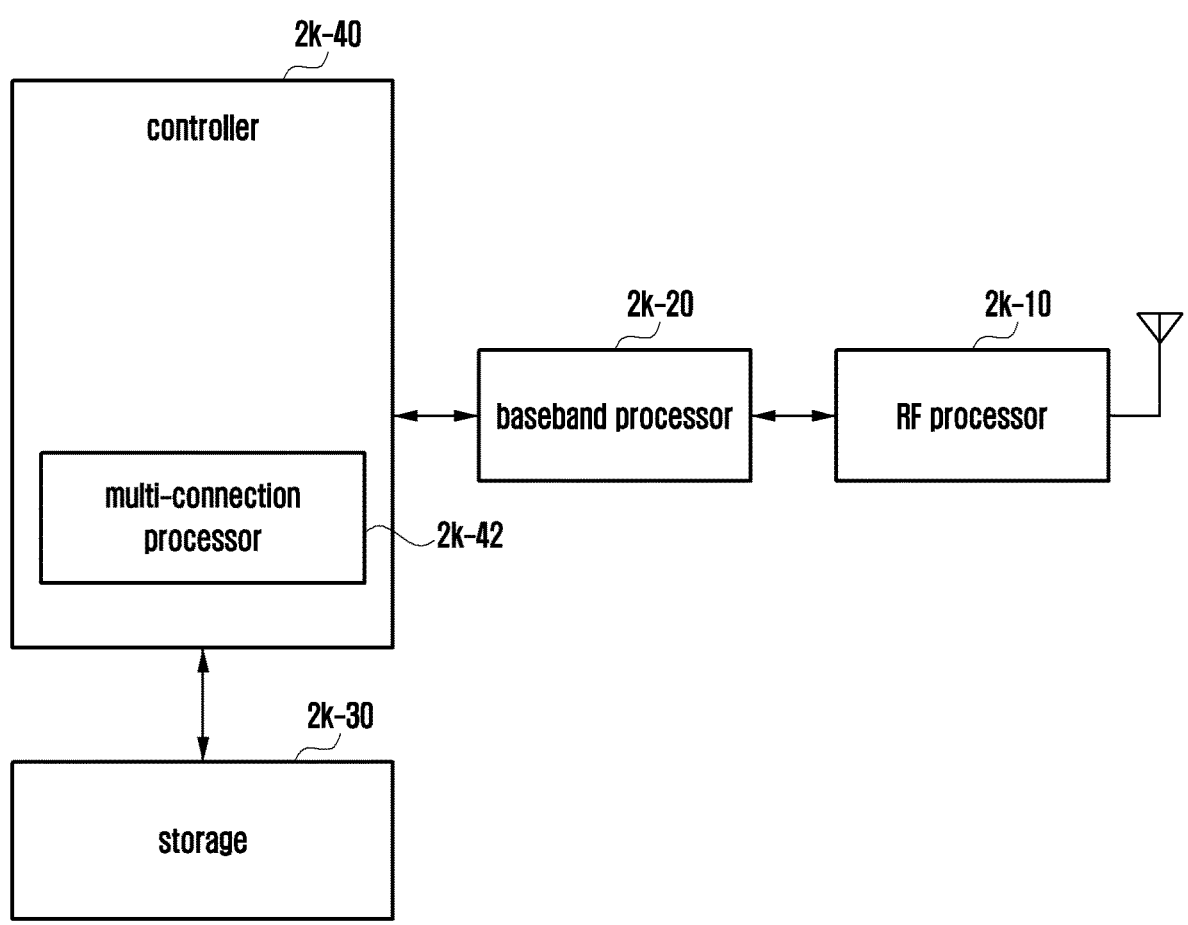
FIG. 2K illustrates the structure of the terminal to which an embodiment of the disclosure can be applied.

FIG. 2K illustrates a structure of a terminal to which an embodiment of the disclosure can be applied.

Referring to FIG. 2K, the terminal includes a Radio Frequency (RF) processor 2*k*-10, a baseband processor 2*k*-20, a storage 2*k*-30, and a controller 2*k*-40.

The RF processor 2*k*-10 performs a function for transmitting and receiving a signal through a wireless channel, such as band conversion and amplification of a signal. For example, the RF processor 2*k*-10 up-converts a baseband signal provided from the baseband processor 2*k*-20 into an RF band signal, transmits the RF band signal through an antenna, and down-converts the RF band signal received through the antenna into a baseband signal. For example, the RF processor 2*k*-10 may include a transmission filter, a reception filter, an amplifier, a mixer, an oscillator, a Digital-to-Analog Convertor (DAC), an Analog-to-Digital Convertor (ADC), and the like. Although FIG. 2K illustrates only one antenna, the terminal may include a plurality of antennas. Further, the RF processor 2*k*-10 may include a plurality of RF chains. Moreover, the RF processor 2*k*-10 may perform beamforming. For the beamforming, the RF processor 2*k*-10 may control a phase and a size of each signal transmitted/received through a plurality of antennas or antenna elements. The RF processor may perform MIMO and receive a plurality of layers when performing the MIMO operation. The RF processor 2*k*-10 may perform reception beam sweeping by appropriately configuring a plurality of antennas or antenna elements according to the control of the controller or may control a direction of the reception beam and a beam width for cooperation of the reception beam and the transmission beam.

The baseband processor 2*k*-20 performs a function for a conversion between a baseband signal and a bitstream according to a physical layer standard of the system. For example, when data is transmitted, the baseband processor 2*k*-20 generates complex symbols by encoding and modulating a transmission bitstream. Further, when data is received, the baseband processor 2*k*-20 reconstructs a reception bitstream by demodulating and decoding a baseband signal provided from the RF processor 2*k*-10. For example, in an Orthogonal Frequency Division Multiplexing (OFDM) scheme, when data is transmitted, the baseband processor 2*k*-20 generates complex symbols by encoding and modulating a transmission bitstream, mapping the complex symbols to subcarriers, and then configures OFDM symbols through an IFFT (Inverse Fast Fourier Transform) operation and a CP (Cyclic Prefix) insertion. Further, when data is received, the baseband processor 2*k*-20 divides the baseband signal provided from the RF processor 2*k*-10 in units of OFDM symbols, reconstructs the signals mapped to the subcarriers through a Fast Fourier Transform (FFT) operation, and then reconstructs a reception bitstream through demodulation and decoding.

The baseband processor 2*k*-20 and the RF processor 2*k*-10 transmit and receive a signal as described above. Accordingly, the baseband processor 2*k*-20 and the RF processor 2*k*-10 may be referred to as a transmitter, a receiver, a transceiver, or a communication unit. Further, at least one of the baseband processor 2*k*-20 and the RF processor 2*k*-10 may include a plurality of communication modules for supporting a plurality of different radio access technologies. In addition, at least one of the baseband processor 2*k*-20 and the RF processor 2*k*-10 may include different communication modules for supporting signals in different frequency bands. For example, the different radio access technologies may include an LTE network and an NR network. Further, the different frequency bands may include a Super High Frequency (SHF) (for example, 2.5 GHz and 5 Ghz) band and a millimeter (mm) wave (for example, 60 GHz) band.

The storage 2*k*-30 stores data such as a basic program, an application program, and setting information for the operation of the terminal. The storage 2*k*-30 provides the stored data according to a request from the controller 2*k*-40.

The controller 2*k*-40 controls the overall operation of the terminal. For example, the controller 2*k*-40 transmits and receives signals through the baseband processor 2*k*-20 and the RF processor 2*k*-10. Further, the controller 2*k*-40 records data in the storage 2*k*-40 and reads the data. To this end, the controller 2*k*-40 may include at least one processor. For example, the controller 2*k*-40 may include a Communication Processor (CP) that performs a control for communication, and an Application Processor (AP) that controls a higher layer such as an application.

Figure 2L:
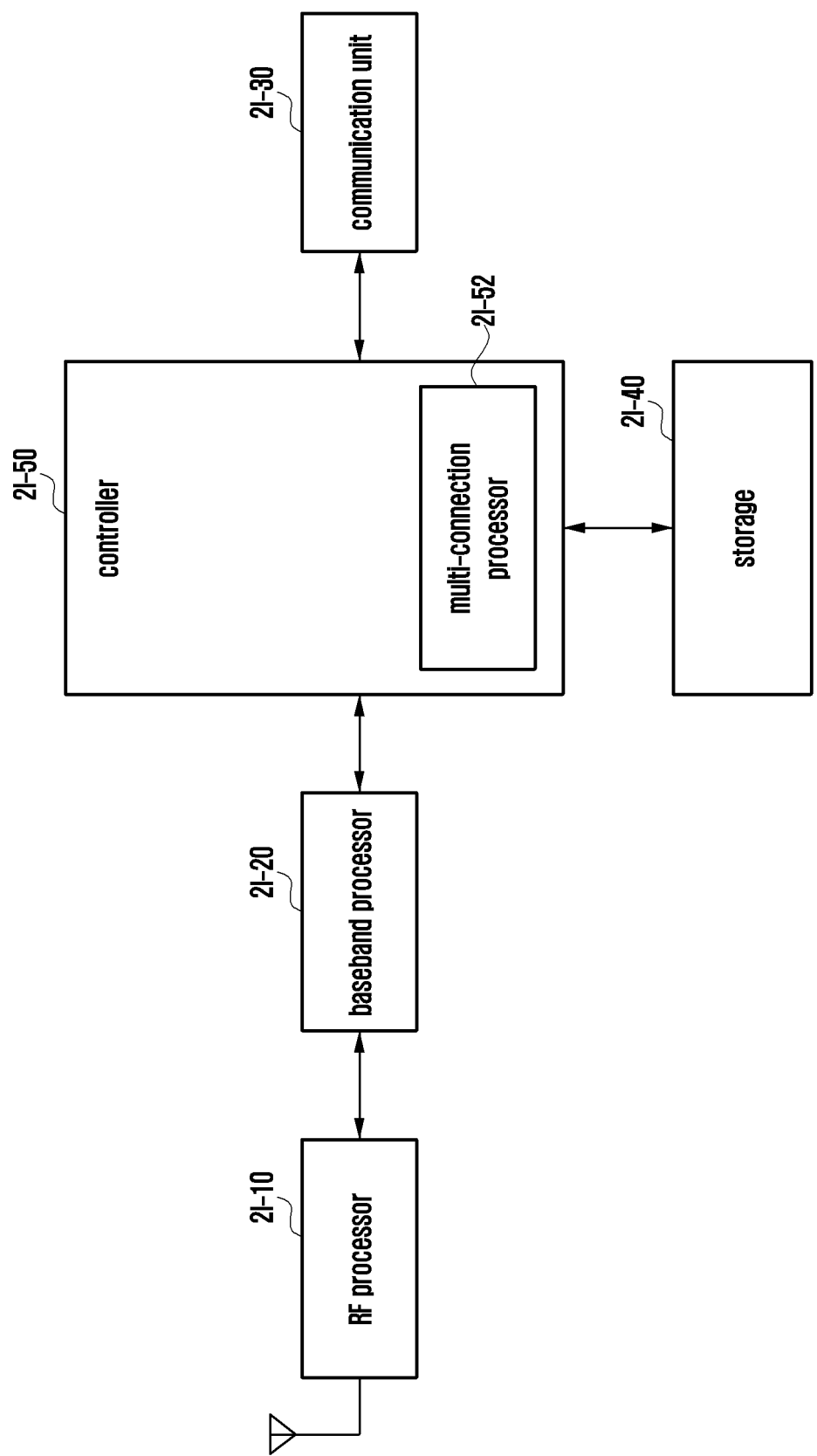
FIG. 2L is a block diagram illustrating a base station in a wireless communication system to which an embodiment of the disclosure can be applied.

FIG. 2L is a block diagram illustrating a base station in a wireless communication system to which an embodiment of the disclosure can be applied.

As illustrated in FIG. 2L, the base station includes an RF processor 2*l*-10, a baseband processor 2*l*-20, a backhaul communication unit 2*l*-30, a storage 2*l*-40, and a controller 2*l*-50.

The RF processor 2*l*-10 performs a function for transmitting and receiving a signal through a wireless channel, such as band conversion and amplification of a signal. For example, the RF processor 2*l*-10 up-converts a baseband signal provided from the baseband processor 2*l*-20 into an RF band signal, transmits the RF band signal through an antenna, and down-converts the RF band signal received through the antenna into a baseband signal. For example, the RF processing unit 2*l*-10 may include a transmission filter, a reception filter, an amplifier, a mixer, an oscillator, a DAC, and an ADC. Although FIG. 2L illustrates only one antenna, the first access node may include a plurality of antennas. In addition, the RF processor 2*l*-10 may include a plurality of RF chains. The RF processor 2*l*-10 may perform beamforming. For the beamforming, the RF processor 2*l*-10 may control a phase and a size of each of the signals transmitted and received through a plurality of antennas or antenna elements. The RF processor may perform a downlink MIMO operation by transmitting one or more layers.

The baseband processor 2*l*-20 performs a function of performing conversion between a baseband signal and a bitstream according to a physical-layer standard of the first radio access technology. For example, when data is transmitted, the baseband processor 2*l*-20 generates complex symbols by encoding and modulating a transmission bitstream. Further, when data is received, the baseband processor 2*l*-20 reconstructs a reception bitstream by demodulating and decoding a baseband signal provided from the RF processing unit 2*l*-10. For example, in an OFDM scheme, when data is transmitted, the baseband processor 2*l*-20 may generate complex symbols by encoding and modulating the transmission bitstream, map the complex symbols to subcarriers, and then configure OFDM symbols through an IFFT operation and CP insertion. In addition, when data is received, the baseband processor 2*l*-20 divides a baseband signal provided from the RF processor 2*l*-10 in units of OFDM symbols, recovers signals mapped with sub-carriers through an FFT operation, and then recovers a reception bit string through demodulation and decoding. The baseband processor 2*l*-20 and the RF processor 2*l*-10 transmit and receive a signal as described above. Accordingly, the baseband processing unit 2*l*-20 and the RF processor 2*l*-10 may be referred to as a transmitter, a receiver, a transceiver, a communication unit, or a wireless communication unit.

The communication unit 2l-30 provides an interface for communicating with other nodes within the network.

The storage 2l-40 stores data such as a basic program, an application, and setting information for the operation of the MeNB. Particularly, the storage 2l-40 may store information on a bearer allocated to the accessed terminal and a measurement result reported from the accessed terminal. Further, the storage 2l-40 may store information which is a reference for determining whether to allow or interrupt multiple accesses to the terminal. The storage 2l-40 provides stored data in response to a request from the controller 2l-50.

The controller 2l-50 controls the overall operation of the MeNB. For example, the controller 2l-50 transmits and receives a signal through the baseband processor 2l-20 and the RF processor 2l-10 or through the backhaul communication unit 2l-30. Further, the controller 2l-50 records data in the storage 2l-40 and reads the data. To this end, the controller 2l-50 may include at least one processor.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. For example, the embodiments of the disclosure may be partially combined to operate a base station and a terminal.

Further, although exemplary embodiments of the disclosure have been described and shown in the specification and the drawings by using particular terms, they have been used in a general sense merely to easily explain the technical contents of the disclosure and help understanding of the disclosure, and are not intended to limit the scope of the disclosure. It will be apparent to those skilled in the art that, in addition to the embodiments disclosed herein, other variants may be achieved on the basis of the technical idea of the disclosure.

The invention claimed is:

1. A method by a terminal in a wireless communication system, the method comprising:
receiving, from a base station, a radio resource control (RRC) message including first information for configuring a plurality of bandwidth parts (BWPs) for at least one secondary cell (Scell), and second information on a BWP to be activated;
activating a BWP among the plurality of BWPs based on the RRC message;
receiving, from the base station, downlink control information (DCI) indicating switching to a dormant BWP;
performing a BWP switching to a dormant BWP based on the DCI;
as a result of the performing the BWP switching to the dormant BWP, stopping a BWP inactivity timer for the at least one Scell, in case that the BWP inactivity timer is running;
receiving, from the base station, DCI indicating switching to an active BWP; and
performing a BWP switching to an active BWP identified based on the second information included in the RRC message.

2. The method of claim 1, wherein the dormant BWP is a BWP in which a physical downlink control channel (PDCCH) is not monitored and a channel measurement is performed by the terminal.

3. The method of claim 1, further comprising:
clearing a configured uplink grant type 2 associated with the at least one Scell, in case that a BWP is switched to the dormant BWP.

4. The method of claim 1, further comprising:
suspending a configured uplink grant type 1 associated with the at least one Scell, in case that a BWP is switched to the dormant BWP.

5. The method of claim 1, further comprising:
starting the BWP inactive timer for the at least one Scell, in case that a BWP is switched to the active BWP.

6. A terminal in a wireless communication system, the terminal comprising:
a transceiver; and
a controller configured to control the transceiver to:
receive, from a base station, a radio resource control (RRC) message including first information for configuring a plurality of bandwidth parts (BWPs) for at least one secondary cell (Scell), and second information on a BWP to be activated,
activate a BWP among the plurality of BWPs based on the RRC message,
receive, from the base station, downlink control information (DCI) indicating switching to a dormant BWP,
perform a BWP switching to a dormant BWP based on the DCI,
as a result of the performing the BWP switching to the dormant BWP, stop a BWP inactivity timer for the at least one Scell, in case that the BWP inactivity timer is running,
receive, from the base station, DCI indicating switching to an active BWP, and
perform a BWP switching to an active BWP identified based on the second information included in the RRC message.

7. The terminal of claim 6, wherein the dormant BWP is a BWP in which a physical downlink control channel (PDCCH) is not monitored and a channel measurement is performed by the terminal.

8. The terminal of claim 6, wherein the controller is further configured to:
control to clear a configured uplink grant type 2 associated with the at least one Scell, in case that a BWP is switched to the dormant BWP.

9. The terminal of claim 6, wherein the controller is further configured to:
control to suspend a configured uplink grant type 1 associated with the at least one Scell, in case that a BWP is switched to the dormant BWP.

10. The terminal of claim 6, wherein the controller is further configured to:
control to start the BWP inactive timer for the at least one Scell, in case that a BWP is switched to the active BWP.

11. A method by a base station in a wireless communication system, the method comprising:
transmitting, to a terminal, a radio resource control (RRC) message including first information for configuring a plurality of bandwidth parts (BWPs) for at least one secondary cell (Scell), and second information on a BWP to be activated, wherein a BWP among the plurality of BWPs is activated based on the RRC message;

transmitting, to the terminal, downlink control information (DCI) indicating switching to a dormant BWP, wherein a BWP is switched to a dormant BWP based on the DCI indicating switching to the dormant BWP, and wherein, as a result of the performing the BWP switching to the dormant BWP, a BWP inactivity timer for the at least one Scell is stopped in case that the BWP inactivity timer is running; and transmitting, to the terminal, DCI indicating switching to an active BWP, wherein a BWP is switched to an active BWP identified based on the second information included in the RRC message.

12. The method of claim 11, wherein the dormant BWP is a BWP in which a physical downlink control channel (PDCCH) is not monitored and a channel measurement is performed.

13. The method of claim 11, wherein the RRC message further includes information on the BWP inactivity timer for the at least one Scell.

14. A base station in a wireless communication system, the base station comprising:
- a transceiver; and
- a controller configured to control the transceiver to:
  transmit, to a terminal, a radio resource control (RRC) message including first information for configuring a plurality of bandwidth parts (BWPs) for at least one secondary cell (Scell), and second information on a BWP to be activated, wherein a BWP among the plurality of BWPs is activated based on the RRC message,
  transmit, to the terminal, downlink control information (DCI) indicating switching to a dormant BWP, wherein a BWP is switched to a dormant BWP based on the DCI indicating switching to the dormant BWP, and wherein, as a result of the performing the BWP switching to the dormant BWP, a BWP inactivity timer for the at least one Scell is stopped in case that the BWP inactivity timer is running, and
  transmit, to the terminal, DCI indicating switching to an active BWP,
  wherein a BWP is switched to an active BWP identified based on the second information included in the RRC message.

15. The base station of claim 14, wherein the dormant BWP is a BWP in which a physical downlink control channel (PDCCH) is not monitored and a channel measurement is performed.

16. The base station of claim 14, wherein the RRC message further includes information on the BWP inactivity timer for the at least one Scell.

* * * * *